United States Patent
Magnan et al.

(10) Patent No.: US 11,685,689 B2
(45) Date of Patent: Jun. 27, 2023

(54) ALUMINOSILICATES, RELATED PROCESSES AND USES THEREOF AS SUPPLEMENTARY CEMENTING MATERIALS

(71) Applicant: NEMASKA LITHIUM INC., Montréal (CA)

(72) Inventors: Jean-François Magnan, Neuville (CA); David-Nicolas Allen, Trois-Rivières (CA)

(73) Assignee: NEMASKA LITHIUM INC., Montréal (CA)

(*) Notice: Subject to any disclaimer, the term of this patent is extended or adjusted under 35 U.S.C. 154(b) by 0 days.

(21) Appl. No.: 17/628,558

(22) PCT Filed: Nov. 27, 2019

(86) PCT No.: PCT/CA2019/051697
§ 371 (c)(1),
(2) Date: Jan. 19, 2022

(87) PCT Pub. No.: WO2021/016700
PCT Pub. Date: Feb. 4, 2021

(65) Prior Publication Data
US 2022/0324755 A1    Oct. 13, 2022

(30) Foreign Application Priority Data
Jul. 19, 2019   (CA) ................................. CA 3050268

(51) Int. Cl.
C04B 11/30        (2006.01)
C04B 7/32         (2006.01)
(Continued)

(52) U.S. Cl.
CPC .............. *C04B 11/30* (2013.01); *C01B 33/26* (2013.01); *C04B 14/041* (2013.01); *C04B 14/10* (2013.01);
(Continued)

(58) Field of Classification Search
CPC ....... C04B 11/30; C04B 14/041; C04B 35/19; C04B 14/10; C04B 28/04; C04B 7/02;
(Continued)

(56) References Cited

U.S. PATENT DOCUMENTS 4,098,687 A * 7/1978 Yang .......................... C22B 1/00
                                                      209/166
9,090,508 B2   7/2015 Gong et al.
(Continued)

OTHER PUBLICATIONS

PCA Manual. Design and Control of Concrete Mixtures. Chapter 3 "Fly Ash, Slag, Silica Fume, and Natural Pozzolans" (2009) [retrieved from internet at Sep. 14, 2022 from <URL:http://www.ce.memphis.edu/1101/notes/concrete/PCA_manual/Chap03.pdf>] (Year: 2009).*
(Continued)

*Primary Examiner* — Kevin E Yoon
*Assistant Examiner* — Marites A Guino-O Uzzle
(74) *Attorney, Agent, or Firm* — Bereskin & Parr LLP/S.E.N.C.R.L., s.r.l.

(57) ABSTRACT

The present disclosure concerns an aluminosilicate having a Blaine fineness of about 500 $m^2$/kg to about 3000 $m^2$/kg and/or a specific surface area of about 4 $m^2$/g to about 20 $m^2$/g, as well as the uses thereof. The present disclosure also comprises a dry cementing composition and a mortar or concrete composition, the compositions comprising said aluminosilicate. The present disclosure also comprises a process for the manufacture of aluminosilicate. The process comprises: roasting a spodumene concentrate in an acid medium; leaching the acidic roast spodumene concentrate so as to obtain a mixture comprising a solid comprising the
(Continued)

aluminosilicate and a leachate; and separating the aluminosilicate from the leachate in an acid medium, wherein said aluminosilicate contains a calcium concentration of less than about 5%.

20 Claims, 22 Drawing Sheets

(51) Int. Cl.
*C01B 33/26* (2006.01)
*C04B 14/04* (2006.01)
*C04B 35/19* (2006.01)
*C04B 14/10* (2006.01)
*C04B 103/00* (2006.01)

(52) U.S. Cl.
CPC .......... *C04B 14/106* (2013.01); *C04B 35/19* (2013.01); *C04B 2103/0088* (2013.01); *Y02P 10/20* (2015.11)

(58) Field of Classification Search
CPC .......... C04B 41/5077; C04B 12/005; C04B 2103/0088; C04B 2111/29; C04B 2111/00293; C04B 28/02; C01B 33/26; C22B 26/12; C22B 3/06; Y02P 40/18; Y02P 10/20

See application file for complete search history.

(56) References Cited

U.S. PATENT DOCUMENTS

| | | |
|---|---|---|
| 2012/0216721 A1* | 8/2012 | Hesselbarth ............ C04B 28/08 106/695 |
| 2015/0007754 A1 | 1/2015 | Skovby et al. |
| 2017/0121227 A1 | 5/2017 | Perez et al. |
| 2017/0152183 A1 | 6/2017 | Toussaint et al. |
| 2017/0226008 A1* | 8/2017 | Daniellou ............... C04B 20/04 |

OTHER PUBLICATIONS

Mindat. Definition of loss on ignition (2014) [retrieved from the internet at Sep. 14, 2022 from <URL: https://www.mindat.org/glossary/loss_on_ignition>] (Year: 2014).*

Difference Between Relative Density and Density (2011) [retrieved from the internet at Sep. 15, 2022 from <URL: https://www.differencebetween.com/difference-between-relative-density-and-vs-density/#:~:text=Both%20density%20and%20relative%20density,in%20terms%20of%20another%20material.>] (Year: 2011).*

Mineral Data Publishing. Spodumene, version 1.2 (2001). [retrieved from the internet at Jan. 24, 2023 from <URL:https://rruff.info/doclib/hom/spodumene.pdf>] (Year: 2001).*

Arvaniti et al., "Determination of particle size, surface area, and shape of supplementary cementious materials by different techniques", Materials and Structures, 48, 3687-3701, Oct. 4, 2014.

* cited by examiner

ALUMINOSILICATES, RELATED PROCESSES AND USES THEREOF AS SUPPLEMENTARY CEMENTING MATERIALS

CROSS-REFERENCE TO RELATED APPLICATIONS

The present application is a 35 USC 371 national stage entry of PCT/CA2019/051697 filed on Nov. 27, 2019 and which claims priority to Canadian Application No. 3,050,268 filed on Jul. 19, 2019. These documents are hereby incorporated by reference in their its entirety.

FIELD

The present application generally refers to aluminosilicates and more particularly to aluminosilicates as a cementing agent and the processes for the manufacture of such aluminosilicates.

BACKGROUND

The production of clinker powder, an important component of Portland cement, alone generates nearly one metric ton of $CO_2$, a well-known greenhouse gas, for every ton of clinker produced. Since the majority of the world's cement production (about 5 gigatons per year) is used to make concrete, many efforts have been made in recent years to reduce the environmental impact of concrete production. For example, one approach is to partially replace the clinker with inert fillers, such as limestone, or reactive minerals with a low carbon footprint. These minerals are commonly referred to as supplementary cementing materials (SCMs).

Aluminum silicates are silicates wherein tetrahedron groups $[SiO_4]^{4-}$ are joined together by aluminum atoms. They belong to a family consisting essentially of andalusite, disthene (or kyanite) and sillimanite, minerals of the same chemical composition as $Al_2SiO_5$ but with different crystallographic characteristics (polymorphism). Other minerals may also resemble this family, such as mullite, staurotide and topaz (Foucault et al., 2010). Aluminosilicates are silicates wherein some silicon atoms are replaced by aluminum atoms. This replacement results in a charge deficit that must be balanced by the introduction of cations such as Na+, K+ or $Ca_2$+. Feldspar and zeolites that correspond to this definition (Foucault et al., 2010; Chieh, 1998) are referred to herein as "aluminum silicate".

Due to their physico-chemical properties (chemically and thermally stable, good adsorption capacity, pozzolanic properties, etc.), there are many industrial applications for aluminum silicates. In effect, aluminum silicates are mineral substances used in the manufacture of refractory materials (coarse particles: 0.6 cm to 2.5 cm), ceramics (fine particles), zeolites or even glass.

However, there is a need for supplementary cementing materials that may partially replace clinker and are at least as effective as the supplementary cementing materials commonly used.

SUMMARY

In a first aspect, the disclosure comprises an aluminosilicate having a Blaine fineness of about 500 $m^2$/kg to about 3000 $m^2$/kg and/or a specific surface area of about 4 $m^2$/g to about 20 $m^2$/g.

In another aspect, the disclosure comprises a use of an aluminosilicate, described herein as a supplementary cementing material, in the preparation of cement, in the preparation of concrete and/or in the preparation of mortar.

In another aspect, the disclosure comprises a dry cement composition comprising a hydraulic binder and aluminosilicate, said aluminosilicate having a Blaine fineness of about 500 $m^{21}$ kg to about 3000 $m^2$/kg; and/or a specific surface area of about 4 $m^2$/g to about 20 $m^2$/g.

In yet another aspect, there is provided a composition of mortar or concrete comprising at least:
  a hydraulic binder comprising clinker and aluminosilicate;
  aggregates; and
  water.

In yet another aspect, there is provided a composition of mortar or concrete comprising at least:
  a hydraulic binder comprising clinker and at least 1% by weight of aluminosilicate;
  aggregates; and
  water.

In yet another aspect, there is provided a composition of mortar or concrete comprising at least:
  a hydraulic binder comprising clinker and at least 4% by weight of aluminosilicate;
  aggregates; and
  water.

In another aspect, the disclosure comprises a mortar or concrete composition comprising at least:
  a hydraulic binder comprising clinker and aluminosilicate, said aluminosilicate having a Blaine fineness of about 500 $m^{21}$ kg to about 3000 $m^2$/kg; and/or a specific surface area of about 4 $m^2$/g to about 20 $m^2$/g;
  aggregates; and
  water.

In another aspect, the disclosure comprises a process for manufacturing aluminosilicate comprising:
  roasting a concentrate of spodumene in an acid medium;
  leaching the acidic roasted spodumene concentrate so as to obtain a mixture comprising a solid comprising aluminosilicate and a leachate; and
  separating the aluminosilicate from the leachate in an acid medium,
  wherein said aluminosilicate contains a calcium concentration of less than about 5%.

In another aspect, the disclosure comprises a lithium extraction process comprising:
  roasting a concentrate of spodumene in an acid medium;
  leaching the acidic roasted spodumene concentrate so as to obtain a mixture comprising a solid comprising aluminosilicate and a leachate; and
  separating the aluminosilicate from the leachate in an acid medium,
  wherein at least about 75% of the lithium contained in the spodumene is comprised in said leachate.

The methods, devices and uses previously discussed confer several advantages over the technological solutions proposed in the prior art. Some of these benefits are listed below.

BRIEF DESCRIPTIONS OF THE DRAWINGS

In the following drawings, which represent by way of example only, various embodiments of the disclosure:

DETAILED DESCRIPTION OF THE PRESENT DISCLOSURE

Figure 1:
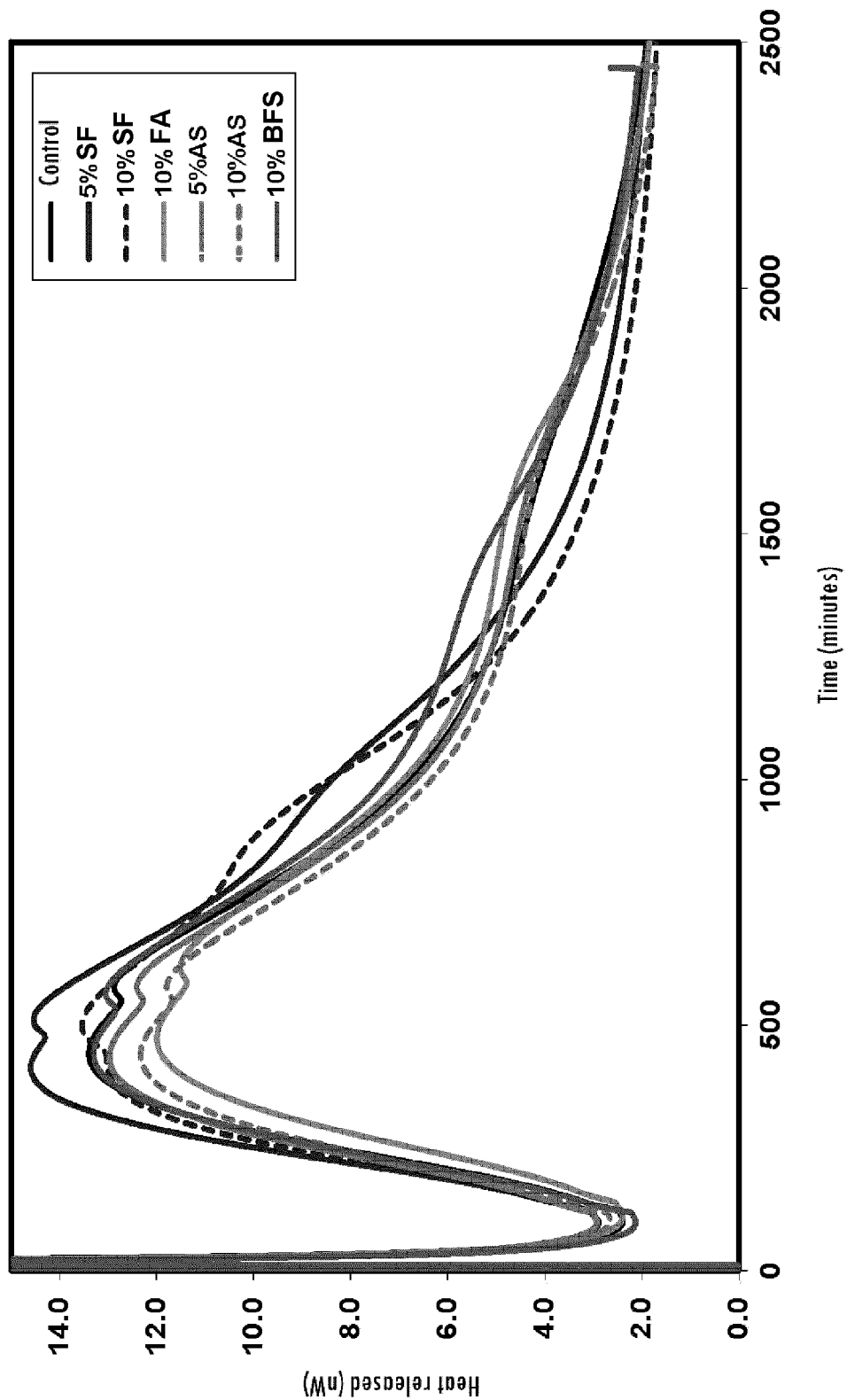
FIG. 1 shows hydration heat release curves for general use (GU) cement pastes incorporating 5% to 10% aluminosilicate (AS), silica fume (SF), fly ash (FA) or blast furnace slag (BFS).

Several embodiments are described in the present application, and are presented by way of illustration only. The embodiments described are not intended to be restrictive in any way. The present disclosure is applicable to numerous embodiments, as is evident in the disclosure described hereinafter. The person skilled in the art will recognize that the present disclosure may be put into practice with modifications and changes without departing from the teachings disclosed. Although particular characteristics of the present disclosure may be described in reference to one or more particular embodiments or illustrations, it shall be understood that these characteristics are not limited to a use in one or more particular embodiments or illustrations in reference to which they are described.

Unless otherwise indicated, the definitions and examples described herein are intended to be applicable to all embodiments and aspects of the present disclosure herein described for which they are suitable as would be understood by a person skilled in the art.

As used herein, the term "hydraulic binder" means a substance that in the presence of water undergoes a hydration chemical reaction and hardens. The hydraulic binder has the ability to bin other materials together such as supplementary cementing materials and aggregates. Non-limiting examples of hydraulic binders include general use (GU) cement, CEM I cement, CEM II cement, CEM III cement, CEM IV cement, CEM V cement, clinker, and mixtures thereof.

As used herein, the term "aggregate" means chemically inert, solid bodies that may come in various shapes, sizes, and materials ranging from fine particles of sand to large, coarse rocks. The aggregates may be natural, manufactured or recycled. Non-limiting examples of aggregates include sand, crushed stone, gravel, recycled concrete, geosynthetic aggregates. In the context of concrete materials, the aggregates are solid bodies held together by the cement, and provide compressive strength and bulk to concrete.

As used herein, the term "hydration heat" means the heat that is generated when water is mixed with a cement mixture (which may comprise cement, supplementary cementing material such as aluminum silicate, and other materials commonly included in concretes, including aggregates). Mixing of water to the cement mixture causes hardening of the mixture, through the exothermic chemical process of hydration. For example, the hydration heat is measured at the apex of the hydration heat curve i.e. the highest temperature recorded during heat liberation.

The terms "an embodiment", "embodiment", "embodiments", "the embodiment", "the embodiments", "one or more embodiments", and "certain embodiments" mean "one or more (but not all) embodiments of the present disclosure(s)", unless expressly specified otherwise.

Furthermore, although the steps of a method, a process, or the like may be described (in the disclosure and/or claims)

in a sequential order, such method or process may be configured to work in an alternative order. In addition, any sequence or order of steps that may be described does not necessarily indicate a requirement for the steps to be performed in that order. The steps of the processes methods described herein may be performed in any order that is convenient. Moreover, some steps may be performed simultaneously.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

As used in this disclosure, the singular forms "a", "an" and "the" include plural references unless the content clearly dictates otherwise. In examples comprising an "additional" or "second" component, the second component as used herein is different from the other components or first component. A "third" component is different from the other, first, and second components, and further enumerated or "additional" components are similarly different.

As used herein, the term "substantially" means that the specified term is modified to a degree of 10% or less, preferably 5% or less or more preferably 1% or less, in a way that is recognized by a person skilled in the art as being reasonable and typical.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

Moreover, the recitation of numerical ranges by end points herein comprises all numbers and fractions within this range (for example, 1 to 5 comprises 1, 1.5, 2, 2.75, 3, 3.90, 4 and 5). It is also understood that all the numbers and fractions thereof are assumed to be modified by the term "about" which means a variation up to a certain quantity of the number to which reference is made if the final result does not change significantly.

In addition, the expression "and/or" as used herein means an inclusive "or". In other words, "X and/or Y", for example, means X or Y or both, and "X, Y and/or Z" means X or Y or Z or any possible combination thereof.

In a first aspect, the disclosure comprises an aluminosilicate having a Blaine fineness of about 500 m$^2$/kg to about 3000 m$^2$/kg and/or a specific surface area of about 4 m$^2$/g to about 20 m$^2$/g.

For example, said aluminosilicate has a Blaine fineness of about 750 m$^2$/kg to about 2500 m$^2$/kg. For example, said aluminosilicate has a Blaine fineness of about 1000 m$^2$/kg to about 2000 m$^2$/kg. For example, said aluminosilicate has a Blaine fineness of about 1250 m$^2$/kg to about 2000 m$^2$/kg. For example, said aluminosilicate has a Blaine fineness of about 1500 m$^2$/kg to about 2000 m$^2$/kg.

For example, said aluminosilicate has a specific surface area of about 4 m$^2$/g to about 15 m$^2$/g. For example, said aluminosilicate has a specific surface area of about 5 m$^2$/g to about 11 m$^2$/g. For example, said aluminosilicate has a specific surface area of about 6 m$^2$/g to about 10 m$^2$/g. For example, said aluminosilicate has a specific surface area of about 7 m$^2$/g to about 11 m$^2$/g. For example, said aluminosilicate has a specific surface area of about 8 m$^2$/g to about 10 m$^2$/g. For example, said aluminosilicate has a specific surface area of at least about 5 m$^2$/g.

For example, said aluminosilicate has a density of about 2 g/cm$^2$ to about 3 g/cm$^2$. For example, said aluminosilicate has a density of about 2.25 g/cm$^2$ to about 3 g/cm$^2$. For example, said aluminosilicate has a density of about 2.5 g/cm$^2$ to about 3 g/cm$^2$.

For example, said aluminosilicate has a passing rate at 45 μm of about 40% to 90%. For example, said aluminosilicate has a passing rate at 45 μm of about 45% to 75%. For example, said aluminosilicate has passing rate at 45 μm of about 45% to 65%. For example, said aluminosilicate has a passing rate at 45 μm of about 45% to 55%. For example, said aluminosilicate has a passing rate at 45 μm of about 48% to 52%.

For example, said aluminosilicate has a silica content of about 66% to about 90%. For example, said aluminosilicate has a silica content of about 66% to about 85%. For example, said aluminosilicate has a silica content of about 66% to about 80%. For example, said aluminosilicate has a silica content of about 66% to about 75%.

For example, said aluminosilicate has an alumina content of about 10% to 45%. For example, said aluminosilicate has an alumina content of about 15% to 40%. For example, said aluminosilicate has an alumina content of about 20% to 30%. For example, said aluminosilicate has an alumina content of about 23% to 27%.

For example, said aluminosilicate contains less than 10% alkali metal or alkaline earth metal content. For example, said aluminosilicate contains less than 5% alkali metal or alkaline earth metal content. For example, said aluminosilicate contains less than 4% alkali metal or alkaline earth metal content. For example, said aluminosilicate contains less than 3% alkali metal or alkaline earth metal content. For example, said aluminosilicate contains less than 2% alkali metal or alkaline earth metal content. For example, said aluminosilicate contains less than 1% alkali metal or alkaline earth metal content.

For example, said alkali metals are selected from Li, Na and K. For example, said alkaline earth metals are selected from Mg and Ca.

For example, said aluminosilicate contains less than 5% calcium content. For example, said aluminosilicate contains less than 4% calcium content. For example, said aluminosilicate contains less than 3% calcium content. For example, said aluminosilicate contains less than 2% calcium content. For example, said aluminosilicate contains less than 1% calcium content. For example, said aluminosilicate contains less than 0.5% calcium content. For example, said aluminosilicate contains less than 0.21% calcium content. For example, said aluminosilicate contains less than 0.1% calcium content. For example, said aluminosilicate comprising about 0.1% to about 10% calcium content. For example, said aluminosilicate comprising about 0.1% to about 5% calcium content. For example, said aluminosilicate comprising about 0.1% to about 3% calcium content. For example, said aluminosilicate comprising about 0.1% to about 1% calcium content. For example, said calcium is in the form of gypsum. For example, said calcium is in the form of CaO.

For example, said aluminosilicate has a moisture content of less than 10%. For example, said aluminosilicate has a moisture content of less than 7%. For example, said aluminosilicate has a moisture content of less than 5%.

For example, said aluminosilicate has a moisture content of less than 3%. For example, said aluminosilicate has a moisture content of less than 2%. For example, said aluminosilicate has a moisture content of less than 1%. For example, said aluminosilicate has a moisture content of less than 0.8%. For example, said aluminosilicate has a moisture content of less than 0.6%. For example, said aluminosilicate has a moisture content of less than 0.4%.

For example, said aluminosilicate is in an amorphous (non-crystallized) state.

For example, said aluminosilicate is in the crystalline state.

One aspect of the present disclosure comprises the use of an aluminosilicate described herein as a supplementary cementing material.

One aspect of the present disclosure comprises the use of an aluminosilicate described herein in the preparation of cement.

One aspect of the present disclosure comprises the use of an aluminosilicate described herein as a supplementary cementing material in the preparation of Portland cement.

One aspect of the present disclosure comprises the use of an aluminosilicate described herein in the preparation of concrete.

One aspect of the present disclosure comprises the use of an aluminosilicate described herein in the preparation of mortar.

One aspect of the present disclosure comprises the use of an aluminosilicate described herein in place of silica fume (SF), fly ash (FA) and/or blast furnace slag (BFS) as a supplementary cementing material.

One aspect of the present disclosure comprises the use of an aluminosilicate described herein in place of silica fume (SF), fly ash (FA) and/or blast furnace slag (BFS) in the preparation of cement.

One aspect of the present disclosure comprises the use of an aluminosilicate described herein in place of silica fume (SF), fly ash (FA) and/or blast furnace slag (BFS) in the preparation of concrete.

One aspect of the present disclosure comprises the use of an aluminosilicate described herein to improve the performance of cement and/or concrete.

One aspect of the present disclosure comprises a dry cement composition comprising a hydraulic binder and aluminosilicate, said aluminosilicate having a Blaine fineness of about 500 $m^2$/kg to about 3000 $m^2$/kg; and/or a specific surface area of about 4 $m^2$/g to about 20 $m^2$/g.

For example, said composition comprises between about 5% and about 60% of said aluminosilicate. For example, said composition comprises between about 5% and about 50% of said aluminosilicate. For example, said composition comprises between about 5% and about 45% of said aluminosilicate. For example, said composition comprises between about 5% and about 35% of said aluminosilicate. For example, said composition comprises between about 5% and about 25% of said aluminosilicate. For example, said composition comprises between about 5% and about 15% of said aluminosilicate. For example, said composition comprises between about 15% and about 45% of said aluminosilicate. For example, said composition comprises between about 25% and about 45% of said aluminosilicate. For example, said composition comprises between about 35% and about 45% of said aluminosilicate. For example, said composition comprises between about 15% and about 35% of said aluminosilicate. For example, said composition comprises between about 15% and about 25% of said aluminosilicate. For example, said composition comprises between about 25% and about 35% of said aluminosilicate.

For example, said hydraulic binder is selected from general purpose cement, CEM I cement, CEM II cement, CEM III cement, CEM IV cement, CEM V cement, clinker, and mixtures thereof.

For example, said general purpose cement is Portland cement.

In yet another aspect, there is provided a composition of mortar or concrete comprising at least:
a hydraulic binder comprising clinker and aluminosilicate;
aggregates; and
water.

In yet another aspect, there is provided a composition of mortar or concrete comprising at least:
a hydraulic binder comprising clinker and at least 1% by weight of aluminosilicate;
aggregates; and
water.

In yet another aspect, there is provided a composition of mortar or concrete comprising at least:
a hydraulic binder comprising clinker and at least 4% by weight of aluminosilicate;
aggregates; and
water.

In another aspect, the disclosure comprises a mortar or concrete composition comprising at least:
a hydraulic binder comprising clinker and aluminosilicate, said aluminosilicate having a Blaine fineness of about 500 $m^{21}$ kg to about 3000 $m^2$/kg; and/or a specific surface area of about 4 $m^2$/g to about 20 $m^2$/g;
aggregates; and
water.

For example, the aluminosilicate has a Blaine fineness as described above. For example, the aluminosilicate has a specific surface area as described above.

For example, said binder comprises about 5% to about 60% of said aluminosilicate. For example, said binder comprises about 5% to about 50% of said aluminosilicate. For example, said binder comprises about 5% and to about 45% of said aluminosilicate. For example, said binder comprises about 5% to about 35% of said aluminosilicate. For example, said binder comprises about 5% to about 25% of said aluminosilicate. For example, said binder comprises about 5% to about 15% of said aluminosilicate. For example, said binder comprises about 10% to about 25% of said aluminosilicate. For example, said binder comprises about 15% to about 45% of said aluminosilicate. For example, said binder comprises about 25% to about 45% of said aluminosilicate. For example, said binder comprises about 35% to about 45% of said aluminosilicate. For example, said binder comprises about 15% to about 35% of said aluminosilicate. For example, said binder comprises about 15% to about 25% of said aluminosilicate. For example, said binder comprises about 25% to about 35% of said aluminosilicate.

For example, said composition has a hydration heat of less than about 60° C., as measured using RILEM TC119 (97)— Section 7.2. For example, said composition has a hydration heat of less than about 50° C., as measured using RILEM TC119 (97)—Section 7.2. For example, said composition has a hydration heat of about 40° C. to about 50° C., as measured using RILEM TC119 (97)—Section 7.2. For example, said composition has a hydration heat of about 42° C. to about 49° C., as measured using RILEM TC119 (97)—Section 7.2. For example, said composition has a hydration heat of about 45° C. to about 49° C., as measured using RILEM TC119 (97)—Section 7.2. For example, a a pre-calibrated semi-adiabatic calorimeter developed allowing to perform the test.

For example, said composition, when hardened, has a shrinkage rate of less than about 260 μm/m at 14 days, as measured according to the CSA A23.2-21C Standard. For example, said composition, when hardened, has a shrinkage rate of less than about 240 μm/m at 14 days, as measured according to the CSA A23.2-21C Standard. For example, said composition, when hardened, has a shrinkage rate of less than about 220 μm/m at 14 days, as measured according to the CSA A23.2-21C Standard. For example, said composition, when hardened, has a shrinkage rate of about 200 to about 260 μm/m at 14 days, as measured according to the CSA A23.2-21C Standard.

For example, said composition, when hardened, has a shrinkage rate of less than about 320 μm/m at 28 days, as measured according to the CSA A23.2-21C Standard. For example, said composition, when hardened, has a shrinkage rate of less than about 300 μm/m at 28 days, as measured according to the CSA A23.2-21C Standard. For example, said composition, when hardened, has a shrinkage rate of less than about 280 μm/m at 28 days, as measured according to the CSA A23.2-21C Standard. For example, said composition, when hardened, has a shrinkage rate of about 200 to about 300 μm/m at 28 days, as measured according to the CSA A23.2-21C Standard. For example, said composition, when hardened, has a shrinkage rate of about 260 to about 320 μm/m at 28 days, as measured according to the CSA A23.2-21C Standard. For example, said composition, when hardened, has a shrinkage rate of less than about 380 μm/m at 56 days, as measured according to the CSA A23.2-21C Standard. For example, said composition, when hardened, has a shrinkage rate of less than about 360 μm/m at 56 days, as measured according to the CSA A23.2-21C Standard. For example, said composition, when hardened, has a shrinkage rate of less than about 340 μm/m at 56 days, as measured according to the CSA A23.2-21C Standard. For example, said composition, when hardened, has a shrinkage rate of about 300 to about 380 μm/m at 56 days, as measured according to the CSA A23.2-21C Standard. For example, said composition, when hardened, has a shrinkage rate of about 300 to about 350 μm/m at 56 days, as measured according to the CSA A23.2-21C Standard.

For example, said composition, when hardened, has an air content of about 4.0% to about 9.0%, as measured according to the ASTM C457 Standard. For example, said composition, when hardened, has an air content of about 5.0% to about 6.5%, as measured according to the ASTM C457 Standard. For example, said composition, when hardened, has an air content of about 5.5% to about 6.0%, as measured according to the ASTM C457 Standard.

For example, said composition, when hardened, has a spacing factor of about 180 μm to about 300 μm, as measured according to the ASTM C457 Standard. For example, said composition, when hardened, has a spacing factor of about 225 μm to about 275 μm, as measured according to the ASTM C457 Standard.

For example, said composition, when hardened, has a relative dynamic modulus of elasticity of about 60% to about 99%, as measured according to ASTM C666 procedure A. For example, said composition, when hardened, has a relative dynamic modulus of elasticity of about 80% to about 99%, as measured according to ASTM C666 procedure A. For example, said composition, when hardened, has a relative dynamic modulus of elasticity of about 92% to about 99%, as measured according to ASTM C666 procedure A.

For example, said composition has a water/binder ratio of about 0.4 to about 0.6.

For example, said composition further comprises an admixture. For example, said admixture is a water reducer, an accelerator, a setting retarder, a plasticizer, a viscosity modifier, an air entrainer.

For example, said aggregates are selected from sand, crushed stone, gravel and mixtures thereof.

For example, said composition has a content of said hydraulic binder of about 250 kg/m$^3$ of said composition to about 600 kg/m$^3$ of said composition. For example, said composition has a content of said hydraulic binder of about 350 kg/m$^3$ of said composition to about 400 kg/m$^3$ of said composition. For example, said composition has a content of said hydraulic binder of about 370 kg/m$^3$ of said composition to about 390 kg/m$^3$ of said composition.

For example, said composition having a compressive strength of about 7 to about 24 MPa after 7 days of curing, as measured according to the ASTM C109/C109M-16a standard.

For example, said composition having a compressive strength of about 16 to about 34 MPa after 28 days of curing, as measured according to the ASTM C109/C109M-16a standard.

For example, said composition has a pozzolanic activity index of about 30 to about 110% after 7 days, as measured according to the ASTM C618 standard.

For example, said composition has a pozzolanic activity index of about 55 to about 120% after 28 days, as measured according to the ASTM C618 standard.

For example, said composition has a compressive strength at 1 day of curing of about 5 MPa to about 25 MPa, as measured according to the ASTM C39 standard. For example, said composition has a compressive strength at 1 day of curing of about 10 MPa to about 25 MPa, as measured according to the ASTM C39 standard. For example, said composition has a compressive strength at 1 day of curing of about 15 MPa to about 25 MPa, as measured according to the ASTM C39 standard. For example, said composition has a compressive strength at 1 day of curing of about 20 MPa to about 25 MPa, as measured according to the ASTM C39 standard.

For example, said composition has a compressive strength at 7 days of curing of about 15 MPa to about 45 MPa, as measured according to the ASTM C39 standard. For example, said composition has a compressive strength at 7 days of curing of about 20 MPa to about 45 MPa, as measured according to the ASTM C39 standard. For example, said composition has a compressive strength at 7 days of curing of about 25 MPa to about 45 MPa, as measured according to the ASTM C39 standard. For example, said composition has a compressive strength at 7 days of curing of about 30 MPa to about 45 MPa, as measured according to the ASTM C39 standard. For example, said composition has a compressive strength at 7 days of curing of about 35 MPa to about 45 MPa, as measured according to the ASTM C39 standard.

For example, said composition has a compressive strength at 28 days of curing of about 35 MPa to about 60 MPa, as measured according to the ASTM C39 standard. For example, said composition has a compressive strength at 28 days of curing of about 40 MPa to about 60 MPa, as measured according to the ASTM C39 standard. For example, said composition has a compressive strength at 28 days of curing of about 45 MPa to about 60 MPa, as measured according to the ASTM C39 standard. For example, said composition has a compressive strength at 28 days of curing of about 50 MPa to about 60 MPa, as measured according to the ASTM C39 standard.

For example, said composition has a compressive strength at 91 days of curing of about 40 MPa to about 65 MPa, as measured according to the ASTM C39 standard. For example, said composition has a compressive strength at 91 days of curing of about 45 MPa to about 65 MPa, as measured according to the ASTM C39 standard. For example, said composition has a compressive strength at 91 days of curing of about 55 MPa to about 65 MPa, as measured according to the ASTM C39 standard. For example, said composition has a compressive strength at 91 days of curing of about 60 MPa to about 65 MPa, as measured according to the ASTM C39 standard.

For example, said composition has a flexural strength at 28 days of curing of about 7 MPa to about 9 MPa, as measured according to the ASTM C78 standard. For example, said composition has a flexural strength at 28 days of about 7.5 MPa to about 9 MPa, as measured according to the ASTM C78 standard. For example, said composition has a flexural strength of at 28 days of curing about 8 MPa to about 9 MPa, as measured according to the ASTM C78 standard.

For example, said composition has a flexural strength at 91 days of curing of about 8 MPa to about 10 MPa, as measured according to the ASTM C78 standard. For example, said composition has a flexural strength at 91 of curing days of about 8.5 MPa to about 10 MPa, as measured according to the ASTM C78 standard. For example, said composition has a flexural strength at 91 days of curing of about 9 MPa to about 10 MPa, as measured according to the ASTM C78 standard. For example, said composition has a flexural strength at 91 days of curing of about 9.5 MPa to about 10 MPa, as measured according to the ASTM C78 standard.

For example, said composition has a tensile strength at 28 of curing days of about 3 MPa to about 5 MPa, as measured according to the ASTM C496 standard. For example, said composition has a tensile strength at 28 days of curing of about 3.5 MPa to about 5 MPa, as measured according to the ASTM C496 standard. For example, said composition has a tensile strength at 28 days of curing of about 4 MPa to about 5 MPa, as measured according to the ASTM C496 standard. For example, said composition has a tensile strength at 28 days of curing of about 4.5 MPa to about 5 MPa, as measured according to the ASTM C496 standard.

For example, said composition has a chloride ion penetrability at 56 days of curing of about 1000 coulombs to about 3500 coulombs, as measured according to the ASTM C1202 standard. For example, said composition has a chloride ion penetrability at 56 days of curing of about 1250 coulombs to about 3500 coulombs, as measured according to the ASTM C1202 standard. For example, said composition has a chloride ion penetration rate at 56 days of curing of about 1500 coulombs to about 3500 coulombs, as measured according to the ASTM C1202 standard. For example, said composition has a chloride ion penetrability at 56 days of curing of about 2000 coulombs to about 3500 coulombs, as measured according to the ASTM C1202 standard. For example, said composition has a chloride ion penetrability at 56 days of curing of about 2500 coulombs to about 3500 coulombs, as measured according to the ASTM C1202 standard. For example, said composition has a chloride ion penetrability at 56 days of curing of about 3000 coulombs to about 3500 coulombs, as measured according to the ASTM C1202 standard.

For example, said composition has a chloride ion penetrability at 28 days of curing of about 400 coulombs to about 2000 coulombs, as measured according to the ASTM C1202 standard. For example, said composition has a chloride ion penetrability at 28 days of curing of about 400 coulombs to about 1500 coulombs, as measured according to the ASTM C1202 standard. For example, said composition has a chloride ion penetrability at 28 days of curing of about 450 coulombs to about 650 coulombs, as measured according to the ASTM C1202 standard. For example, said composition has a chloride ion penetrability at 28 days of curing of about 500 coulombs to about 600 coulombs, as measured according to the ASTM C1202 standard.

For example, said composition has a chloride ion penetrability at 56 days of curing of about 400 coulombs to about 2000 coulombs, as measured according to the ASTM C1202 standard. For example, said composition has a chloride ion penetrability at 56 days of curing of about 400 coulombs to about 1500 coulombs, as measured according to the ASTM C1202 standard. For example, said composition has a chloride ion penetrability at 56 days of curing of about 400 coulombs to about 600 coulombs, as measured according to the ASTM C1202 standard. For example, said composition has a chloride ion penetrability at 56 days of curing of about 450 coulombs to about 550 coulombs, as measured according to the ASTM C1202 standard.

For example, said composition has a chloride ion penetrability at 91 days of curing of about 400 coulombs to about 2000 coulombs, as measured according to the ASTM C1202 standard. For example, said composition has a chloride ion penetrability at 91 days of curing of about 400 coulombs to about 1500 coulombs, as measured according to the ASTM C1202 standard. For example, said composition has a chloride ion penetrability at 91 days of curing of about 400 coulombs to about 600 coulombs, as measured according to the ASTM C1202 standard. For example, said composition has a chloride ion penetrability at 91 days of curing of about 450 coulombs to about 550 coulombs, as measured according to the ASTM C1202 standard.

For example, said composition, when hardened, has a resistivity of 100 to 250 Ω·m at 28 days. For example, said composition, when hardened, has a resistivity of 125 to 225 Ω·m at 28 days. For example, said composition, when hardened, has a resistivity of 100 to 250 Ω·m at 91 days. For example, said composition, when hardened, has a resistivity of 125 to 225 Ω·m at 91 days. For example, said composition, when hardened, has a resistivity of 100 to 300 Ω·m at 180 days. For example, said composition, when hardened, has a resistivity of 125 to 250 Ω·m at 180 days.

For example, said composition, when hardened, has about 8% to about 25% of permeable voids at 180 days, as measured according to the ASTM C642 standard. For example, said composition, when hardened, has about 8% to about 16% of permeable voids at 180 days, as measured according to the ASTM C642 standard. For example, said composition, when hardened, has about 11% to about 13% of permeable voids at 180 days, as measured according to the ASTM C642 standard.

For example, said composition, when hardened, has a Na+ concentration in solution of less than about 125 mmol/L, as measured by pore solution extraction. For example, said composition, when hardened, has a Na+ concentration in solution of less than about 100 mmol/L, as measured by pore solution extraction. For example, said composition, when hardened, has a Na+ concentration in solution of about 40 mmol/L to about 100 mmol/L, as measured by pore solution extraction.

For example, said composition, when hardened, has a K+ concentration in solution of less than about 250 mmol/L, as measured by pore solution extraction. For example, said composition, when hardened, has a K+ concentration in solution of less than about 200 mmol/L, as measured by pore solution extraction. For example, said composition, when hardened, has a K+ concentration in solution of about 100 mmol/L to about 175 mmol/L, as measured by pore solution extraction.

For example, said composition, when hardened, has a Cl-concentration in solution of less than about 20 mmol/L, as measured by pore solution extraction. For example, said composition, when hardened, has a Cl-concentration in solution of less than about 17 mmol/L, as measured by pore solution extraction. For example, said composition, when hardened, has a Cl-concentration in solution of less than about 15 mmol/L, as measured by pore solution extraction. For example, said composition, when hardened, has a Cl-concentration in solution of about 10 mmol/L to about 20 mmol/L, as measured by pore solution extraction. For example, said composition, when hardened, has a Cl-concentration in solution of about 10 mmol/L to about 15 mmol/L, as measured by pore solution extraction.

For example, said composition, when hardened, has a OH-concentration in solution of less than about 350 mmol/L, as measured by pore solution extraction. For example, said composition, when hardened, has a OH-concentration in solution of less than about 250 mmol/L, as measured by pore solution extraction. For example, said composition, when hardened, has a OH-concentration in solution of about 125 mmol/L to about 250 mmol/L, as measured by pore solution extraction. For example, said composition, when hardened, has a OH-concentration in solution of about 125 mmol/L to about 350 mmol/L, as measured by pore solution extraction.

For example, said composition has a durability factor over 300 freeze-thaw cycles of about 80% to about 120%, as measured according to the ASTM C666 standard (procedure A). For example, said composition has a durability factor over 300 freeze-thaw cycles of about 90% to about 110%, as measured according to the ASTM C666 standard (procedure A).

For example, said composition has a scaling of approximately 0.2 to 0.8 kg of debris/m2, as measured according to the ASTM C672 and/or MTO-LS412 standard. For example, said composition has a scaling of approximately 0.3 to 0.7 kg of debris/m2, as measured according to the ASTM C672 and/or MTO-LS412 standard.

For example, said composition is made of fresh concrete with a slump at 10 minutes of about 70 mm to about 100 mm, as measured according to the ASTM C143 standard. For example, said composition is made of fresh concrete with a slump at 10 minutes of about 75 mm to about 95 mm, as measured according to the ASTM C143 standard.

For example, said composition has an air content at 10 minutes of about 1% to about 4%. For example, said composition has an air content at 10 minutes of about 1.7% to about 2.1%. For example, said composition has an air content at 10 minutes of about 4% to about 10%. For example, said composition has an air content at 10 minutes of about 4% to about 9%. For example, said composition has an air content at 10 minutes of about 4% to about 8%.

For example, said composition is made of mortar.

For example, said composition is made of air-entrained concrete. For example, said composition is made of concrete without entrained air.

In another aspect, the disclosure comprises a process for manufacturing aluminosilicate comprising:
 roasting a concentrate of spodumene in an acid medium;
 leaching the acidic roasted spodumene concentrate so as to obtain a mixture comprising a solid comprising the aluminosilicate and a leachate; and
 separating the aluminosilicate from the leachate in an acid medium,
 wherein said aluminosilicate contains a calcium concentration of less than about 5%.

In another aspect, the disclosure comprises a lithium extraction process comprising:
 roasting a concentrate of spodumene in an acid medium;
 leaching the acidic roasted spodumene concentrate so as to obtain a mixture comprising a solid comprising the aluminosilicate and a leachate; and
 separating the aluminosilicate from the leachate in an acid medium,
 wherein at least about 75% of the lithium contained in the spodumene is comprised in said leachate.

For example, said lithium is in the form of lithium sulfate.

For example, said aluminosilicate contains a calcium concentration of less than about 4%. For example, said aluminosilicate contains a calcium concentration of less than about 3%. For example, said aluminosilicate contains a calcium concentration of less than about 2%. For example, said aluminosilicate contains a calcium concentration of less than about 1%. For example, said aluminosilicate contains a calcium concentration of less than about 0.9%. For example, said aluminosilicate contains a calcium concentration of less than about 0.8%. For example, said aluminosilicate contains a calcium concentration of less than about 0.7%.

For example, at least about 80% of the lithium contained in the spodumene is comprised in said leachate. For example, at least about 85% of the lithium contained in the spodumene is comprised in said leachate. For example, at least about 90% of the lithium contained in the spodumene is comprised in said leachate. For example, at least about 95% of the lithium contained in the spodumene is comprised in said leachate.

For example, said spodumene is pre-crushed to an average size of less than about 20 mm. For example, said spodumene is pre-crushed to an average size of less than about 15 mm. For example, said spodumene is pre-crushed to an average size of less than about 10 mm. For example, said spodumene is pre-crushed to an average size of less than about 5 mm. For example, said spodumene is pre-crushed to an average size of less than about 2 mm.

For example, the spodumene is calcined before roasting. For example, the spodumene is calcined at a temperature of about 800° C. to 1300° C. For example, the spodumene is calcined at a temperature of about 900° C. to 1200° C. For example, the spodumene is calcined at a temperature of about 1000° C. to 1100° C.

For example, following calcination, the spodumene is cooled.

For example, the spodumene concentrate is mixed with the acid prior to roasting in an acid medium.

For example, said acid is in excess of about 10% to about 50% with respect to the stoichiometry. For example, said acid is in excess of about 20% to about 40% with respect to the stoichiometry. For example, said acid is in excess of about 25% to about 35% with respect to the stoichiometry. For example, said acid is in excess of about 30% with respect to the stoichiometry.

For example, said acid has a pH of 5.0 or less. For example, said acid has a pH of 4.5 or less. For example, said acid has a pH of 4.0 or less. For example, said acid has a pH of 3.5 or less. For example, said acid has a pH of 3.0 or less. For example, said acid has a pH of 2.5 or less. For example, said acid has a pH of 2.0 or less. For example, said acid has a pH of about 2.0. For example, said acid has a pH of about 1.9. For example, said acid has a pH of about 1.8. For example, said acid has a pH of about 1.7. For example, said acid has a pH of about 1.6. For example, said acid has a pH of about 1.5. For example, said acid has a pH of about 1.4.

For example, the acid is chosen from HCl, $H_2SO_4$, $HNO_3$, acetic acid and mixtures thereof.

For example, the spodumene concentrate is mixed with the acid for a contact time of up to about 30 minutes. For example, the spodumene concentrate is mixed with the acid for about 10 minutes to about 30 minutes. For example, the spodumene concentrate is mixed with the acid for a time of up to about 15 minutes.

For example, the spodumene concentrate is mixed at a temperature between about 15° C. and 200° C. For example, the spodumene concentrate is mixed at a temperature between about 15° C. and 150° C. For example, the spodumene concentrate is mixed at a temperature between about 15° C. and 130° C. For example, the spodumene concentrate is mixed at a temperature between about 15° C. and 100° C. For example, the spodumene concentrate is mixed at a temperature between about 20° C. and 30° C. For example, the spodumene concentrate is mixed at a temperature between about 20° C. and 25° C.

For example, said spodumene concentrate is roasted in continuous mode. For example, said spodumene concentrate is roasted in batch mode. For example, said spodumene concentrate is roasted in an acid roasting reactor.

For example, said spodumene concentrate is roasted at a temperature of about 175° C. to about 300° C. For example, said spodumene concentrate is roasted at a temperature of about 200° C. to about 300° C. For example, said spodumene concentrate is roasted at a temperature of about 220° C. to about 280° C. For example, said spodumene concentrate is roasted at a temperature of about 230° C. to about 270° C.

For example, said spodumene concentrate is roasted for up to 60 minutes. For example, the spodumene concentrate is roasted for about 5 minutes to 30 minutes. For example, said spodumene concentrate is roasted for about 5 minutes to 20 minutes. For example, said spodumene concentrate is roasted for about 6 minutes to 15 minutes.

For example, following roasting, the spodumene is cooled.

For example, said acidic roasted spodumene concentrate is leached with water. For example, said acidic roasted spodumene concentrate is leached with water to dissolve the lithium sulfate contained in the leachate.

For example, said acidic roasted spodumene concentrate is leached at a temperature of about 30° C. to about 100° C. For example, said acidic roasted spodumene concentrate is leached at a temperature of about 50° C. to about 100° C. For example, said acidic roasted spodumene concentrate is leached at a temperature of about 60° C. to about 80° C. For example, said acidic roasted spodumene concentrate is leached at a temperature of about 65° C. to about 75° C. For example, said acidic roasted spodumene concentrate is leached at a temperature of about 70° C.

For example, the separation of said precipitated aluminosilicate from the leachate is carried out by filtration. For example, the separation of said precipitated aluminosilicate from the leachate is carried out by filtration on filter cloths.

For example, the process further comprises washing and/or drying said aluminosilicate to recover the lithium sulfate. For example, the process further comprises washing said aluminosilicate up to about ten times to recover the lithium sulfate. For example, the process further comprises washing said aluminosilicate once, twice, three times or four times to recover the lithium sulfate.

For example, the process further comprises washing said aluminosilicate with excess demineralized water.

For example, the precipitated aluminosilicate contains less than 5% lithium. For example, the precipitated aluminosilicate contains less than 3% lithium. For example, the precipitated aluminosilicate contains less than 1% lithium. For example, the precipitated aluminosilicate contains less than 0.8% lithium. For example, the precipitated aluminosilicate contains less than 0.6% lithium. For example, the precipitated aluminosilicate contains less than 0.5% lithium. For example, the precipitated aluminosilicate contains less than 0.4% lithium. For example, the precipitated aluminosilicate contains less than 0.3% lithium.

For example, the precipitated aluminosilicate contains less than 5% calcium. For example, the precipitated aluminosilicate contains less than 4% calcium. For example, the precipitated aluminosilicate contains less than 3% calcium. For example, the precipitated aluminosilicate contains less than 2% calcium. For example, the precipitated aluminosilicate contains less than 1% calcium.

For example, the precipitated aluminosilicate contains less than 5% gypsum. For example, the precipitated aluminosilicate contains less than 4% gypsum. For example, the precipitated aluminosilicate contains less than 3% gypsum. For example, the precipitated aluminosilicate contains less than 2% gypsum. For example, the precipitated aluminosilicate contains less than 1% gypsum.

For example, said process makes it possible to extract at least 80% of the lithium comprised in said spodumene concentrate. For example, said process makes it possible to extract at least 82% of the lithium comprised in said spodumene concentrate. For example, said process makes it possible to extract at least 84% of the lithium comprised in said spodumene concentrate.

For example, said process makes it possible to extract at least 86% of the lithium comprised in said spodumene concentrate. For example, said process makes it possible to extract at least 88% of the lithium comprised in said spodumene concentrate. For example, said process makes it possible to extract at least 90% of the lithium comprised in said spodumene concentrate.

For example, said leachate comprises dissolved lithium. For example, said leachate comprises dissolved lithium sulfate.

For example, the filtered leachate is mixed with a basic solution to increase the pH and precipitate at least one impurity selected from Fe, Al, Si, Mn, Mg and Ca and to obtain a purified lithium sulfate solution.

For example, the lithium sulfate solution is further purified by means of an ion-exchange membrane. For example, the purified lithium sulfate solution is subjected to an electro-membrane treatment to convert the lithium sulfate to lithium hydroxide. For example, the lithium hydroxide is subsequently converted to lithium carbonate.

EXAMPLES

The below presented examples are non-limitative and are used to better exemplify the compositions and processes of the present disclosure.

Example 1—Aluminosilicate Preparation and Lithium Extraction a) Concentrate Reception and Thermal Conversion The spodumene concentrate is transported from the mine and concentrator site to the Shawinigan process plant in 92-tonne railcars (100 short tons). The concentrate is discharged from one (1) railcar at a time, into a receiving hopper. A series of conveyors feed the concentrate stockpile. A front-end loader is used to reclaim the concentrate and send it via conveyors to a crushing system, which will reduce the top size less than 9.5 mm to less than 2 mm. The crushed concentrate is then sent to the Concentrate Silo. The Concentrate Silo live capacity will provide eighteen (18) hours of feed buffer for the calciner system.

Conveyors extract the concentrate from the silo and feed the calciner system via a bucket elevator. In the first step, the concentrate is preheated in three pre-heating cyclones. The concentrate is then calcined at 1,000 to 1,100° C. in the natural gas fired Flash Calciner. At this temperature the spodumene concentrate is converted from the alpha crystalline structure to the beta crystalline structure. Unlike alpha spodumene, beta-spodumene is amenable to sulphation (acid bake) and water leaching. The hot concentrate is separated from the hot off gases and is cooled in a series of Cooling Cyclones. Air used in the process flows counter current to the solids and acts as the pre-heating, transport and cooling medium. Hot flue gases from the calciner system are sent to a dedicated baghouse to remove any dust. The dust is recycled within the calcination system. The cleaned flue gas is exhausted to atmosphere.

Final cooling of the roasted concentrate is performed in a water cooled indirect Roasted Concentrate Cooler and stored in a Roasted Concentrate Silo. The silo has 26 hours of buffer capacity for the downstream acid bake sector.

b) Acid Bake

The roasted concentrate silo feeds the acid bake sector via a series of conveyors.

A mixture of fresh and recycled sulfuric acid is sprayed onto the beta-spodumene in a continuous Pug Mill with a stoichiometric ratio based on lithium grade and a slight predetermined excess. The homogeneous mixture is then fed to an indirect fired Acid Bake Kiln and heated up to between 200 and 300° C. The resulting reaction produces solid lithium sulfate and aluminum silicates. A wet vent scrubber draws the acidic vapors out of the Acid Bake Kiln, cools and cleans them before they are exhausted into the atmosphere. The Acid Bake Kiln is natural gas fired and the flue gases are vented to atmosphere.

Product of the acid bake kiln is cooled with water in and indirect Acid Bake Cooler to between 100 and 150° C. before being sent to leach.

c) Leaching

The sulfated concentrate consisting of solid lithium sulfate and aluminum-silicate gangue material is fed from the Acid Bake Cooler into the first of three Concentrate Leach Tanks. Wash water from a downstream belt filter, which will contain lithium sulfate in solution, and various miscellaneous recycle water streams, are also fed to the tank. Lithium sulfate and other sulfate salts, being soluble in water under these conditions, dissolve to the aqueous acidic phase.

The resulting slurry is pumped to the aluminum-silicate belt filter. Lithium sulfate solution is separated from the solid gangue material. Wash water is used in three (3) counter-current wash stages to recover the lithium sulfate solution trapped with the solid waste material. This filter cake, containing primarily aluminum-silicates, is shipped by truck offsite to clients.

Figure 14:
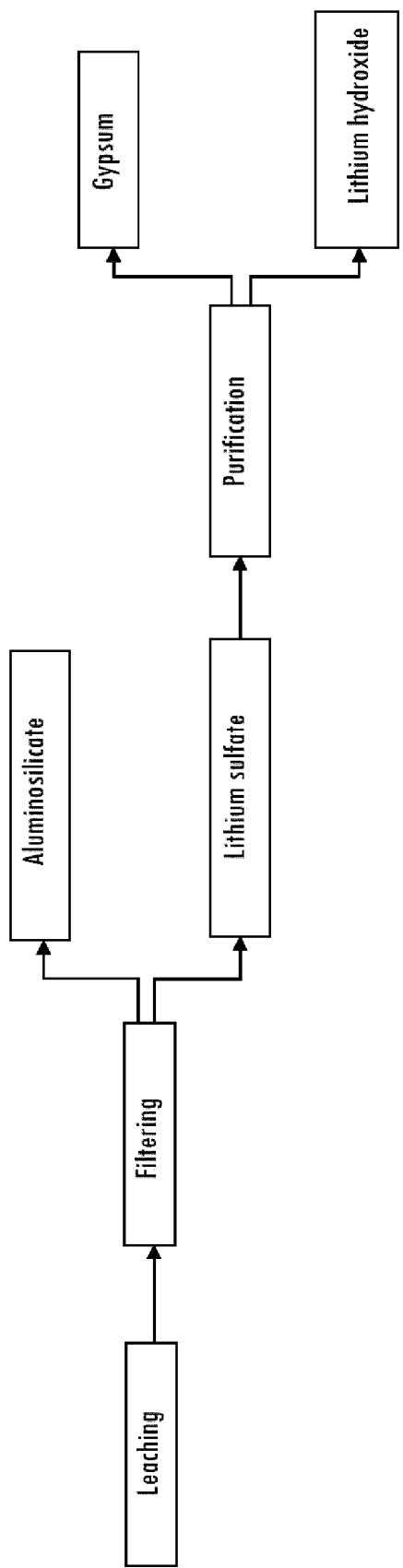
FIG. 14 is a diagram of the process for producing aluminosilicate and for extracting lithium extraction, in accordance with an embodiment.

The process for manufacturing aluminosilicate and extracting lithium is shown in FIG. 14.

Example 2—Production of Aluminum Silicates

Figure 13A:
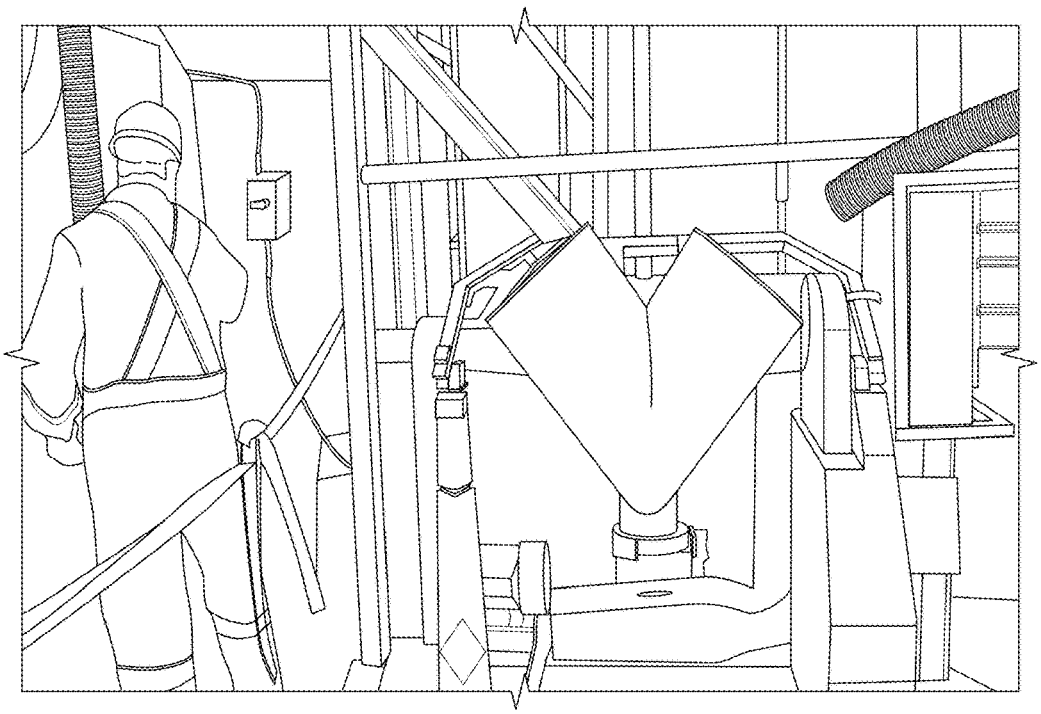
FIG. 13A is an image of a V-shaped mixer and FIG. 13B is an image of a four-zone kiln, diameter: 16 cm, length: 2 m.

The production of aluminum silicates was carried out at a semi-industrial scale. For this purpose, the following equipment was used:

V-shaped mixer, where the acid and spodumene are mixed for a period of 15 min at room temperature (~23-25° C.). Fifteen (15) kg of β-spodumene per batch were used with an excess of 30% acid with respect to the stoichiometry (see FIG. 13A).

Figure 13B:
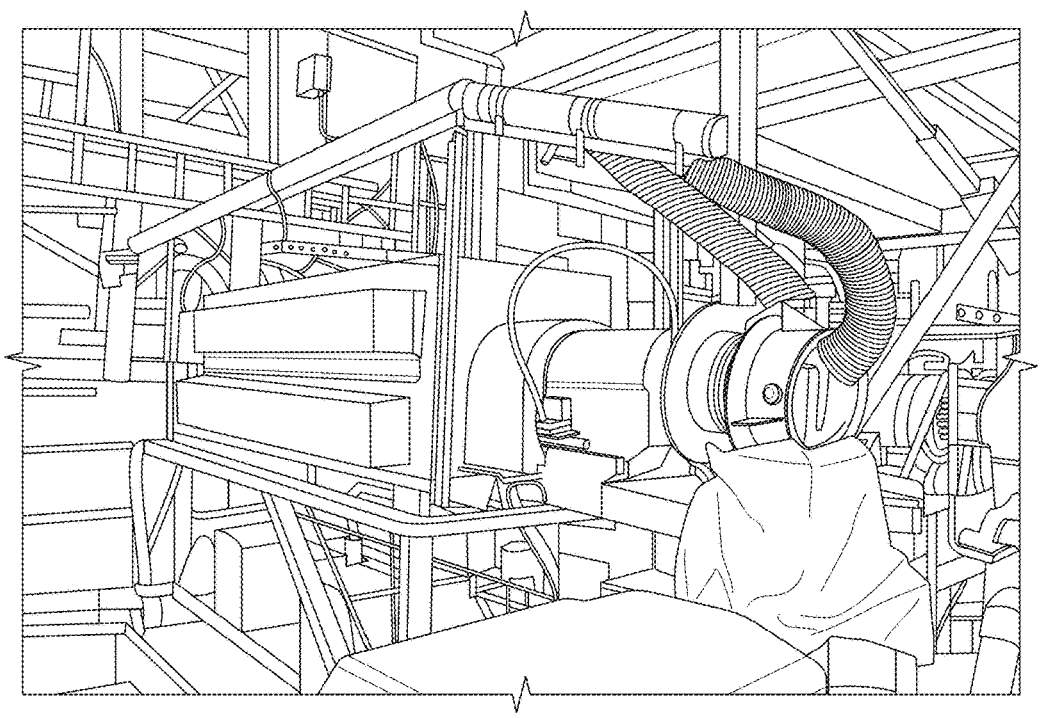

A kiln with four zones for continuous acid roasting (see FIG. 13B). This kiln is larger than the one used in the first phase, given the larger quantity to be produced.

Four conditions were tested: two temperatures and two residence times:

Temperature of 290° C. for 15 min;
Temperature of 290° C. for 6 min;
Temperature of 250° C. for 15 min;
Temperature of 250° C. for 6 min.

Water leaching was carried out to produce aluminum silicates. Three leachings were carried out at a semi-industrial scale on acid roasting products at 290° C. The solution temperature was varied by 35° C. and 70° C., Table 1 shows the conditions adopted. On the other hand, acid roasting products at 250° C. were leached with water at the laboratory scale (Table 2).

TABLE 1

Conditions of the various leaching tests carried out at pilot scale

| | Pilot test 1 | Pilot test 2 | Pilot test 3 |
| --- | --- | --- | --- |
| Acid roasting product | 6 min of roasting at 290° C. | 15 min of roasting at 290° C. | 15 min of roasting at 290° C. |
| Solid concentration (%) | 50 | 50 | 50 |
| Retention time (min) | 60 | 60 | 60 |
| Temperature (° C.) | 70 | 35 | 70 |
| Excess acid (%) | 30 | 30 | 30 |
| Agitation (rpm) | 250 | 250 | 250 |

TABLE 2

Conditions of the various leaching tests carried out at laboratory scale

|  | Lab test 1 | Lab test 2 | Lab test 3 | Lab test 4 |
|---|---|---|---|---|
| Acid roasting product | 6 min of roasting at 250° C. | 6 min of roasting at 250° C. | 15 min of roasting at 250° C. | 15 min of roasting at 250° C. |
| Solid concentration (%) | 50 | 50 | 50 | 50 |
| Retention time (min) | 60 | 60 | 60 | 60 |
| Temperature (° C.) | 35 | 70 | 35 | 70 |
| Excess acid (%) | 30 | 30 | 30 | 30 |
| Agitation (rpm) | 250 | 250 | 250 | 250 |

Filtration was carried out on filter cloths, followed by washing with excess demineralized water to drain all the lithium sulfates extracted. Lithium and impurity analyses were performed by inductively coupled plasma mass spectrometry (ICP-MS) on pregnant leach solutions (PLS), washing solutions (WSH) and aluminum silicates.

In Situ Precipitation

Water leaching tests were performed at 70° C. on an acid roasting product (290° C. for 6 min) wherein a precipitation step was performed after one hour of agitation by adding lime to the leaching pulp. The pH values of 2.0, 2.5, 3.0 and 3.5 were tested.

Analysis and Characterization of the Aluminum Silicates

The sample of β-spodumene (referred to as feed) was subjected to chemical analyses, real density measurement and particle size analysis. The chemical composition is presented in Table 3.

The lithium content is about 3.1%. The treated sample comes from a concentrator that uses dense medium separation and flotation as concentration processes.

The particle size analysis is finer. Instead of a p80 of 190 μm, the aluminum silicate sample shows a p80 of 100 μm. Without wishing to be bound to such a theory, it appears that this fineness is due to the fact that part of the sample is a flotation concentrate and the material was in effect calcined in a "flash calciner" instead of a rotary kiln.

Synthesis Performances of Aluminosilicates

Acid roasting was carried out for two residence times of 6 and 15 minutes. These correspond to the time spent in the zone where the temperature reaches a plateau (isothermal). The overall retention time is estimated at 15 and 30 min, respectively. In order to avoid condensation of the vapor at

TABLE 3

Chemical composition (%) of the feed (β-spodumene)

|  | $SiO_2$ | $Al_2O_3$ | $Fe_2O_3$ | MgO | CaO | $Na_2O$ | $K_2O$ | $TiO_2$ | MnO |
|---|---|---|---|---|---|---|---|---|---|
| Feed | 62.7 | 25.4 | 1.46 | 0.2 | 1.22 | 0.11 | 0.53 | 0.04 | 0.18 |

|  | $P_2O_5$ | $Cr_2O_3$ | $V_2P_5$ | $ZrO_2$ | ZnO | Mo | Li | PAF |
|---|---|---|---|---|---|---|---|---|
| Feed | 0.6 | 0.01 | <0.01 | 0.02 | 0.03 | 2.4 | 3.08 | 0.26 |

The nitrogen pycnometry measurement has an actual density of 2.5 g/cc. The particle size analyses are presented in Table 4. According to the results obtained, the p80 is 100 μm, the p50 is 43.1 μm and the p20 is 6.10 μm.

TABLE 4

Particle size analysis of the feed (β-spodumene)

| Initial Weight (g) | Fraction (μm) | Fraction (mesh) | Weight (%) | Cumulative retained (%) | Cumulative passing (%) |
|---|---|---|---|---|---|
| 13.60 | +212 | 65 | 5.1 | 5.10 | 94.9 |
| 13.20 | +150 | 100 | 5.0 | 10.1 | 89.9 |
| 9.00 | +125 | 115 | 3.4 | 13.5 | 86.5 |
| 11.30 | +106 | 150 | 4.3 | 17.8 | 82.2 |
| 31.90 | +75 | 200 | 12 | 29.8 | 70.2 |
| 31.10 | +53 | 270 | 12 | 41.5 | 58.5 |
| 18.20 | +45 | 325 | 6.9 | 48.4 | 51.6 |
| 55.60 | +20 | 635 | 21 | 69.4 | 30.6 |
| 81.10 | −20 |  | 31 | 100 | 0.0 |
| 265.0 | Total |  | 100.0 |  |  | the feed zone, an injection of air was provided to drive it to the discharge point. An air flow rate of 6 L/min at a supply rate of 10 kg/h was used.

Table 5 shows the results of water leaching carried out at the semi-industrial scale. The leached products are obtained from acid roasting at 290° C. The weights of the leached batches vary from about 35 kg to 43 kg. Lithium recoveries range from 91.1% to 91.5%, a difference that is not significant. Without wishing to be tied to such theories, it seems thus that:

After 6 minutes and at 290° C., the lithium extraction reaches a plateau. It should be noted that the 6 minutes correspond to the time spent in the isothermal zone in the kiln and that the overall residence time is 15 minutes.

The leaching temperature has no significant effect on the Li extraction.

The conversion from the α phase to the β phase is less efficient.

The variability of an ore and the presence of impurities in this ore, such as aluminum ($Al_2O_3$), could have an impact on the extraction performance and quality of aluminum silicates.

TABLE 5

Performances of acid roasting at 290° C. and leaching at the pilot scale

|  |  | Pilot test 1 | Pilot test 2 | Pilot test 3 |
|---|---|---|---|---|
|  |  | 6 min of roasting time at 290° C. | 15 min of roasting time at 290° C. | 15 min of roasting time at 290° C. |
| Leaching temperature (° C.) |  | 70 | 35 | 70 |
| Li extraction (%) |  | 91.1 | 91.5 | 91.1 |
| Li mass balance (out/in in %) |  | 95.1 | 95.9 | 98.7 |
| Pregnant leach solution (PLS) | Si | 617 | 539 | 777 |
|  | Al | 3720 | 2130 | 3080 |
|  | Fe | 1350 | 966 | 1270 |
|  | Mg | 101 | 72 | 97 |
|  | Ca | 367 | 394 | 419 |
|  | Na | 723 | 799 | 732 |
|  | Mn | 217 | 181 | 200 |
|  | P | 1090 | 700 | 995 |
| Solid residue (RES) | Li | 0.28 | 0.27 | 0.29 |
|  | $SiO_2$ | 65.9 | 64.3 | 65.6 |
|  | $Al_2O_3$ | 25.9 | 24.1 | 24.5 |
|  | $Fe_2O_3$ | 1.16 | 1.21 | 1.16 |
|  | MgO | 0.14 | 0.14 | 0.15 |
|  | CaO | 0.67 | 0.78 | 0.84 |
|  | $Na_2O$ | 0.12 | 0.2 | 0.16 |
|  | $K_2O$ | 0.53 | 0.48 | 0.49 |
|  | MnO | 0.12 | 0.15 | 0.14 |
|  | $P_2O_5$ | 0.13 | 0.29 | 0.16 |
|  | $TiO_2$ | 0.04 | 0.04 | 0.04 |
|  | $Cr_2O_3$ | <0.01 | <0.01 | <0.01 |
|  | $V_2O_5$ | <0.01 | <0.01 | <0.01 |
|  | $ZrO_2$ | <0.02 | <0.02 | <0.02 |
|  | ZnO | 0.01 | 0.02 | 0.02 |
|  | PAF | 5.17 | 6.63 | 5.11 |

As for samples produced at 250° C., leaching was carried out at the laboratory scale on batches of approximately 1 kg. The results shown in Table 6 show that, overall, lithium extractions obtained by acid roasting at 250° C. are lower than those obtained at 290° C., about 0.7% to 2.0% less. A longer residence time for acid roasting (15 min) improves lithium recovery, indicating that the drop in temperature from 290° C. to 250° C. significantly delays the reaction, requiring a residence time longer than 6 minutes. However, this delay may not be as significant if the performance of the pre-conversion step is better. The underperformance of the conversion is partly reflected by the presence of the α-spodumene phase (unconverted and therefore refractory) and transient phases in which the lithium extraction is the slowest. A well-converted sample would therefore be much less sensitive to this decrease in temperature. Leaching at 70° C. shows a slight decrease in recovery versus that at 35° C. It also appears that in the composition of pregnant leach solutions (PLS), more impurities are dissolved at 70° C., such as Si, Al, Fe, Mg and P.

TABLE 6

Performances of acid roasting at 250° C. and leaching at laboratory scale

|  |  | Lab test 1 | Lab test 2 | Lab test 3 | Lab test 4 |
|---|---|---|---|---|---|
|  |  | 6 min of roasting at 250° C. | 6 min of roasting at 250° C. | 15 min of roasting at 250° C. | 15 min of roasting at 250° C. |
| Leaching temperature (° C.) |  | 35 | 70 | 35 | 70 |
| Li extraction (%) |  | 89.86 | 89.16 | 90.59 | 90.43 |
| Li mass balance (out/in in %) |  | 107.54 | 108.28 | 95.76 | 97.07 |
| Pregnant leach solution (PLS) | Si | 641 | 1020 | 605 | 810 |
|  | Al | 1960 | 3200 | 3310 | 3970 |
|  | Fe | 928 | 1280 | 1350 | 1530 |
|  | Mg | 62 | 88 | 95 | 104 |
|  | Ca | 218 | 245 | 211 | 277 |
|  | Na | 538 | 634 | 663 | 687 |
|  | Mn | 150 | 181 | 224 | 232 |
|  | P | 719 | 1030 | 958 | 1160 |
| Solid residue (RES) | Li | 0.38 | 0.41 | 0.31 | 0.29 |
|  | $SiO_2$ | 65.9 | 64.3 | 65.6 | 65.6 |
|  | $Al_2O_3$ | 25.9 | 24.1 | 24.5 | 24.5 |
|  | $Fe_2O_3$ | 1.16 | 1.21 | 1.16 | 1.16 |
|  | MgO | 0.14 | 0.14 | 0.15 | 0.15 |
|  | CaO | 0.67 | 0.78 | 0.84 | 0.84 |
|  | $Na_2O$ | 0.12 | 0.2 | 0.16 | 0.16 |
|  | $K_2O$ | 0.53 | 0.48 | 0.49 | 0.49 |
|  | MnO | 0.12 | 0.15 | 0.14 | 0.14 |
|  | $P_2O_5$ | 0.13 | 0.29 | 0.16 | 0.16 |
|  | $TiO_2$ | 0.04 | 0.04 | 0.04 | 0.04 |
|  | $Cr_2O_3$ | <0.01 | <0.01 | <0.01 | <0.01 |
|  | $V_2O_5$ | <0.01 | <0.01 | <0.01 | <0.01 |
|  | $ZrO_2$ | <0.02 | <0.02 | <0.02 | <0.02 |
|  | ZnO | 0.01 | 0.02 | 0.02 | 0.02 |
|  | PAF | 5.17 | 6.63 | 5.11 | 5.11 |

Table 7 shows the two samples provided for each type of aluminum silicate: a sample as is, a crushed sample and a coarse fraction.

TABLE 7

Aluminum silicate samples

|  | Sample 1 (kg) | Sample 2 (kg) |
|---|---|---|
| As is | 17 | 15 |
| Fraction + 106 μm | 9 | — |
| Crushed sample | — | 2 |
| "Stock" sample | 16 | 16 |
| Fraction + 53 μm | 3.3 | — |
| Crushed sample | — | 3 |

It should be noted that during the performance of these tests, it was noted that the fineness of the material received resulted in a slower filtration process. This observation allowed the design of this filtration step to be examined and reassessed for the commercial factory circuit.

In addition to characteristics such as residual lithium content and particle size, the content of impurities such as Al, Ca and Fe could have an impact on the quality of their aluminum silicates and the recovery routes thereof.

For example, a higher Ca content appears to have a positive impact on the cementing properties. Consequently, adding lime to the leaching pulp could increase its content. However, the impact on other impurities (Fe, Al) and on the extraction performances of Li must be assessed.

According to Table 8, the CaO content of aluminosilicates increases from 0.7% to 2.4% after adjusting the pH to 2, while the $SiO_2$ content decreases from 66% to 63% and that of aluminum from 26% to 24%. Recovery, on the other hand, was not significantly affected below pH 2; above this threshold the risk of lithium loss becomes significant. The consumption of lime to adjust the pH to 2 is estimated at 21.5 kg/t of spodumene concentrate. It should be noted that these results depend on the amount of residual acid in the PLS solution.

Without wishing to be bound to such a theory, it appears, on the basis of these results, that in situ precipitation is possible as long as the pH does not exceed 2. However, since the calcium present in these aluminum silicates is mainly in the form of sulfate, an investigation of the effect of sulfur on the recovery routes is required, particularly for the application as a cementing agent.

TABLE 8

Leaching and precipitation performances in situ at the laboratory scale

|  |  |  | pH | | | | |
| --- | --- | --- | --- | --- | --- | --- | --- |
|  |  |  | 1.76* | 2 | 2.5 | 3 | 3.5 |
| Leaching temperature (° C.) | | | 70 | 70 | 70 | 70 | 70 |
| Li extraction (%) | | | 91.1 | 90.9 | 89.3 | 89.2 | 88.4 |
| Li mass balance (out/in in %) | | | 95.1 | 100.4 | 103.8 | 89.4 | 88.1 |
| Lime consumption (kg/t of β-spod) | | | 0 | 21.5 | 40.4 | 41.9 | 50.8 |
| Weight loss/gain (%) | | | — | 3.3 | 0.5 | −1 | −5.2 |
| Pregnant | Li | g/L | 19.9 | 21 | 23.2 | 22.2 | 20.9 |
| leach | Si | mg/L | 617 | 707 | 652 | 168 | <100 |
| solution | Al | mg/L | 3720 | 3920 | 3810 | 2620 | 1270 |
| (PLS) | Fe | mg/L | 1350 | 1420 | 539 | 380 | 393 |
|  | Mg | mg/L | 101 | 159 | 192 | 197 | 209 |
|  | Ca | mg/L | 367 | 295 | 334 | 299 | 299 |
|  | Na | mg/L | 723 | 854 | 968 | 855 | 829 |
|  | Mn | mg/L | 217 | 260 | 278 | 263 | 255 |
|  | P | mg/L | 1090 | 1010 | 440 | <300 | <300 |
| Silicates | Li | % | 0.28 | 0.29 | 0.33 | 0.33 | 0.34 |
| aluminum | $SiO_2$ | % | 65.9 | 62.6 | 60.7 | 59.5 | 58.7 |
|  | $Al_2O_3$ | % | 25.9 | 23.5 | 22.7 | 22.3 | 22.4 |
|  | $Fe_2O_3$ | % | 1.16 | 1.12 | 1.11 | 1.11 | 1.21 |
|  | MgO | % | 0.14 | 0.15 | 0.15 | 0.14 | 0.14 |
|  | CaO | % | 0.67 | 2.43 | 3.67 | 3.61 | 4.05 |
|  | $Na_2O$ | % | 0.12 | 0.16 | 0.16 | 0.15 | 0.15 |
|  | $K_2O$ | % | 0.53 | 0.45 | 0.45 | 0.43 | 0.43 |
|  | MnO | % | 0.12 | 0.13 | 0.13 | 0.13 | 0.13 |
|  | $P_2O_5$ | % | 0.13 | 0.18 | 0.21 | 0.22 | 0.4 |
|  | $TiO_2$ | % | 0.04 | 0.03 | 0.03 | 0.04 | 0.03 |
|  | $Cr_2O_3$ | % | <0.01 | <0.01 | <0.01 | <0.01 | <0.01 |
|  | $V_2O_5$ | % | <0.01 | <0.01 | <0.01 | <0.01 | <0.01 |
|  | $ZrO_2$ | % | <0.02 | <0.02 | <0.02 | <0.02 | <0.02 |
|  | ZnO | % | 0.01 | 0.02 | 0.02 | 0.02 | 0.02 |
|  | PAF | % | 5.17 | 7.47 | 8.81 | 9.62 | 10.4 |

*Data from Pilot Test 1, the other tests (pH: 2.0, 2.5, 3.0 and 3.5) were conducted at laboratory scale.

Example 3—Aluminosilicate as Partial Replacement of Cement: Introduction and Methods The aim of this study is to assess the effects of replacing a part of the cement with aluminum silicate in conventional concrete mixtures to verify the pozzolanic activity of this new material and the influence thereof on the properties of fresh and cured concrete. Demonstrating that these aluminum silicate products have pozzolanic properties in concrete may facilitate the acceptance and use thereof by the construction industry.

1—Tests on Pastes and Mortars

Tests were carried out on cement pastes and mortars incorporating varying amounts of aluminosilicates. Two Canadian general use cements (GU cement and GUL cement) were used as reference cements. In addition, the three cementing materials accepted by the standards, namely silica fume (SF), fly ash (FA) and blast furnace slag (BFS), were used as reference supplementary materials.

TABLE 9

Test matrix on pastes containing various contents of supplementary cementing materials
W/B = 0. 5*

| Materials | Cement replacement rate (%) | | | | | | | | | | | | | |
| --- | --- | --- | --- | --- | --- | --- | --- | --- | --- | --- | --- | --- | --- | --- |
| GU Cement | 100 | 95 | 95 | 90 | 90 | 90 | 90 | 75 | 75 | 75 | 65 | 65 | 65 | 55 |
| AS |  | 5 |  | 10 |  |  |  | 25 |  |  | 35 |  |  | 45 |
| SF |  |  | 5 |  | 10 |  |  |  |  |  |  |  |  |  |
| FA |  |  |  |  |  | 10 |  |  | 25 |  |  | 35 |  |  |
| BFS |  |  |  |  |  |  | 10 |  |  | 25 |  |  | 35 |  |

*W/B = water to binder ratio

The proposed tests on pastes carried are:
1(A)—Physico-chemical analysis of all the materials the results of which were used to analyze the results obtained for all other tests (pastes, mortars and concrete) in the present study.
1(B)—Study of hydration kinetics by calorimetry for all combinations in Table 9.
1(C)—Determination of pozzolanic activity on mortars containing variable contents of aluminum silicates and other supplementary cementing materials (SF, FA, BFS) for all combinations in Table 10.

TABLE 10

Test matrix on mortar containing various contents of supplementary cementing materials
W/B = 0.484

| Materials | Cement replacement rate (%) | | | | | | | | | | | |
|---|---|---|---|---|---|---|---|---|---|---|---|---|
| GU/GUL cement | 100 | 95 | 95 | 90 | 90 | 80 | 80 | 80 | 65 | 65 | 65 | 55 |
| AS | | 5 | | 10 | | 20 | | | 35 | | | 45 |
| SF | | | 5 | | 10 | | | | | | | |
| FA | | | | | | | 20 | | | 35 | | |
| BFS | | | | | | | | 20 | | | 35 | |

*W/B = water to binder ratio

2—Tests on Concrete

A systematic study on conventional concrete mixtures containing aluminosilicates as a replacement of a part of GU cement was conducted to assess the influence of these products on the properties of conventional concrete mixtures containing variable contents of aluminosilicates. For comparison purposes, concrete mixtures containing silica fume (SF), fly ash (FA) or blast furnace slag (BFS) as a supplementary cementing material in place of cement were also produced and evaluated with a water to binder ratio (W/B) of 0.45.

TABLE 11

Concrete mixtures with and without entrained air containing various contents of supplementary cementing materials Tests on concretes without entrained air
W/B = 0.45

| Materials | Cement replacement rate (%) | | | | | | | | | | | |
|---|---|---|---|---|---|---|---|---|---|---|---|---|
| GU Cement | 100 | 95 | 95 | 90 | 90 | 90 | 90 | 75 | 75 | 75 | 65 | 55 |
| AS | | 5 | | 10 | | | | 25 | | | 35 | 45 |
| SF | | | 5 | | 10 | | | | | | | |
| FA | | | | | | 10 | | | 25 | | | |
| BFS | | | | | | | 10 | | | 25 | | |

Tests on concretes with entrained air
W/B = 0.45

| Materials | Cement replacement rate (%) | | | |
|---|---|---|---|---|
| GU Cement | 100 | 75 | 75 | 75 |
| AS | | 25 | | |
| FA | | | 25 | |
| BFS | | | | 25 |

*W/B = water to binder ratio

A total of sixteen (16) concrete mixtures with a W/B=0.45 ratio were made; comprising twelve (12) concrete mixtures made without entrained air and four (4) concrete mixtures made with entrained air. The purpose of the latter tests is to verify the influence of aluminosilicate on air entrainment in the concrete. The entrained air in the concrete is intended to allow it to withstand the stresses created by freezing and thawing cycles during the winter period. Most cementing materials used for replacing some of the cement in the concrete increase the demand for an air-entraining admixture to obtain an adequate air content in the concrete. The binder combinations used in the sixteen (16) concrete mixtures are presented in Table 11.

Once the concrete mixtures were optimized from test batches, the following actual tests were performed on the concretes of Table 11:

2(A)—Tests on Fresh Concrete
  Preparation and characterization of aggregates (sand and coarse aggregates): assessment of aggregate density and absorption.
  Slump tests to assess concrete workability, density, air content, temperature and setting time. As the setting time test requires a lot of time and attention, it will only be performed for a few selected mixtures.
2(B)—Mechanical Tests on Hardened Concrete at an Early Age and in the Longer Term:
  Routine mechanical tests were carried out on all the concretes: compressive, flexural and tensile strength. These three types of tests were performed over 7, 28 or 91 days depending on the type of test.
2(C)—Durability Tests on the Concrete (Long-Term Concrete Properties):
  Resistance of the concrete to chloride ion penetrability;
  Resistance of the concrete to freeze/thaw cycles; and
  Resistance to scaling due to deicing salts.

Example 4—Tests on Pastes and Mortars: Physico-Chemical Analysis of Materials

Tables 12 and 13 show the physico-chemical properties of GU and GUL cements and supplementary cementing materials.

Aluminosilicate slightly resembles class CI fly ash, except for its higher silica content (see Table 12: 70% for aluminosilicate versus 52% for fly ash), as well as its greater Blaine fineness and its greater specific surface area (Table 13) which are respectively 1965 $m^2/kg$ and 8.6 $m^2/g$ for aluminosilicate versus 306 $m^2/kg$ and 2.08 $m^2/g$ for fly ash. The aluminosilicate evaluated is much finer than the cement, fly ash and blast furnace slag in this study, but much less fine than silica fume (Table 13). The fineness of the cementing materials has a great influence on their reactivity and may influence their maximum content in the concrete mixtures. The finer the supplementary material, the more reactive it will be, but when the fineness is very high, as in the case of silica fume for example, a high content could affect the workability of fresh concrete, and thus its ease of pouring.

For this reason, silica fume is used in normal concrete in proportions less than or equal to 15% in place of cement (Malhotra, V. M. (2000). "Role of supplementary cementing materials in reducing greenhouse gas emissions." In Concrete Technology for a Sustainable Development in the 21st Century, Gjorv, O. E., and Sakai, K. (eds.), E&FN Spon, London, pp. 226-235); J. A. Bickley, R. D. Hooton, and K. C. Hover, "Performance Specifications for Durable Concrete", Current practice and limitations, Concrete international, Vol. 103, No 6, September 2006, pp. 51-57).

TABLE 12

Chemical analysis of the cementing materials assessed

| Composition (%) | Cements | | Supplementary cementing materials | | | |
|---|---|---|---|---|---|---|
| | GU | GUL | AS | SF | FA | BFS |
| $SiO_2$ | 19.7 | 18.4 | 70 | 94.8 | 51.8 | 38.9 |
| $Al_2O_3$ | 5.1 | 4.8 | 21.0 | 0.3 | 21.4 | 8.9 |
| $Fe_2O_3$ | 3.2 | 3.0 | 1.3 | 0.09 | 4.7 | 0.3 |
| CaO | 61.5 | 59.8 | 0.7 | 0.7 | 17 | 36.7 |
| MgO | 2.8 | 2.6 | 0.07 | 0.7 | 1.3 | 12.6 |
| $Na_2O_{eq}$ | 0.7 | 0.6 | 0.7 | 0.8 | 0.7 | 0.6 |
| $SO_3$ | 3.6 | 3.6 | — | 0.2 | 2.2 | 0.2 |
| Loss to fire | 1.8 | 5.6 | 0.5 | 2.2 | 0.3 | 0.7 |

TABLE 13

Physical properties of the cementing materials assessed

| Properties | Cements | | Supplementary cementing materials | | | |
|---|---|---|---|---|---|---|
| | GU | GUL | AS | SF | FA | BFS |
| Blaine fineness ($m^2/kg$) | 380 | 472 | 1965 | — | 306 | 470 |
| Specific surface area ($m^2/g$) | 2.92 | 3.31 | 8.6 | 18.4 | 2.08 | 2.6 |
| Passing rate at 45 μm, % | 97 | 99 | 50 | 100 | 88 | 99 |
| Density | 3.13 | 3.08 | 2.79 | 2.20 | 2.36 | 2.96 |

Example 5—Tests on Pastes and Mortars: Hydration Kinetics of Cementing Pastes

Figure 2:
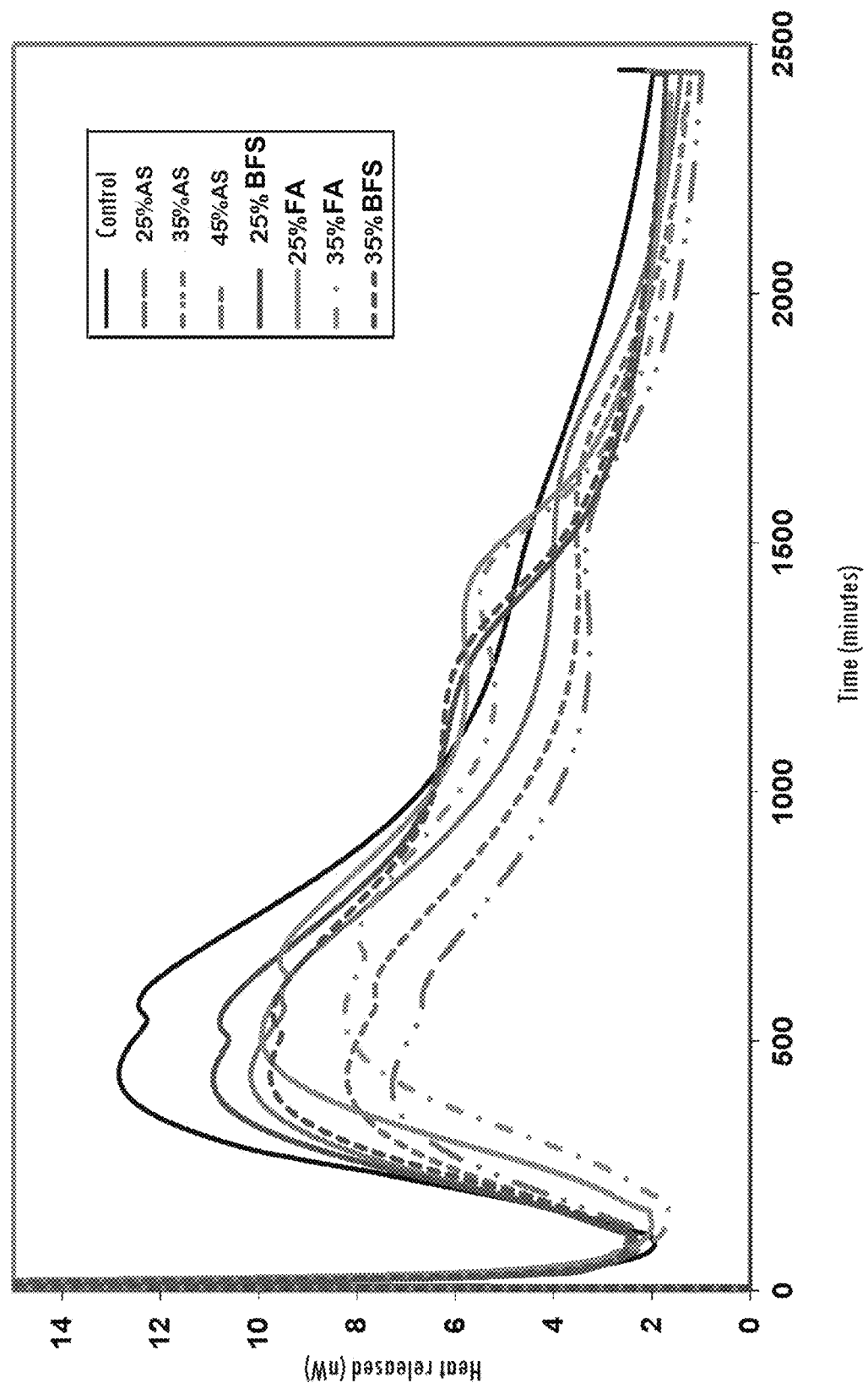
FIG. 2 shows hydration heat release curves for GU cement pastes containing 25%, 35% or 45% AS, 25% or 35% FA, or 25% or 35% BFS.

Cement pastes and cement pastes mixed with various proportions of supplementary cementing materials were prepared in accordance with Table 9. A water/binder ratio (W/B) of 0.5 was used in the preparation of the paste. The binder is either pure GU cement as a reference paste or GU cement with supplementary cementing material in proportions of 5%, 10%, 25%, 35%, and 45% for aluminosilicate; 5% and 10% for silica fume; 10%, 25% and 35% for fly ash and blast furnace slag. calorimetric tests were carried out on these pastes to evaluate the influence of the replacement of a part of the cement with different supplementary cementing materials in the mixture. The hydration reactions of Portland cement are very exothermic and are accompanied by a high heat release that causes a significant increase in the temperature of the cement paste, mortar or concrete. calorimetry, which measures the heat released by such systems, is an analysis technique that determines the influence of mineral additions or chemical admixture on the hydration kinetics of Portland cement in a cement paste (mortar or concrete) containing these types of materials. To do this, an isometric calorimeter of the Thermometric TAM Air type was used. The heat flux released by the hydration reaction was monitored for 24 hours. Preliminary studies on other aluminosilicate samples for three (3) days had shown that it was not necessary to monitor the reaction for more than 24 hours, as no change in the heat release curve was observed after 24 hours. FIG. 1 and FIG. 2 show the calorimetric curves of the different combinations of GU cement with different supplementary cementing materials assessed in order to compare their different influences on the reactivity of the cement.

FIG. 1 shows the heat release curves for pastes containing 5% and 10% supplementary cementing materials compared to the reference paste containing pure cement. For the paste containing 5% silica fume (SF), the reaction starts earlier than for all other combinations comprising the reference paste, and the heat released is higher. In effect, due to its very high fineness, silica fume accelerates the hydration reactions of the cement, its particles acting as nucleation sites thus activating the reaction of the cement and consequently the formation of more hydrates. The paste containing 10% silica fume accelerates the reaction, and the heat release thereof is similar to that of the pure reference paste. Pastes containing aluminosilicate also slightly accelerate the hydration reaction of the cement because the beginning of the heat release is slightly to the left of the curve of the reference paste. The heat release curve of the paste containing 5% aluminosilicate is very slightly lower than that of the reference, while at a 10% replacement rate of the cement by aluminosilicate the heat release curve is significantly lower indicating a slightly lower total heat release. The dilution factor is in this case more important than the acceleration factor of the hydration reaction of the cement. The paste containing 10% blast furnace slag (BFS) starts a little later than the reference curve, thus indicating a slight delay in the hydration reaction of the paste containing the slag, but then the two curves merge, indicating that the 10% BFS in the place of cement does not significantly affect the hydration reaction of the cement in the short term. The paste containing 10% fly ash (FA) delays the hydration reaction of the cement, since its heat release curve clearly starts to the right of the reference curve (and all other combinations), and the heat release is the lowest of the whole series indicating that fly ash greatly and negatively affects the hydration reaction of the cement at a very early age. Thus aluminosilicate used in place of cement at 5% and 10% does not significantly affect the kinetics of the hydration reaction of the cement, and neither does slag in place of cement at 10%. Silica fume accelerates the reaction while fly ash delays it.

FIG. 2 shows the calorimetric curves for pastes containing pure GU cement as well as cement pastes incorporating proportions of 25%, 35% and 45% aluminosilicate; as well as 25% and 35% fly ash and blast furnace slag. The calorimetric curves of the pastes containing slag (BFS) and aluminosilicate do not influence the beginning of the hydration reaction because the beginning of the heat release in these pastes begins at the same time as that of the reference paste containing pure cement. In the case of pastes containing fly ash, one notes here also a delay in the hydration reaction of the cement, the calorimetric curves being displaced well to the right of the reference curve. The heat released in all the pastes with supplementary cementing materials is lower than the reference indicating the importance of the dilution factor because the contents in supplementary materials is high. Slag reduces the heat of hydration less than fly ash and aluminosilicate. Indeed, the slag is activated by the cement and may begin to hydrate itself at an early age, while fly ash and aluminosilicate, which are pozzolanic materials, react with the lime produced by the hydration of the cement and this secondary reaction only occurs later after a few days of curing. In all cases, the dilution factor that decreases the hydration heat of the cement increases with the content in supplementary cement material. It is interesting, in the case of aluminosilicate, that a replacement of the cement at a rate of 35% gives a hydration heat comparable to that obtained with fly ash itself at 35%, while not affecting the start of the cement reaction, whereas fly ash delays this reaction. For the rate of replacement of the cement by 45% of aluminosilicate, the heat of hydration is less important, but the beginning of the reaction is not affected. One of the concerns concrete producers have of fly ash and slag is that they slow the development of concrete strength at an early age by delaying the hydration and hardening of the cement, which is not the case with aluminosilicate, thus potentially giving it a competitive advantage.

The results of tests carried out on cement pastes incorporating aluminosilicate rates ranging from 5% to 45% have shown that this product does not delay the hydration reaction of the cement and does not significantly affect the kinetics thereof. A dilution effect of the cement paste is also observed, which results in a reduction in heat flux which is greater as the rate of replacement of the cement increases. Silica fume significantly accelerates the hydration reactions of the cement while slag and fly ash have a delaying effect.

Example 6—Tests on Pastes and Mortars:
Pozzolanic Activity of Mortars with Supplementary Cementing Materials Mortar mixtures were prepared to assess the activity index (pozzolanicity) of this material. The mortar mixtures were prepared according to ASTM C 305-12 *Standard Practice for Mechanical Mixing of Hydraulic Cement Pastes and Mortars of Plastic Consistency* and ASTM C 778-17 *Standard Specification for Standard Sand*, and were mixed with a water/binder (W/B) ratio of 0.484. The combinations of the cement and the supplementary cementing materials assessed are presented in Table 10. The sand used, with a uniform particle size, comes from Ottawa (Illinois, USA). Mortar cubes with 50 mm edges were then made in brass molds according to ASTM C311/C311M-13 *Standard Test Methods for Sampling and Testing Fly Ash or Natural Pozzolans for Use in Portland-Cement Concrete*.

The cubes were placed in the moist chamber (100% relative humidity and 23° C.) for 24 hours. The mortar cubes were then demolded and immersed in lime-saturated water and stored in the moist chamber until the age of the compression tests, i.e. 7 and 28 days for this study. The 7-day and 28-day compressive strength tests were performed according to ASTM C109/C109M-16a *Standard Test Method for Compressive Strength of Hydraulic Cement Mortars (Using 2-in. or [50-mm] Cube Specimens)*.

The activity index is obtained as a percentage of the compressive strength of a cement-containing mixture and the supplementary cementing material under investigation as a replacement for part of the cement in the mortar mixture compared to a reference mixture containing pure cement and prepared in the same way and under the same conditions. Cement replacement rates of 5%, 10%, 25%, 35% and 45% aluminosilicate were evaluated. Silica fume (5% and 10%), slag and fly ash (25% and 35%) were also evaluated as a comparison with aluminosilicates under the same conditions.

The results obtained are shown in Tables 14 and 15. GU and GUL general use cements were used as references. Table 14 shows the results of the mixtures made with GU cement and Table 15 the results of the mixtures made with GUL cement. For a material to be considered as pozzolanic under the ASTM C618 standard, the sum of $Al_2O_3+SiO_2+Fe_2O_3$ must among other things be greater than 70%, and its activity index relative to pure cement must be greater than 75%.

TABLE 14

Mortar mixtures made with GU cement

| Mixture | SCM (%) | Spreading (%) | W/B | Compressive strength (MPa) 7 days | 28 days | Pozzolanic activity (%) 7 days | 28 days |
|---|---|---|---|---|---|---|---|
| 1 | Control | 78 | 0.484 | 21.9 | 28.4 | 100 | 100 |
| 2 | AS (5%) | 80 | 0.504 | 23.5 | 32.4 | 107.3 | 114.1 |
| 3 | AS (10%) | 75 | 0.504 | 19.1 | 27.1 | 87.2 | 95.4 |
| 4 | AS (25%) | 76 | 0.514 | 14.2 | 24.4 | 64.8 | 85.9 |
| 5 | AS (35%) | 77 | 0.534 | 12.4 | 24.4 | 56.6 | 85.9 |
| 6 | AS (45%) | 83 | 0.544 | 7.3 | 16.5 | 33.3 | 58.1 |
| 7 | SF (5%) | 80 | 0.504 | 25.3 | 40.4 | 115.5 | 142.3 |
| 8 | SF (10%) | 74 | 0.534 | 25.4 | 35.4 | 116.0 | 124.6 |
| 9 | FA (25%) | 84 | 0.484 | 27.4 | 35.1 | 85.1 | 123.6 |
| 10 | FA (35%) | 90 | 0.484 | 15.4 | 31.2 | 70.3 | 109.9 |
| 11 | BFS (25%) | 84 | 0.504 | 20.8 | 30.7 | 95.0 | 108.1 |
| 12 | BFS (35%) | 85 | 0.509 | 16.4 | 28.7 | 74.9 | 100 |

TABLE 15

Mortar mixtures made with GUL cement

| Mixture | SCM (%) | Spreading (%) | W/B | Compressive strength (MPa) 7 days | 28 days | Pozzolanic activity (%) 7 days | 28 days |
|---|---|---|---|---|---|---|---|
| 1 | Control | 76 | 0.484 | 27.8 | 29.2 | 100 | 100 |
| 2 | AS (5%) | 84 | 0.509 | 25.3 | 32.6 | 91.0 | 111.6 |
| 3 | AS (10%) | 77 | 0.509 | 24.5 | 33.8 | 88.1 | 115.8 |
| 4 | AS (25%) | 76 | 0.534 | 17.3 | 28.1 | 62.2 | 96.2 |
| 5 | AS (35%) | 83 | 0.544 | 12.0 | 23.0 | 43.2 | 78.8 |
| 6 | AS (45%) | 83 | 0.564 | 8.3 | 16.7 | 29.9 | 57.2 |
| 7 | SF (5%) | 77 | 0.514 | 29.2 | 38.9 | 105.0 | 133.2 |
| 8 | SF (10%) | 76 | 0.544 | 24.7 | 44.6 | 88.8 | 152.7 |
| 9 | FA (25%) | 82 | 0.464 | 21.0 | 33.0 | 75.5 | 113.0 |
| 10 | FA (35%) | 77 | 0.449 | 19.5 | 29.7 | 70.1 | 101.7 |
| 11 | BFS (25%) | 76 | 0.484 | 22.0 | 34.3 | 79.1 | 117.5 |
| 12 | BFS (35%) | 85 | 0.499 | 19.1 | 30.1 | 68.7 | 103.1 |

ASTM C618-17a *Standard Specification for Coal Fly Ash and Raw or Calcined Natural Pozzolan for Use in Concrete* requires an activity index of 75% at 7 days and 28 days for supplementary cementing materials having pozzolanic properties with a 20% replacement rate. Previous studies have shown that aluminosilicates meet this standard, with activity index values of 81.7% at 7 days and 106.7% at 28 days. Tables 14 and 15 show that lower replacement rates, namely 5% and 10%, give higher activity indices, i.e., 107.3% and 114.1% at 7 and 28 days respectively for a replacement rate of 5% of GU cement. The index values are 91.0% and 111.6% at 7 and 28 days respectively for the same replacement rate (5%) of GUL cement. In the case of the 10% replacement rate of the cement by aluminosilicate, the activity index values are 87.2% and 95.4% at 7 and 28 days respectively for GU cement and 88.1% and 115.8% at 7 and 28 days respectively for GUL cement. The higher replacement rates, 25%, 35% and 45% give lower activity index values at 7 days, i.e., 62.2%, 43.2% and 29.2% respectively with GU cement, and 64.8%, 56.6% and 33.3% respectively with GUL cement. The index values increase with curing time, and at 28 days they rise to 96.2%, 78.8% and 57.2% respectively for mortars made with GUL cement (Table 15) and 85.9%, 85.9% and 58.1% respectively for mortars made with GU cement (Table 14). The results for mortars containing 25% and 35% aluminosilicates in place of cement thus show excellent activity after 28 days of curing. The replacement rate of 45% of the cement with this material seems high, but one will see with the tests on concrete if the strength at an early age is acceptable, because the tests on paste showed that even at 45% replacement of the cement, aluminosilicate did not delay the hydration reaction of the cement. It only diluted the hydraulic binder by decreasing the intensity of the reaction proportional to the quantity of cement present. The paste made with silica fume shows very high indices with both cements and at both ages, which is normal with this reference pozzolan consisting of very fine particles that accelerate the hydration reactions of the cements. Fly ash and slag give higher values than aluminosilicate, especially for the 25% cement replacement rate, but the difference narrowed at 28 days.

The results of the tests on mortar show that for mortar mixtures incorporating 5% and 10% aluminosilicate as a replacement for the cement, the pozzolanic activity is very interesting at 7 and 28 days (much higher than the 75% required by the ASTM C618 standard). Pozzolanic activity is lower at 7 days for replacement rates of 25% and above, but it rises and exceeds the required value of 75% after 28 days of moist curing for the 25% and 35% cement replacement rates.

Example 7—Tests on Pastes and Mortars: Analysis of Portlandite Consumption by Thermogravimetry Thermogravimetric analysis (TGA) is an experimental technique for the macroscopic study of matter. This technique allows one to study reaction species or systems whose transformation which during a temperature cycle is carried out with mass variation. Its objective is to characterize materials by directly measuring their mass as a function of temperature and/or time. It also makes it possible to quantify in a cementing material the chemically bound water (non-evaporable water), portlandite ($Ca(OH)_2$) and calcium carbonates resulting from carbonation or initially contained in aggregates (Raki, L. et al. *Performance Criteria of for the Use of Alternative SCMs in Concrete*, Client Report, 2007.P.-C; Nkinamubanzi; B., Fournier and R. Chevrier; *A Comparative Evaluation of Metakoalin and Silica Fume to Control Alkali-Silica Reaction in Concrete*, CANMET-MTL 2007-12(CF); July 2007). This technique determines the temperature and mass change associated with decomposition reactions, and allows an analysis of the quantitative composition of the materials under study to be made (FIG. 3).

Preferably, for a sample of a cementing mixture, a series of mass loss is shown as follows:
From 25° C. to 415° C.: a part of the water combined in the calcium silicate hydrates (CSH) evaporates. In this temperature range, there is also a decomposition of calcium sulfate between 180-300° C.
According to the TGA curve, mass loss due to $Ca(OH)_2$ dehydration occurs in the region of 420° C.-550° C. according to the following chemical reaction: $Ca(OH)_2 \rightarrow CaO+H_2O$
If the calcite is decarbonated, it occurs in the temperature range of 600° C.-780° C., and the amount detected by TGA must be taken into account.

Figure 3A:
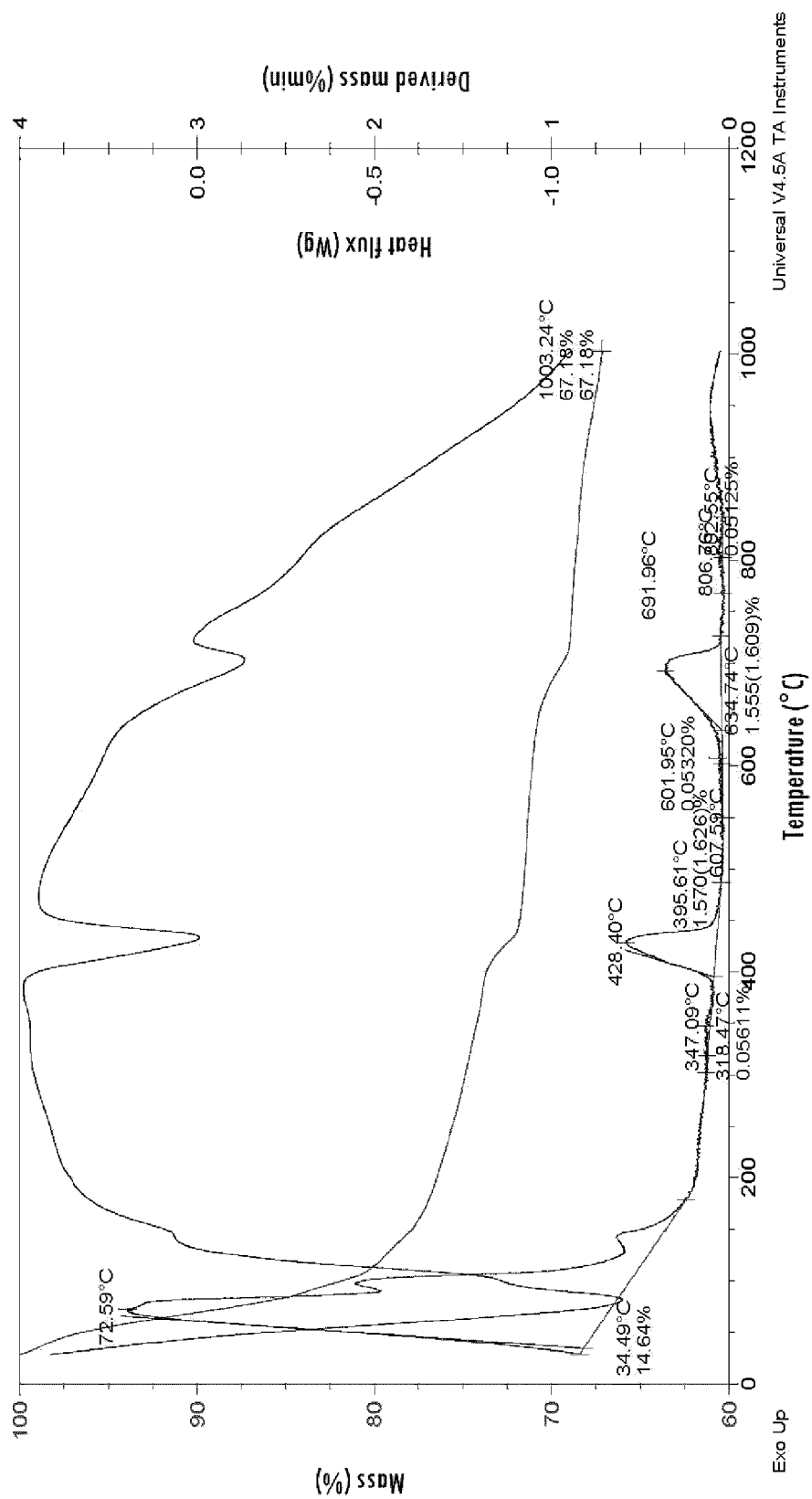
FIG. 3A and FIG. 3B show thermogravimetric (TG) curves of cement paste with 25% replacement of the cement by fly ash (FIG. 3A) and aluminosilicate (FIG. 3B) at 7 days of hydration.
Figure 3B:
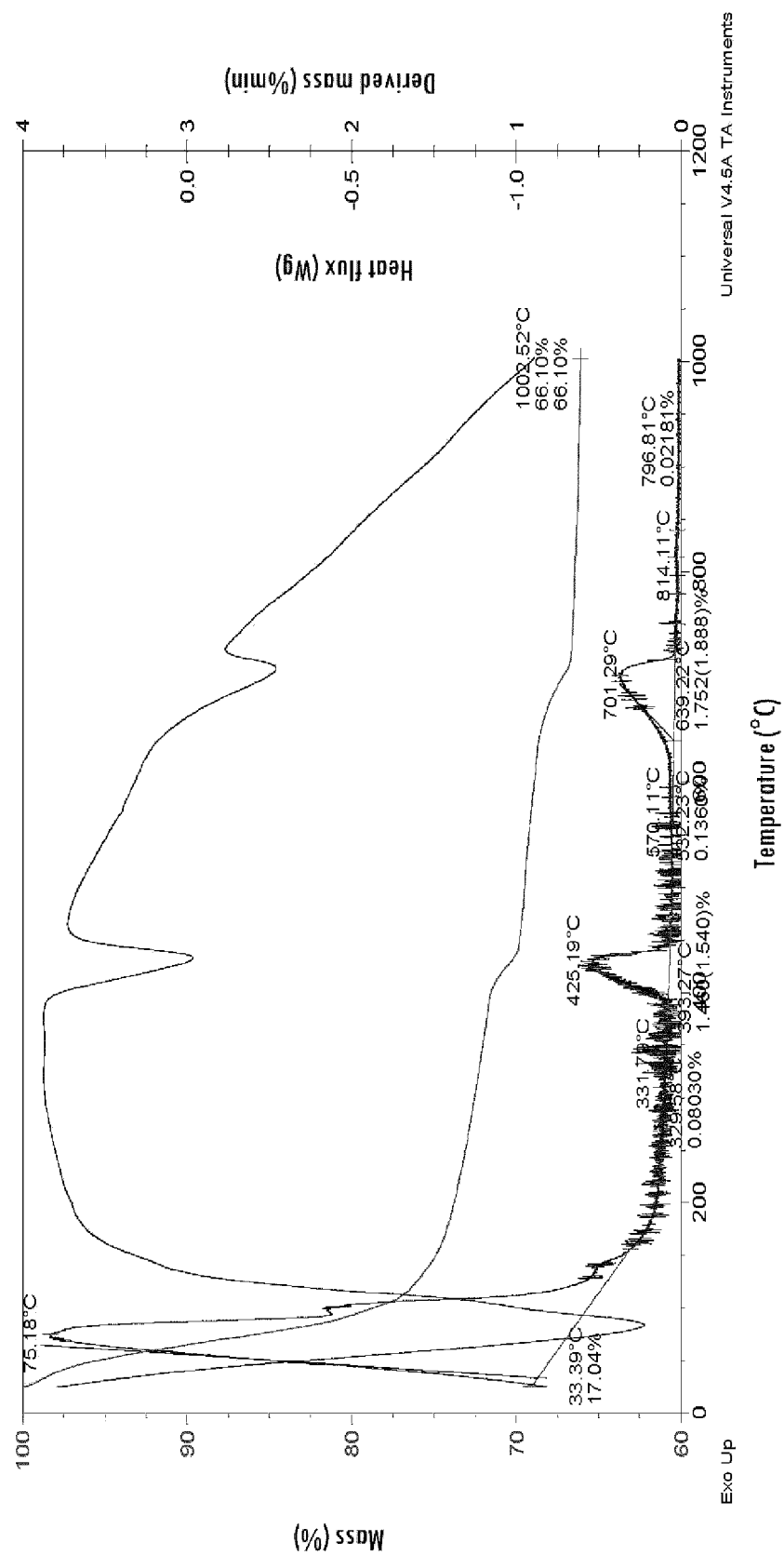

In this case, FIG. 3A and FIG. 3B represent the thermogravimetric curves of a cement paste containing 25% substitution of cement by aluminosilicate (3A) and fly ash (3B) after 7 days of reaction. In general, four types of mass loss could be observed and interpreted with reference to the literature as follows:
Between 50° C. and 150° C.: the loss of mass is due to the evaporation of free water and the decomposition of part of the CSHs.
Between 150° C. and 450° C.: this is the range of decomposition of the CSHs and ettringite ($Ca_6Al_2(SO_4)_3(OH)_{12-26}H_2O$).
Between 450° C. and 550° C.: this mass loss is caused by the decomposition of the portlandite ($Ca(OH)_2$).
Between 650° C. and 750° C.: mass loss due to decarbonation of the calcite $CaCO_3$ The mass loss due to the decomposition of $Ca(OH)_2$ produced by the hydration of cement may be used to quantify the pozzolanic reaction. To this end, FIG. 4 shows a comparison of the different mortar mixtures containing 20% and 25% aluminosilicate on the one hand and 20% and 25% fly ash on the other hand, by way of comparison.

Figure 4:
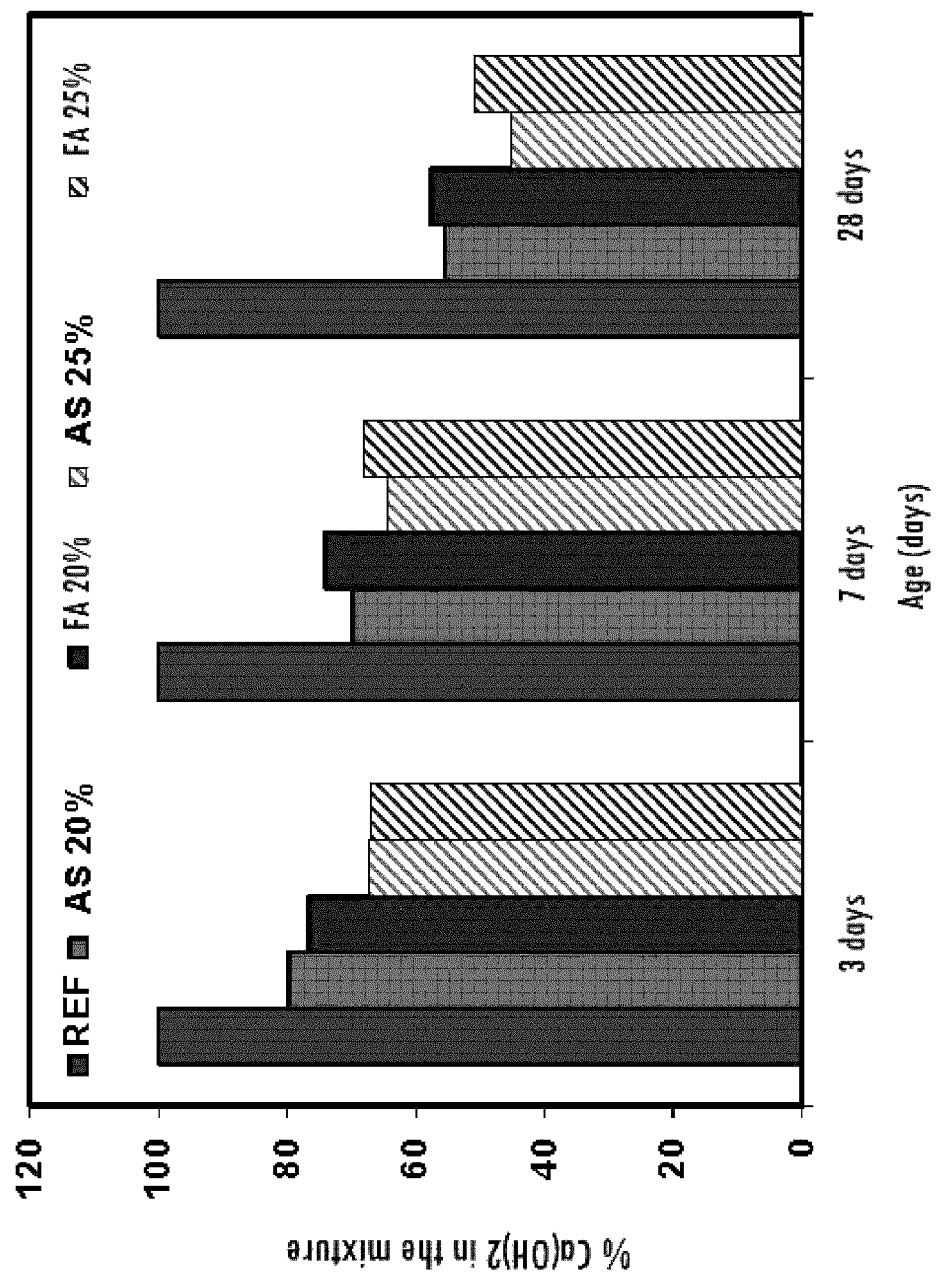
FIG. 4 is a bar graph illustrating the evolution of $Ca(OH)_2$ mass loss as a function of the replacement rate of the cement and the hydration age.

This FIG. 4 shows a comparison of the percentage of weight loss of the portlandite, $Ca(OH)_2$, as a function of hydration time and the rate of substitution of cement by aluminosilicate and fly ash. The samples hydrated for 3, 7 and 28 days with substitution rates of 0%, 20% and 25% of supplementary materials are shown. It may be seen that when the cement is replaced at rates of 20% and 25% by aluminosilicate or fly ash, FIG. 4 shows a marked decrease in the mass loss of portlandite, resulting in a consumption of the lime produced by the pozzolanic reaction due to supplementary cementing materials.

The loss of mass related to lime, ($Ca(OH)_2$, in the reference mixture containing pure Portland cement, is standardized to 100%. The higher the percentage of mass loss, the more lime there is in the mixture and the less pozzolanic activity there is for the supplementary cementing material considered. It is observed that after 3 days of moist curing, the pozzolanic activity of the fly ash is slightly higher than that of the aluminosilicate: for the mixtures with 20% cement replacement, there is 80% lime for the aluminosilicate compared to 77% for the ash, while for the mixtures with 25% replacement, there is 67% for the aluminosilicate compared to 66% for the fly ash. There is therefore about 1% to 3% more lime consumed with fly ash. This small difference in reactivity may also be due to the fact that aluminosilicate, which accelerates the hydration reactions of the cement, increases the lime production. For older samples, on the other hand, there is more lime consumed in the mixtures containing aluminosilicate compared to those containing fly ash. The aluminosilicate consumed about 2% and 4% more lime than the fly ash respectively after 7 and 28 days of moist curing for mixtures with 20% cement replacement. The difference in lime consumption rises to 4% and 6% respectively after the same two curing times in favor of aluminosilicate for the mixtures with 25% cement replacement by the two supplementary cementing materials. These results further illustrate the good potential of aluminosilicate as a pozzolanic material that may advantageously replace a part of the cement in the production of concrete.

The results of the portlandite consumption test resulting from the pozzolanic reaction by thermogravimetric analysis (TGA) show that mortars containing aluminosilicate have a lime consumption 4% to 6% higher than the mortars containing fly ash used as a reference in this study. The results obtained by this method therefore suggest a higher pozzolanic activity for aluminosilicate compared to fly ash.

Example 8—Concrete Preparation

Conventional concrete mixtures containing various levels of aluminum silicate to replace a part of the all-purpose cement were used to assess the impact of this product on the properties of fresh and cured conventional concrete mixtures. For comparison purposes, concrete mixtures containing silica fume, fly ash or blast furnace slag as a supplementary cementing material in place of cement were also produced and assessed with a water to binder ratio (W/B) of 0.45. For some concretes, a small portion of water was retained or added to keep the slump constant for all mixtures. The proportions of the ingredients and properties of the 12 concrete mixtures without entrained air are shown in Table 17. The proportions of the ingredients and properties of the 4 concrete mixtures with entrained air are presented in Table 18. The base materials were characterized previously. The aggregates composed of crushed limestone rock were washed and dried. The sand used is a natural sand and was also dried. The water absorption and the density of these two ingredients were determined before calculating the concrete mixtures. The coarse aggregate has a water absorption and a density of 0.80% and 2.75 g/cm$^3$ respectively. The fine aggregate (sand) has a water absorption of 0.99% and a density of 2.72 g/cm$^3$, as well as a fineness modulus of 2.60. The mixing method used is shown in Table 16.

TABLE 16

Mixing sequences of concrete mixtures

| Loading period | Initial mixing | Adding the water reducer | Pause | Main mixing | End of mixing | Properties in the fresh state |
|---|---|---|---|---|---|---|
| t = 0 min | t = 1:30 min | t = 3 min | t = 5 min | t = 8 min | t = 10 min |

Steps for Mixing:
Load the coarse aggregate+air-entraining admixture+a small amount of water and mix for 15 seconds
Add the fine aggregate (sand) and mix for 15 seconds
Add the cement and the supplementary cementing materials
Start mixing (t=0 at contact between the water and the cement)
Add the water reducer dissolved in ⅓ water at t=1:30 min
Add the remaining water (but monitor the fluidity of the concrete carefully)
Stop mixing at t=3 min, let the concrete rest
Start mixing again at t=5 min
End of mixing at t=8 min
Measure the temperature, slump, density and air content of the concrete at t=10 minutes

TABLE 17

Formulations and properties of concrete mixtures without entrained air*

| | | Identification of mixtures | | | | | | | | | | | |
|---|---|---|---|---|---|---|---|---|---|---|---|---|---|
| | | 1 Control GU | 2 AS-5 | 3 SF-5 | 4 AS-10 | 5 SF-10 | 6 BFS-10 | 7 FA-10 | 8 AS-25 | 9 BFS-25 | 10 FA-25 | 11 AS-35 | 12 AS-45 |
| W/B | | 0.45 | 0.45 | 0.45 | 0.45 | 0.45 | 0.45 | 0.45 | 0.45 | 0.45 | 0.45 | 0.45 | 0.45 |
| Binder composition (%) | GU Cement | 100 | 95 | 95 | 90 | 90 | 90 | 90 | 75 | 75 | 75 | 65 | 55 |
| | Supplementary cementing material | 0 | 5 | 5 | 10 | 10 | 10 | 10 | 25 | 25 | 25 | 35 | 45 |
| Total binder (kg/m$^3$) | | 380 | 380 | 380 | 380 | 380 | 380 | 380 | 380 | 380 | 380 | 380 | 380 |
| Slump (mm) -10 min | | 90 | 80 | 85 | 95 | 80 | 80 | 120 | 75 | 80 | 90 | 85 | 80 |
| Air content - 10 min (%) | | 1.7 | 1.9 | 2.0 | 2.0 | 2.0 | 2.0 | 2.0 | 1.7 | 1.8 | 1.6 | 2.1 | 2.0 |
| Compressive strength (MPa) | 1 day | 29.1 | 21.3 | 23.1 | 16.4 | 20.4 | 14.6 | 12.8 | 13.8 | 14.1 | 14.8 | 7.5 | 5.2 |
| | 7 days | 42.0 | 43.7 | 45.5 | 29.1 | 43.9 | 36.3 | 37.3 | 33.5 | 20.6 | 38.4 | 24.0 | 19.2 |
| | 28 days | 52.8 | 57.9 | 59.6 | 51.7 | 60.6 | 46.6 | 46.9 | 52.8 | 47.3 | 47.3 | 44.5 | 36.4 |
| | 91 days | 60.4 | 62.3 | 67.9 | 58.8 | 70.6 | 61.6 | 61.3 | 66.5 | 63.3 | 71.0 | 55.1 | 56.6 |
| Flexural strength (MPa) | 28 days | 8.5 | 8.5 | 9.8 | 7.4 | 7.9 | 8.4 | 8.4 | 7.2 | 7.8 | 8.6 | 7.8 | 8.0 |
| | 91 days | 9.3 | 9.7 | 9.8 | 8.8 | 9.3 | 9.0 | 8.9 | 9.7 | 10.3 | 9.7 | 9.0 | 9.1 |
| Tensile strength (MPa) | 28 days | 4.1 | 4.2 | 4.4 | 4.2 | 4.6 | 4.5 | 4.2 | 4.2 | 4.9 | 4.4 | 4.0 | 3.5 |
| | 91 days | 4.5 | 4.7 | 4.7 | 4.7 | 5.0 | 4.5 | 4.4 | 4.7 | 4.9 | 5.1 | 4.7 | 4.7 |
| Penetrability to chloride ions (coulombs) | 56 days | 3600 | 3250 | 1350 | 3150 | 990 | 3700 | 4750 | 2500 | 1300 | 4200 | 1500 | 2200 |

*SF = Silica fume; BFS = Blast furnace slag; FA = Fly ash; AS = Aluminosilicate

In the air-entrained concretes, an air-entraining admixture (micro-air) was used at a dosage allowing 6±2% air in the fresh concrete after ten minutes of contact between the water and the cement in the mixer. A conventional water reducer (Pozzolith 210) at a dosage of 350 ml per 100 kg of cement) was used in all 16 mixtures to achieve a slump of 100±20 mm at 10 minutes.

TABLE 18

Formulations and properties of air-entrained concrete mixtures

| | | Identification of the mixtures | | | |
|---|---|---|---|---|---|
| | | 13 Control GU | 14 AS-25 | 15 BFS-25 | 16 FA-25 |
| W/B | | 0.45 | 0.45 | 0.45 | 0.42 |
| Binder composition (%) | GU Cement | 100 | 75 | 75 | 75 |
| | Supplementary cementing material | 0 | 25 | 25 | 25 |
| Total binder (kg/m³) | | 380 | 380 | 380 | 380 |
| Air-entraining admixture (ml) | | 88 | 123 | 123 | 140 |
| Slump (mm) -10 min | | 115 | 100 | 130 | 90 |
| Air content - 10 min (%) | | 6.5 | 7.0 | 8.0 | 4.8 |
| Compressive strength (MPa) | 1 day | 15.1 | 7.3 | 6.5 | 12.7 |
| | 7 days | 35.6 | 25.9 | 22.1 | 34.0 |
| | 28 days | 46.0 | 44.3 | 43.4 | 52.6 |
| | 91 days | 48.5 | 52.0 | 50.1 | 59.6 |
| Durability factor | 300 cycles | 94 | 102 | 106 | 92 |
| Scaling resistance (56 cycles) | Debris (kg/m²) | 0.150 | 0.440 | 0.323 | 0.684 |
| | Visual index | 1 | 2 | 2 | 3 |

*SF = Silica fume; BFS = Blast furnace slag; FA = Fly ash; AS = Aluminosilicate; W = Water;
*SF = Silica fume; BFS = Blast furnace slag; FA = Fly ash; AS = Aluminosilicate; W = Water; B=Binder Example 9—Tests on Fresh Concrete Small, 20-liter batches were prepared to optimize the mixture proportions according to the test method ASTM C31/C31M-12 *Standard Practice for Making and Curing Concrete Test Specimens in the Field*. The content in cementing material is 380 kg/m³ and the W/B ratio is set at 0.45, values that are commonly used for conventional concretes. Once the concrete mixture was completed, larger batches of 58 to 60 liters were made to prepare the concrete samples based on the tests envisaged in the study. The temperature of the concrete at the end of mixing was recorded and it was around 22° C. for all the mixtures. The slump, density and air content were then determined. Samples were then taken according to the tests: compressive strength tests according to ASTM C39/C39M-10 *Standard Test Method for Compressive Strength of Cylindrical Specimens*, Tensile strength according to ASTM C496/C496M-17 *Standard Test Method for Splitting Tensile Strength of Cylindrical Concrete Specimens*, and chloride ion penetrability according to ASTM C1202-18 *Standard Test Method for Electrical Indication of Concrete's Ability to Resist Chloride Ion Penetration*, 100 mm×200 mm cylindrical molds were used to sample the concrete. The two-layer consolidation was carried out using a vibrating table. For the flexural strength tests according to ASTM C78/C78M-18 *Standard Test Method for Flexural Strength of Concrete (Using Simple Beam with Third-Point Loading)* and freeze-thaw resistance according to ASTM C666/C666M-15 *Standard Test Method for Resistance of Concrete to Rapid Freezing and Thawing*, 75 mm×75 mm×300 mm prisms were collected. In the case of tests of resistance to scaling due to deicing salts, 250 mm×250 mm×75 mm slabs were sampled according to ASTM C672/C672M-12 *Standard Test Method for Scaling Resistance of Concrete Surfaces Exposed to Deicing Chemicals*.

(a) Properties of Fresh Concretes: Airless Concretes

Figure 5:
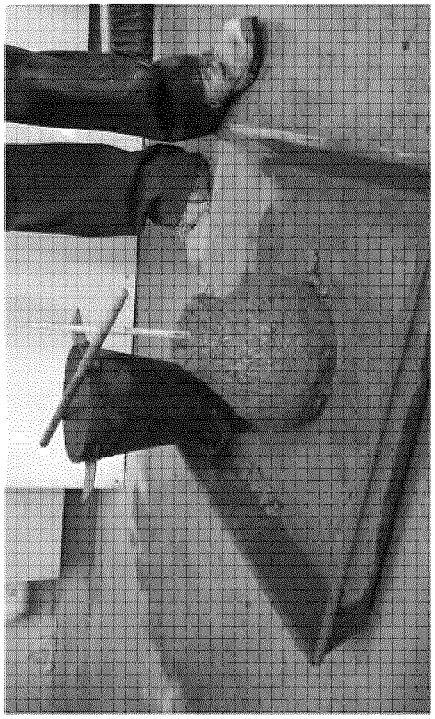
FIG. 5 is an image illustrating the slump measuring of the fresh concrete (ASTM C143).

The target slump for the concretes in this study was 100±20 mm typical of conventional concretes. FIG. 5 shows the slump measurement of one of the concretes in this study according to ASTM C143/C143M-15a *Standard Test Method for Slump of Hydraulic-Cement Concrete*. Table 17 shows that all concretes have a slump that falls well within this range: the lowest slump is 75 mm for concrete containing 25% aluminosilicate, while the highest slump corresponds to concrete containing 10% fly ash. The entrapped air content varies between 2.1% for concrete containing 35% aluminosilicate and 1.6% for concrete containing 25% fly ash. The air content of concretes without entrained air must be less than or equal to 2%.

(b) Properties of Fresh Concretes: Air-Entrained Concretes

The properties of air-entrained concretes are shown in Table 18. The slump of the concretes is higher than in the case of airless concretes, because entrained air increases the workability of fresh concrete. Slump values range from 90 mm for the concrete containing 25% fly ash to 130 mm for the concrete containing 25% slag. The target air content was 6%±2% because it is preferable to have in the fresh air-entrained concrete between 4% and 8%, i.e., an air quantity necessary to allow the concrete to resist freezing and thawing cycles during the winter. The air content measured in the four (4) concretes in this study that contained 25% supplementary cementing materials (AS, FA or BFS) in place of part of the cement varies between 4.8% for concrete containing fly ash and 8.0% for concrete containing slag. The reference concrete made with pure GU cement had an air content of 6.5%, while concrete containing aluminosilicate had an air content of 7%. Fly ash is known to be more demanding in terms of air-entraining because of its higher or lower carbon content, which adsorbs air-entraining admixtures (A. Bilodeau, V. Sivasundaram, K. E. Painter, and V. M. Malhotra. 1994. *Durability of Concrete Incorporating High Volumes of Fly Ash from Sources in the U.S*. ACI Materials Journal, January-February, Vol. 91, No. 1, pp 3-12).

The results of the concrete tests show that aluminosilicate may be used in conventional concrete with and without entrained air. The slump incorporating this new material is approximately equal to that of the reference concrete made with pure cement (90 mm). For all evaluated replacement rates (5% to 45%), the measured slump of the concretes is between 75 mm and 95 mm, which is well within the ±20 mm range required by the standards (Table 17). In the case of concretes with entrained air, the addition of aluminosilicate slightly increases the demand for air-entraining admixture (AEA) compared to the reference concrete made with pure cement, but this demand for AEA is similar to that of concrete made with slag for a similar air content. In comparison, the fly ash used increases the demand for AEA the most while producing the concrete with the lowest air content. Fly ash is known to contain carbon, which increases the consumption of air-entraining admixtures in concrete (A. Bilodeau, V. Sivasundaram, K. E. Painter, and V. M. Malhotra. 1994. *Durability of Concrete Incorporating High Volumes of Fly Ash from Sources in the U.S. ACI Materials Journal*, January-February, Vol. 91, No. 1, pp 3-12; P. C. Nkinamubanzi, A. Bilodeau, C. Jolicoeur, and D. M. Golden. *Air-Entraining Admixtures for Use with Fly Ashes Having High Carbon Contents*, ACI SP 217-36, Seventh CANMET/ACI International Conference on Superplasticizers and Other Chemicals Admixtures in Concrete, Berlin, Germany, October 2003).

Example 10—Mechanical Tests on Hardened Concrete

Figure 6:
FIG. 6 is a series of images illustrating the testing of compressive strength of the concrete (ASTM C 39).
Figure 7:
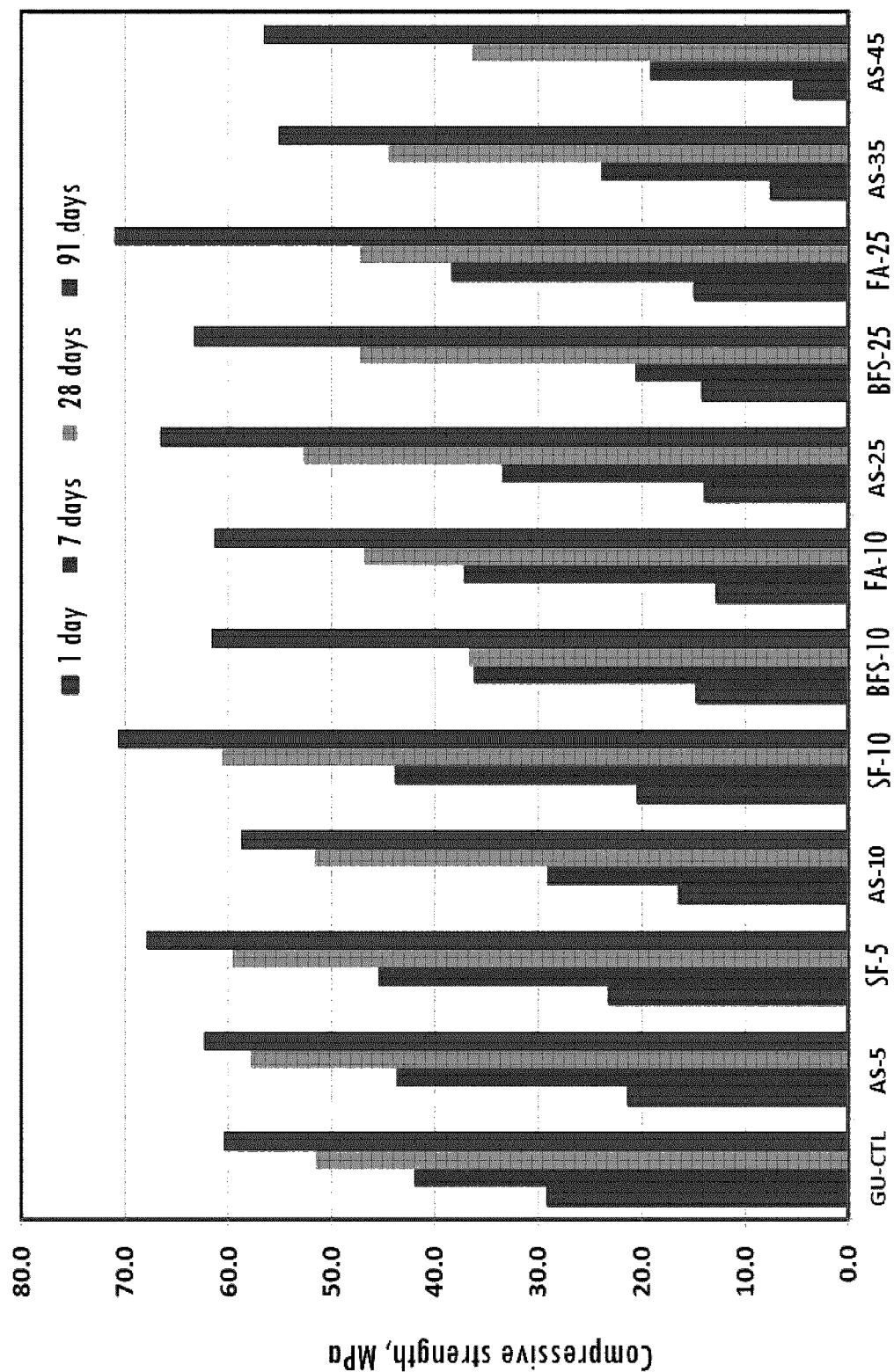
FIG. 7 is a bar graph showing the compressive strength of concrete mixtures produced without entrained air (GU and 5%-45% replacement of SCM).
Figure 8:
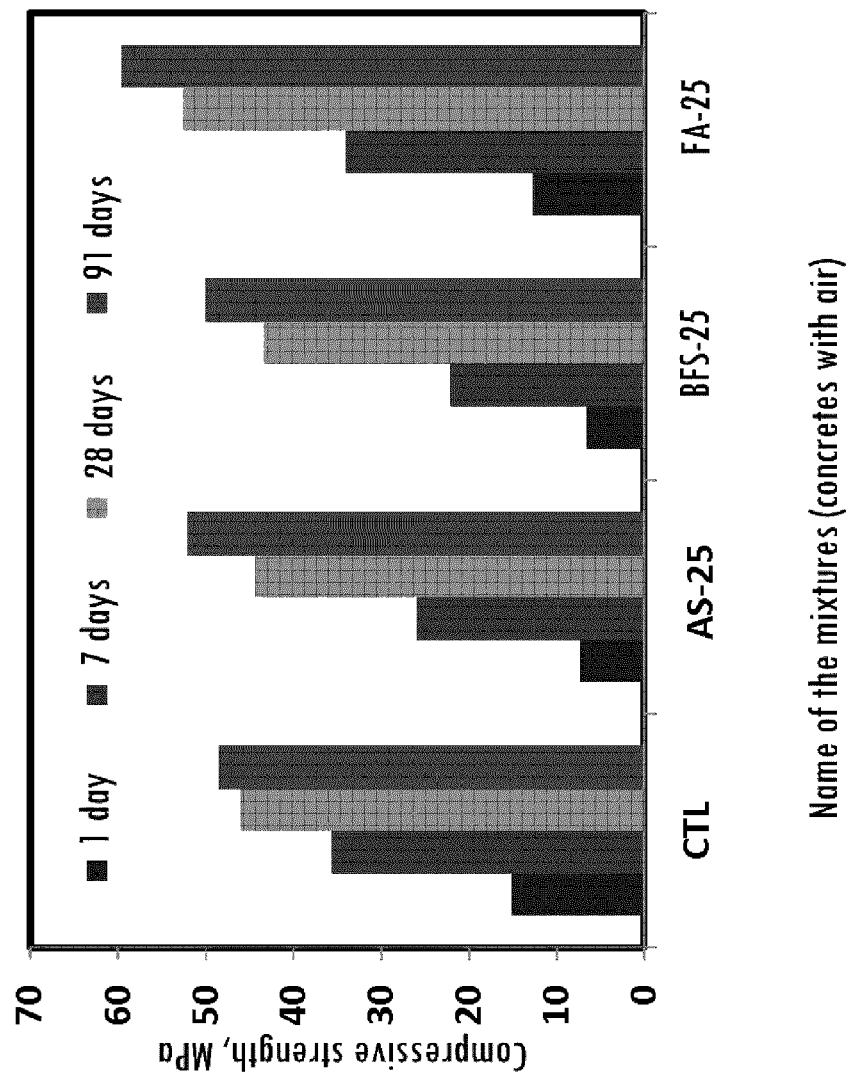
FIG. 8 is a bar graph showing the compressive strength of concrete mixtures produced with entrained air (GU and 25% replacement of SCM).
Figures 9A, 9B:
FIG. 9A and FIG. 9B are images illustrating the experimental set-up for testing of flexural strength (FIG. 9A) and tensile strength (FIG. 9B) of concrete mixtures.

The results obtained during the tests on hardened concrete are presented in Table 17 for airless concretes and in Table 18 for air-entrained concretes.
(a) Compressive Strength of the Concretes
  (i) Concretes without Entrained Air
  Test results obtained up to 91 days of age are discussed here.
  The experimental set-up used to evaluate the compressive strength of the concretes is illustrated in FIG. 6. The results of the compression (Table 17 and FIG. 7), flexural and tensile tests (Table 17) on concrete specimens are discussed in the following sections.
  Tables 17 and 18 give the results of the compressive strength tests of airless concretes (Table 17) and air-entrained concretes (Table 18). FIG. 7 and FIG. 8 show the compressive strength results of airless (FIG. 7) and air-entrained (FIG. 8) concretes at 1, 7, 28 and 91 days of moist curing. The results in FIG. 7 and Table 17 show that even if the one-day strength of concretes containing 5% and 10% aluminosilicate are lower than that of the reference concrete containing pure cement, they are comparable to that of concrete containing 10% silica fume. They are higher than those of concretes containing 10% slag or fly ash.
  After 7 days and 28 days of moist curing, the concrete containing 5% aluminosilicate, with 43.7 MPa and 57.9 MPa, is comparable to the concrete containing silica fume, 45.5 MPa and 59.6 MPa respectively, and slightly exceeds the reference concrete, 42.0 MPa and 52.7 MPa respectively. Similar results are obtained after 91 days of curing, confirming the good pozzolanic activity of aluminosilicate (FIG. 7, Table 17). The concrete containing 25% aluminosilicate gives compressive strengths comparable to the concretes containing fly ash and slag at all ages. Even if the concretes containing 35% and 45% aluminosilicate have very low compressive strengths at one day, 7.5 MPa and 5.2 MPa respectively, these increase very quickly after 7 and 28 days of curing, i.e., 24 MPa and 19.2 MPa respectively at 7 days and 44.5 MPa and 36.4 MPa respectively after 28 days of moist curing. The strength of these concretes is 55.1 MPa and 56.6 MPa respectively after 91 days of curing, performances which are very similar to those of the reference concrete without supplementary materials. It is therefore possible, in certain applications that do not require rapid formwork removal, to produce good concretes with aluminosilicate contents as high as 45% in place of a part of the cement. Normally the compressive strength of concretes with supplementary cementing materials continues to increase beyond 91 days (FIG. 7, Table 17). Longer-term tests (1 year) could therefore give strengths for the latter concretes with a high aluminosilicate content that are higher than that of the reference concrete.
  (ii) Air-Entrained Concretes
  The results for compressive strength for air-entrained concretes are presented in Table 18 and FIG. 8. The reference concrete contains pure GU cement, while the other three (3) concretes each contain a supplementary cementing material at a replacement rate of 25%.
  Compressive strength is lower than in the case of airless concretes. This is normal because the entrained air creates porosity in the concrete and thus weakens its microstructure. The strengths at 1 day are 15 MPa for the reference concrete and 7.3 MPa, 6.5 MPa and 12.7 MPa for concretes containing 25% aluminosilicate, 25% slag and 25% fly ash, respectively. The concrete containing fly ash contains the smallest amount of air, i.e., 4.8%, while the concrete containing slag has the largest amount of air, i.e., 8.0%. The concrete containing aluminosilicate has an air content of 7.0%, while the reference concrete contains 6.5%. The dilution factor and air content therefore explain the lower strength of concretes with slag and aluminosilicate.
  After 28 days, the compressive strengths of the reference concrete is 46.0 MPa, which compares well with the strength of the concretes containing aluminosilicate and slag, which are 44.3 MPa and 43.4 MPa respectively. The concrete containing fly ash, which also contains less air than all the others, still has a higher strength for this age, which is 52.6 MPa. After 91 days of curing, all the concretes with supplementary materials give higher strengths than the reference concrete. The concrete containing fly ash has a strength of 59.6 MPa, the concrete with slag has a strength of 52.0 MPa and the concrete with aluminosilicate has a strength of 50.1 MPa. As for the reference concrete, it has a strength of 48.5 MPa. It is thus clear that even for concretes with entrained air, aluminosilicate compares well with concretes containing conventional supplementary cementing materials and, above all, gives better performance than the reference concrete in the long term, which confirms its good pozzolanic properties when used in the concrete to replace a part of the cement.
(b) Flexural and Tensile Strength
  The results of the flexural and tensile strength of the concretes without entrained air are presented in the two rows at the bottom of Table 17. The experimental set-up used for these tests is illustrated in FIG. 9. The flexural strengths of all the concretes without entrained air incorporating aluminosilicate range from 7.2 MPa to 8.5 MPa. They compare well with the reference concrete made with pure cement, which is 8.5 MPa. The same applies to concretes incorporating other supplementary cementing materials. The flexural strength of concrete is generally 10% to 20% of its compressive strength.
  After 91 days of moist curing, the flexural strength of all the concretes in this series ranges from 8.8 MPa to 10.3 MPa, which is desirable for this type of concrete. In the case of tensile strength, the results obtained show that the tensile strength of all the concretes is also comparable to the tensile strength of the reference concrete and ranges from 4.0 MPa to 4.9 MPa at 28 days and from 4.4 MPa to 5.1 MPa after 91 days of moist curing. In effect, the tensile strength value of a concrete is about half the value of its flexural strength. The concretes containing aluminosilicate therefore show performances comparable to those of concretes containing traditional supplementary cementing materials, i.e., silica fume, fly ash or blast furnace slag; these performances are equal to or better than those of the reference concrete without supplementary materials after 28 and 91 days of moist curing.
  The mechanical performances of concretes containing aluminosilicate are quite comparable to those obtained with the conventional supplementary cementing materials used in this study and are equal to or better than those obtained with the reference concrete made with pure cement, especially in the long term (28 and 91 days of moist curing).
  When the cement replacement rate is less than or equal to 25%, the strength at 1 day, although lower than that of the reference concrete, is still acceptable (>12 MPa) for applications requiring rapid formwork removal of concrete elements. The compressive strength values obtained for a cement replacement rate of 25% are comparable or even slightly higher than those of the concretes made with slag and fly ash used in this study. The strength values of the concretes incorporating 5% and 10% aluminosilicates in place of cement increase significantly after 7 days and reach or exceed the strength of the reference concrete after 28 days of moist curing (Table 17 and FIG. 7). The strengths continue to increase advantageously in the longer term (91 days).

The strengths of the air-entrained concretes are lower than those of the reference concrete after one day of curing, but they increase significantly after 7 days and are comparable to that of the reference concrete after 28 days of moist curing. After 91 days of moist curing, the strengths of the concretes with supplementary materials are higher than that of the reference concrete made with pure cement.

Example 11—Concrete Durability Tests: Resistance to Chloride Ion Penetrability

Various tests to assess the potential of concretes to resist environmental weathering and the attack of harmful agents were conducted in this applied research work.

Concrete permeability is a fundamental property for determining the penetration speed of aggressive agents that may alter the durability of the concrete. The permeability of the concrete to chloride ions is a widely used method for rapidly assessing the concrete's ability to resist chemical aggression by harmful materials. The diffusion of chloride ions makes it possible to assess the inter-connectivity of the pores in the concrete. It is a quick test used to measure the ability of concrete to resist chloride penetration by determining its electrical conductivity, expressed as the total electrical load.

Figure 10:
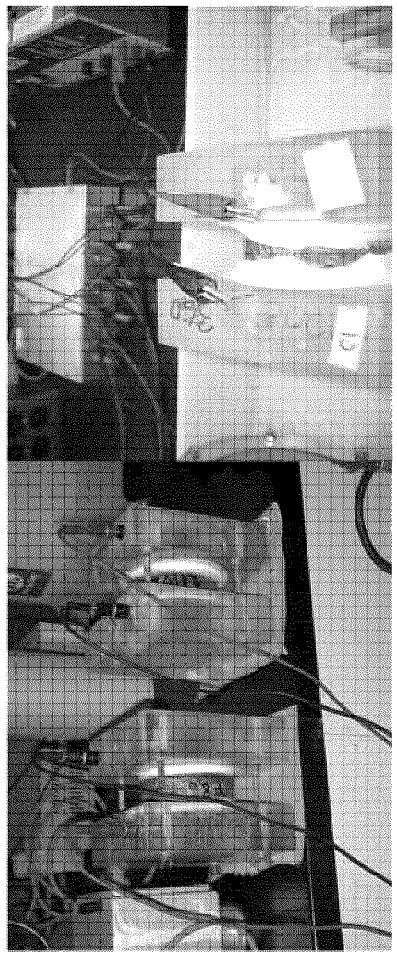
FIG. 10 is a series of images showing the experimental set-up for measuring chloride ion penetrability of concrete mixtures (ASTM C 1202).

This test is performed on samples 95 mm in diameter and 50 mm thick. These samples are extracted from a cylinder 100 mm in diameter by 200 mm in height. The sample is placed in a permeability cell in such a way that one of the circular faces is immersed in a 3% solution of sodium chloride (NaCl) wherein there is an electron-emitting electrode (cathode). The other circular side is immersed in a sodium solution (0.3N of NaOH) wherein there is another electrode (anode) that closes the circuit. A potential difference of 60 volts is maintained between the two ends of the sample. The test consists of measuring the total electrical load, expressed in coulombs, that passes through the sample for 6 hours (FIG. 10. The measured load expresses the diffusion of chlorine ions through the sample. The results are interpreted with reference to the values in Table 19 which expresses the level of chloride ion diffusion in the sample as a function of the load).

The resistance of the concrete to chloride ion penetrability was determined according to the ASTM C1202-18 standard. The tests were performed at 3 ages (28, 56 and 91 days) after casting the concrete samples. The results of the tests of resistance to chloride ion penetration of airless concrete, expressed as the current passing through the sample in coulombs, are presented in Table 17. According to the ASTM C 1202 test method, the total current in coulombs gives an idea of the resistance of the concrete to penetration by aggressive agents: a range from 2000 to 4000 corresponds to moderate chloride ion penetrability, while values from 1000 coulombs to 2000 coulombs correspond to low chloride ion penetrability. The higher the observed value in coulombs, the lower the concrete's ability to resist chloride ion penetration; concretes with current values greater than 4000 coulombs have a high chloride ion penetrability, while the concretes with values less than 100 coulombs have a negligible penetrability and would therefore be the most durable (Table 19).

TABLE 19

Level of penetration of chloride ions into the concrete as a function of the load (coulombs)

| Load (coulombs) | Penetrability of chloride ions |
| --- | --- |
| >4000 | High |
| 2000-4000 | Average |
| 1000-2000 | Low |
| 100-1000 | Very low |
| <100 | Negligible |

The results obtained at 56 days show that the concretes manufactured with aluminosilicate show penetrability values that decrease with the increase in the replacement rate: values of 3250 and 3150 coulombs respectively are obtained for cement replacement rates of 5% and 10%; 2500 coulombs and 2200 coulombs respectively for the replacement rates of 25% and 35%. These values indicate an average penetrability of the concrete by chloride ions. In the case of the concrete containing 45% aluminosilicates, a low value of 1500 coulombs is obtained, indicating a low penetrability to chloride ions and therefore a better durability of the concrete. It should be noted that the values obtained for all concretes containing aluminosilicate are lower than those of the reference concrete (3600 coulombs: moderate penetrability), as well as concretes containing fly ash, which give the highest values, 4200 coulombs and 4750 coulombs, indicating a greater penetrability of chloride ions and therefore a lower durability. These results ultimately show that replacing part of the cement with aluminosilicate in concrete would improve its durability by reducing its permeability to aggressive environmental agents.

In terms of concrete permeability, which is related to the penetrability of concrete by chloride ions measured according to the ATC C1202 standard, it is interesting to note that the concretes containing aluminosilicate have a lower permeability than the reference concrete (Table 17). One should also note that the permeability of the concrete decreases with the increase in aluminosilicate content in the concrete. The concrete containing 35% aluminosilicate compares well with the concrete containing 25% slag and 5% silica fume. The presence of aluminosilicate would therefore contribute to refining the microstructure of the concrete, thus helping to increase its durability against aggressive agents such as chloride ions that attack concrete reinforcing steels.

Example 12—Concrete Durability Tests: Freeze/Thaw Resistance of Air-Entrained Concrete The problems associated with the action of freeze-thaw on concrete occur when the free water in concrete freezes. When the water freezes, its volume increases by about 9%. This expansion produces hydraulic pressure on the pore structure of the concrete. When the concrete reaches its saturation point after several freezing and thawing cycles, the pressure causes tensile forces to build up in the concrete matrix. If these forces are greater than the tensile strength of the concrete, the concrete deteriorates through cracking, scaling or splitting, which further exposes it to the action of freeze-thaw and eventually causes it to rupture (GAGNE, R., PIGEON, M., AÏTCIN, P.-C., and PLEAU, R., 1992, *Frost Durability of High Performance Concretes*, in *High Perfor-* mance Concrete: From Material to Structure, E & FN Spoon Editor, London, England, pp. 239-251); REID, E., PLEAU, R., and PIGEON, M., 2003, The Frost Durability of High Performance Concretes Containing Different Types of Fly Ashes, Cement and Concrete Research, Vol. 33, No. 2, pp. 243-243). The degradation of the concrete by freeze-thaw cycles is increased by the use of deicing products on pavements. To protect concrete from freeze-thaw degradation, the concrete must have an adequate network of air bubbles, composed of small air bubbles uniformly distributed in the cured concrete.

Figure 11:
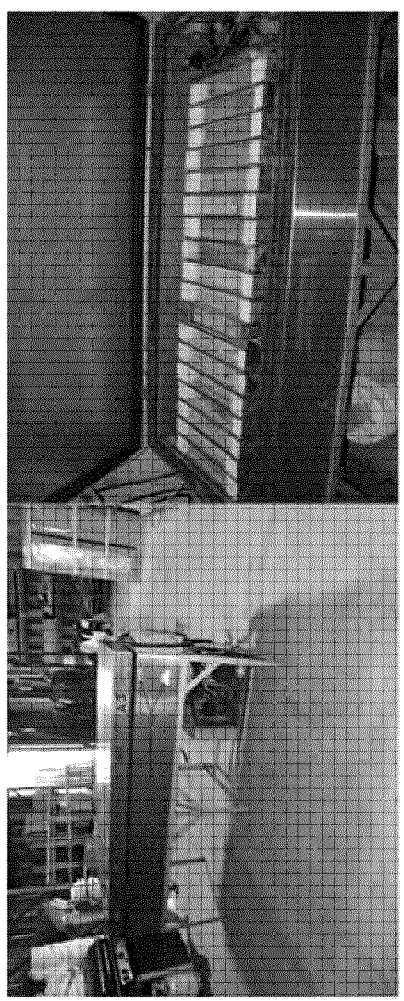
FIG. 11 is a series of images illustrating the experimental set-up for testing the resistance of concrete mixtures to freeze/thaw cycles.
Figure 12A:
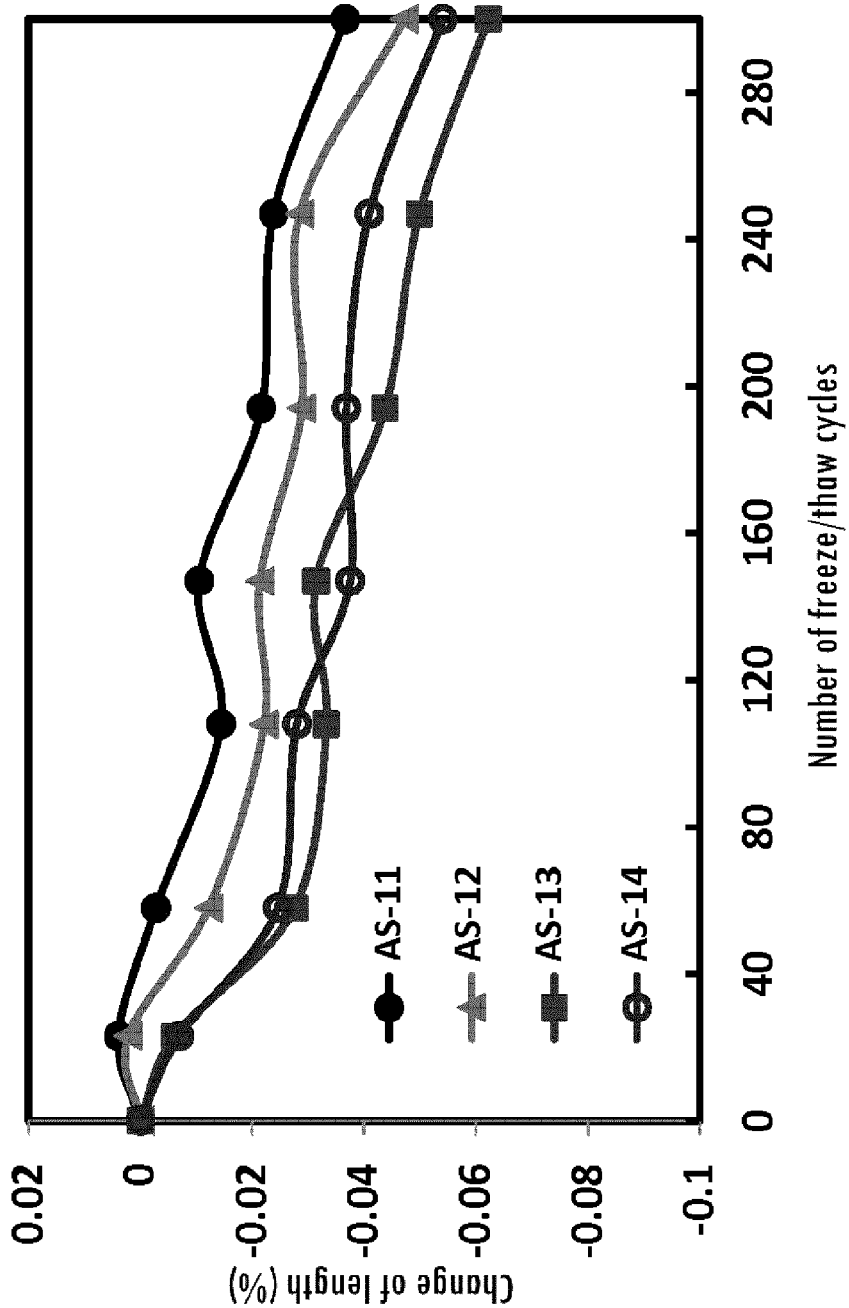
FIG. 12A is a graph showing the change in length of the concrete prisms as a function of the number of freeze/thaw cycles.

The freeze/thaw resistance tests of the concretes with air were conducted to assess the effectiveness of the entrained air to protect the concretes from damage due to freeze/thaw cycles experienced by the concrete during winter periods. The resistance to freeze-thaw cycles of the concrete was tested in accordance with the ASTM C666/C666M-15 standard. Three prisms measuring 75 mm×75 mm×300 mm were cast immediately after mixing the concrete and demolded after 24 hours. The samples were then stored in a moist room for 14 days before beginning the test. The durability parameters of the concrete were assessed by subjecting the concrete prisms to successive freezing and thawing cycles in a Logan-type freeze/thaw cabinet, in accordance with the ASTM C 666 standard (FIG. 11). The length variation measurements, fundamental transverse frequency and mass change were recorded at regular intervals up to a maximum of 300 freeze-thaw cycles in accordance with the ASTM C666 standard (procedure A). The results were expressed as a percentage change in length and according to the durability factor of the concrete calculated according to the ASTM C666 standard. For each concrete, a reference prism not subjected to freeze-thaw cycles and matured in a damp environment was evaluated at the same time as the samples subjected to freeze-thaw cycles. The results of the durability factor are presented in Table 18 while the results of the length variation measurements of the prisms are presented in FIG. 12A.

It is well known that concrete containing 6%±2% entrained air is resistant to freeze-thaw cycles during winter. Most of the fresh concrete mixtures in this work had air contents between 4.8% and 8%, which gives them durability factors close to 100% in all cases (Table 18). When the durability factor is greater than 80%, the concrete resists freeze-thaw cycles quite well. A very good performance is obtained for all the concrete samples with a durability factor ranging from 92% for the fly ash to 106% for the concrete with slag. The concrete containing aluminosilicate has an excellent durability factor of 102%, which is better than the control concrete without supplementary materials (94%). It should be noted that the concrete incorporating fly ash had the lowest amount of entrained air, namely 4.8%, which explains its lower durability factor but is still comparable to that of the reference concrete. The results of the length variation measurements as a function of the number of freeze/thaw cycles show that after 300 cycles, all the prisms have a very negligible length variation of less than 0.1%. All the concretes in this study meet the ASTM C666 standard.

The results of the tests of resistance to freeze/thaw cycles obtained after 300 cycles show that the incorporation of aluminosilicate does not negatively affect the behavior of the concrete. The length variation values of all air-entrained concretes are low (<0.1%; FIG. 12) and their durability factors are excellent and superior to that of the reference concrete in the case of aluminosilicate and slag (Table 18). These results would thus indicate that the concretes incorporating aluminosilicate evaluated in this study would effectively resist the freeze/thaw cycles of Quebec winters.

Example 13—Concrete Durability Tests: Resistance to Scaling Due to Deicing Salts Scaling of bridge decks, pavements, sidewalks and access roads, as well as residential stairs, is a common problem in outdoor structures exposed to freeze-thaw cycles and deicing salts. Concrete exposed simultaneously to freeze-thaw cycles in the presence of moisture and deicing salts is susceptible to scaling (N. Bouzoubaâ, A. Bilodeau, B. Fournier, R. D. Hooton, R. Gagné, M. Jolin, *Deicing salt scaling resistance of concrete incorporating supplementary cementing materials: laboratory and field test data*, Canadian Journal of Civil Engineering—CAN J CIVIL ENG, vol. 35, no. 11, pp. 1261-1275, 2008). The Committee 116R (2005) of the ACI (American Concrete Institute) describes concrete scaling as a localized disintegration or loss of the shallower portion of concrete or mortar. This is the most common type of surface defect, particularly in areas exposed to freeze-thaw cycles and deicing chemicals. Scaling may be caused by, among other factors, the use of concrete without entrained air, with insufficient air content, or with an inadequate network of air bubbles (Talbot, C., M. Pigeon, J. Marchand. *Influence of Supplementary Cementing Materials on the De-icer Salt* 218 *Scaling Resistance of Concrete*. In Proceedings of the Seventh International Conference on Durability of 219 Building Materials and Components, Stockholm, Sweden, 1996, pp. 462-472).

Figure 12B:
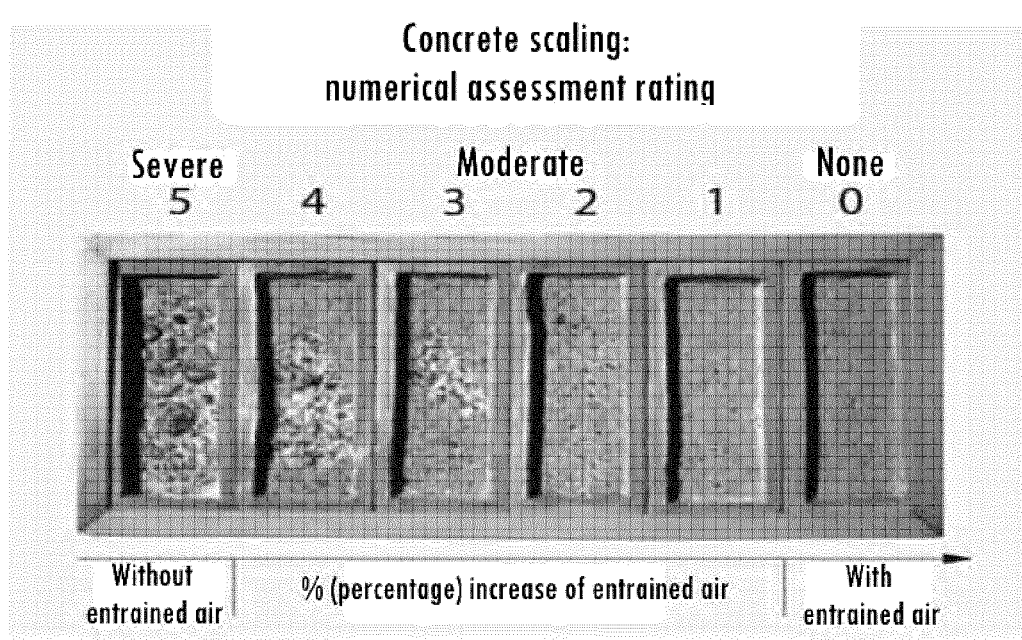
FIG. 12B is an image illustrating the visual assessment of damage to the concrete produced by deicing salts (ASTM C672-12).

During light scaling, the coarse aggregates remain embedded in the paste. For moderate scaling, the loss of thickness of the surface mortar may range from 10 mm to 15 mm and lead to the denudation of the aggregates. In the case of significant scaling, the surface is destroyed over a large thickness and is characterized by denudation and occasionally a loss of aggregate, as shown in FIG. 12B below. Concretes with supplementary cementing materials are generally known for their vulnerability to scaling due to their slower maturity. For this reason, maximum replacement rates for supplementary cementing materials have been identified in provincial standards.

In order to quantify the risk of scaling, several tests have been developed around the world. In Canada, four accelerated tests are mainly used, namely ASTM C672/C672M-12 *Standard Test Method for Scaling Resistance of Concrete Surfaces Exposed to Deicing Chemicals*; MTO TEST Method LS-412, REV. 17 *Method of Test for Scaling Resistance of Concrete Surfaces exposed to deicing Chemicals*. Ministry of Transportation, Ontario, Laboratory Testing Manual 97-08; BNQ. 2002. Améliorer ses performances. Programme de certification BNQ 2621-900. Bureau de Normalisation du Québec, Montreal, Que; CSA A23.1/A23.2-14 *Concrete Materials and Methods of Concrete Construction/Methods of Test for Concrete*, Includes Update No. 1 (2011) Edition: 11th, CSA Group/1 Jul. 2009/582 pages, ISBN: 978554912735). These tests all have their particularities. All of these types of tests have the same objective, namely: to provide a quick response as to the probability that the formulated concrete will be subject to scaling.

The resistance to scaling caused by deicing salts on concrete slabs 300 mm×300 mm×75 mm was evaluated according to the test methods of the ASTM C672 and MTO LS-412 standards. The concrete slabs were subjected to a 14-day moist curing followed by a 14-day dry curing at 23° C.±2° C. and 45%-55% relative humidity. At the age of 28 days, samples, on which a Styrofoam dam was carefully glued to retain the saline solution, are covered with a saline solution (NaCl 3% according to MTO LS-412). The layer of solution over the surface of the samples should be approximately 6 mm thick (height). The samples are then subjected to up to 50 freeze/thaw cycles. Each cycle consists of 16-18 hours of freezing in a cold room, followed by 6-8 hours of thawing in a room at 23° C.±2° C. and 45%-55% relative humidity. The solution covering the samples must be added as needed to maintain the 6 mm layer at all times.

After each 5 cycles, the solution and scaling debris on the samples are recovered, the debris is carefully collected by rinsing the surface of the samples with saline solution and filtering everything on filter paper. The debris is stored in an airtight container after drying in a dryer at 105° C. After 50 cycles, the cumulative mass of the debris is calculated and expressed as mass loss in kilograms per $m^2$ of exposed concrete surface area. Table 18 gives the cumulative values of the debris masses after 50 freeze/thaw cycles for the concretes under study. The ASTM C672 standard also recommends a visual assessment based on the observation of the surface condition following the rating in FIG. 12B.

The rating of the samples assessed by visual observation is also presented in Table 18.

The maximum scaling allowed by the standards (MTO-LS 412, BNQ 2621-900 and CSA A23.2) is 0.8 kg of debris per m of exposed surface. One can see that all the concretes studied respect this limit, and that it is the concrete containing fly ash that scales the most with almost 0.7 kg/$m^2$ of debris. The concrete containing aluminosilicate compares well with the concrete containing slag, 0.44 kg/$m^2$ and 0.32 kg/$m^2$ respectively, while the reference concrete without supplementary cementing materials scales the least of the entire series with 0.15 kg/$m^2$ of debris. This confirms that concretes with supplementary cementing materials tend to scale more than concretes made with pure Portland cement. In addition, it is also known that concretes with fly ash scale more than those containing blast furnace slag or silica fume. Finally, it should be noted that the performances of aluminosilicate in terms of concrete scaling is comparable to that of concrete containing slag and meets the requirements of the standards regarding scaling due to deicing salts without any problems. Considering that the laboratory scaling test conditions are more severe than natural environmental conditions, it may be assumed that all concretes would have a satisfactory behavior when exposed to deicing salts during the winter.

The results obtained by the test of the concrete's resistance to scaling due to deicing salts according to the MTO-LS412 standard (somewhat similar to CSA A23.2 and BNQ 2621-900) meet the requirements of the standards, and the mass loss of concrete in surface area expressed as mass of debris collected per unit of surface area exposed is lower in all cases than the limit value of 0.8 kg/$m^2$ per by the standard (Table 18). The behavior of the concrete made with aluminosilicate compares well with the concrete made with slag and is better than that of concrete made with fly ash. Fly ash is recognized as the supplementary material with the lowest tolerance to scaling due to deicing salts. The visual assessment of the surface area of the concrete slabs subjected to a saline solution and 50 freeze/thaw cycles is in accordance with the results of the loss of debris on the surface of the concrete (FIG. 13). In effect, the surface of the reference concrete made with pure Portland cement is very little affected by the salt and freeze/thaw cycles (Point Rating 1 according to FIG. 12B). The concretes containing aluminosilicate and slag are moderately affected (Point Rating 2), while the concrete containing fly ash appears to be slightly more affected with some denuded aggregates, but is also only moderately affected (Point Rating 3). The entrained air in these concretes has contributed quite well to improving their resistance to scaling due to salt and freeze/thaw.

In conclusion, the above examples show the real potential for using aluminosilicate in conventional concrete formulations with and without entrained air. This supplementary cementing material capable of replacing a significant part of the Portland cement in concrete could thus contribute to reducing the environmental impact of the construction industry.

Example 14—Aluminosilicate in Place of Cement

Mortars comprising aluminosilicate in place of cement were prepared, as described in Table 19. AS-1 and AS-2 mixtures contain 20% aluminum silicate in place of the cement (GU or GUL). In the four types of mortar, the activity index is greater than 75% at 7 and 28 days. For mortars comprising aluminosilicate, the activity index is greater than 79% (7 days) and 98% (28 days).

TABLE 19

| | | | | | | | Compressive strength | | | |
| | | | | | | | 7 days | | 28 days | |
| Type of mortar | Cement (g) | Sil-Al | Sand | Water | W/B | Flow (%) | MPa | I.A. (%) | MPa | I.A. (%) |
| GU | 750 | 0 | 2062.5 | 363 | 0.484 | 129 | 27.6 | 100 | 32.5 | 100 |
| GUL | 750 | 0 | 2062.5 | 363 | 0.484 | 117 | 29.0 | 100 | 34.4 | 100 |
| AS-1 GU | 600 | 150 | 2062.5 | 363 | 0.484 | 117 | 21.8 | 79.0 | 31.9 | 98.2 |
| AS-2 - GUL | 600 | 150 | 2062.5 | 363 | 0.484 | 110 | 23.7 | 81.7 | 36.7 | 106.7 |

Example 15—Additional Concrete Batching and Mechanical and Chemical Testing

Compositions of Concrete Mixtures

Concrete mixtures were prepared using various percentages of aluminum silicate disclosed in previous examples as supplementary cementious material. The properties of the mixtures are detailed in Table 20 below. The NRT (control) mixture contains no aluminum silicate; the NR1 mixture contains 10% aluminum silicate and the NR2 mixture contains 25% aluminum silicate. The mixtures were prepared using similar temperature, slump, density and air content parameters.

TABLE 20

Mixture composition and fresh concrete properties

| | Mixture ID | | |
|---|---|---|---|
| | NRT Control | NR1 10% cement replacement | NR2 25% cement replacement |
| Water (kg/m$^3$) | 152 | 152 | 152 |
| Portland cement (kg/m$^3$) | 380 | 342 | 285 |
| Aluminum silicate (NR) (kg/m$^3$) | 0 | 38 | 95 |
| Coarse aggregates (kg/m$^3$) | 950 | 950 | 950 |
| Fine aggregates (kg/m$^3$) | 800 | 800 | 800 |
| Air-entraining admixture - BASF Master Air AE (ml/m$^3$) | 83 | 83 | 83 |
| Water-reducing admixture - BASF Glenium 7500 (ml/m$^3$) | 1 500 | 1 500 | 1 500 |

Binder Properties

For comparative purposes, oxide compositions (%) and specific density of the presently disclosed aluminum silicate (Al—Si), and other commonly used binders, namely Portland cement, slag, fly ash and silica fume, are provided in Table 21.

TABLE 21

Binder analysis

| Oxide compositions (%) | Portland cement | Al—Si | Typical slag | Typical fly ash (class F) | Typical silica fume |
|---|---|---|---|---|---|
| SiO$_2$ | 19.80 | 71.80 | 36.8 | 47.9 | 95.0 |
| Al$_2$O$_3$ | 4.16 | 21.20 | 8.67 | 24.3 | 0.18 |
| Fe$_2$O$_3$ | 2.90 | 0.69 | 0.74 | 15.1 | 0.07 |
| MgO | 2.77 | 0.06 | 11.2 | 0.97 | 0.22 |
| CaO | 62.20 | 0.13 | 40.1 | 4.08 | 0.6 |
| SO$_3$ | 1.43 | 0.17 | 2.29 | 0.2 | 0.18 |
| Na$_2$O | 0.22 | 0.43 | 0.38 | 0.89 | 0.18 |
| K$_2$O | 0.83 | 0.32 | 0.31 | 1.69 | 0.48 |
| Properties | | | | | |
| Specific density | 3.14 | 2.60 | 2.89 | 2.5 | 2.26 |

Hydration Heat

Figure 15:
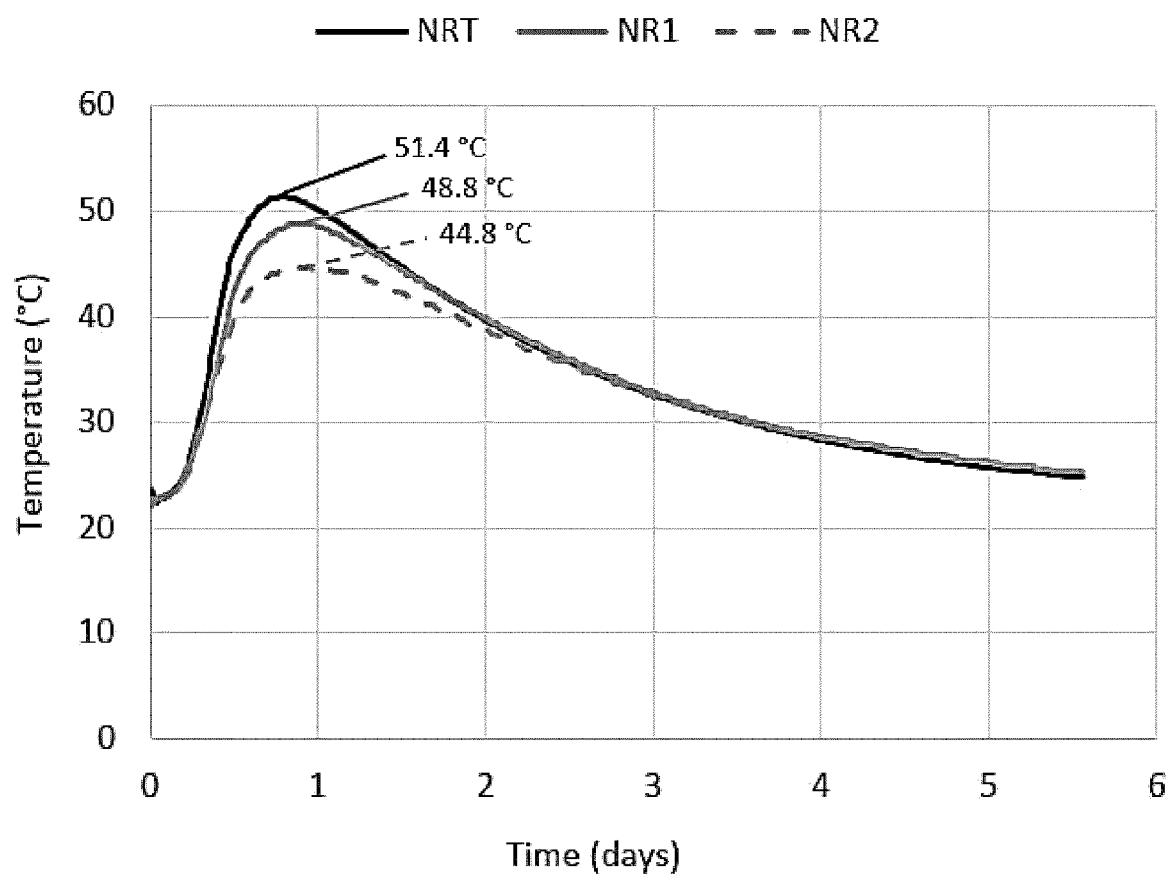
FIG. 15 is a graph showing hydration heat (° C.) of tested concretes NRT, NR1 and NR2 as a function of time (days).

Upon reacting dry components of mixtures NRT, NR1 (10% Al—Si) and NR2 (25% Al—Si) (as described in Table 20) with water, a chemical reaction occurred and the heat generated was measured with a precalibrated semi-adiabatic calorimeter allowing to perform the test as per RILEM TC119 (97) Section 7.2, as shown in FIG. 15. As can be seen, the heat of hydration decreased with increasing amounts of aluminum silicate in replacement of Portland cement. By replacing 10% of Portland cement with Al—Si, the peak hydration temperature decreased by nearly 3° C. and by replacing 25% of Portland cement with Al—Si, the peak hydration temperature decreased by nearly 7° C.

Petrographic Examination

Samples were analyzed following ASTM Method C 856-17 *Standard Practice for Petrographic Examination of Hardened Concrete*, and ASTM C 1723-16 *Standard Guide for Examination of Hardened Concrete Using Scanning Electron Microscopy* (*SEM*). A polished thin section taken from an area of interest near the interior of the cylinder was prepared using fluorescent dyed epoxy. A portion of each sample was prepared for thermogravimetric analysis (TGA) by crushing a portion of the concrete and removing coarse aggregate. A portion of the paste matrix (which would include some fine aggregate) was ground to pass through a 150 μm sieve. The resultant dust was thoroughly mixed and two sub-samples of 100 mg were taken from each. The samples were tested by TGA from room temperature to 800° C. using a ramp rate of 20° C./minute. The relative hydroxide content was determined by quantifying the relative mass loss between 400° C. and 500° C. for the two individual sub-samples and then averaging the two. Computer controlled scanning electron microscopy with energy dispersive spectroscopy (CCSEM/EDS) techniques were used to perform a semi-automated point count. A total of 25-28 areas of paste were selected for analysis manually at 400× magnification. During automated analyses, a 4×4 grid was applied to each 400× field of view. An image and EDS spectra were collected from the 16 points on the grid. Spectra and images were manually reviewed to identify the phases at each point.

Figure 16:
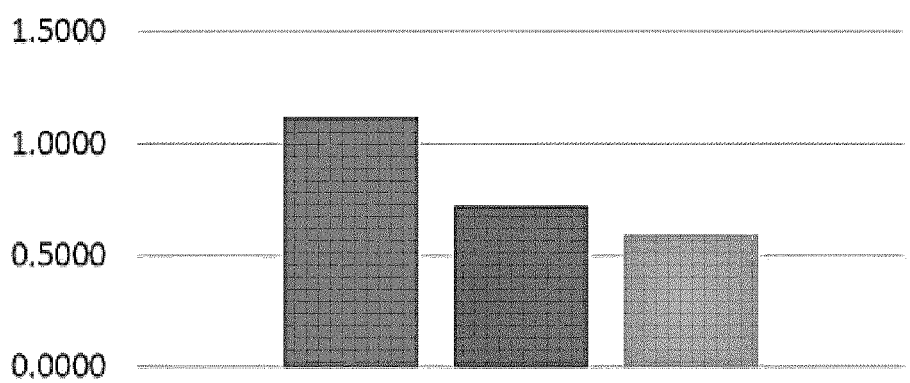
FIG. 16 is a bar graph showing the percentage of calcium hydroxide by mass for tested concretes NRT, NR1 and NR2.

Mineral content of concrete mixtures NRT, NR1 and NR2 (described in Table 20) were analyzed after 91 days of curing and are shown in Table 22 below. As can be seen, calcium hydroxide was consumed by pozzolanic reaction. In mixtures NR1 and NR2 comprising aluminum silicate, a reducing of ettringite (alumina, ferric oxide, tri-sulfate (Aft) phase) was observed in addition to an increased of monosultafe (alumina, ferric oxide, mono-sulfate (AFm) phase) which is indicative of greater chloride binding capacity, and is a desirable characteristic for concrete durability. FIG. 16 is a bar graph illustrating the calcium hydroxide percentage by mass for each of the tested concrete mixtures.

TABLE 22

Petrographic examination

| | Calcium Hydroxide Reduction | | Phase Proportions (%) | | | |
|---|---|---|---|---|---|---|
| | Average Calcium Hydroxide % | Average % Reduction from the Control | Ca(OH)2 | AFt Phase | AFm Phase | Un-hydrated or Partially Hydrated Al/Si |
| NRT 91 d | 1.12 | N/A | 13.66 | 5.67 | 0.52 | N/A |
| NR1 91 d | 0.72 | 36 | 5.85 | 4.63 | 3.41 | 2.44 |
| NR2 91 d | 0.59 | 47 | 4.36 | 5.05 | 7.80 | 8.49 | pH Profiles

Figure 17:
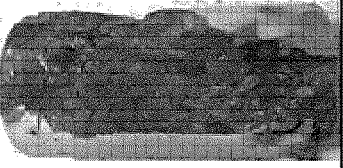
FIG. 17 is a series of images of tested concretes NRT, NR1 and NR2 at 28 and 91 days of curing. The pH measured for all samples is 13.

The alkalinity of the concrete paste was measured on freshly broken concrete samples samples of NRT, NR1 and NR2. The color paste after spraying Rainbow Indicator, by Germann Instruments, is directly linked to the pH. Normally, concrete paste has a pH of about 12-13.

pH profiles of concrete after 28 days of curing show no significant difference between the samples, the pH of the tested materials all being 13, as shown in FIG. 17.

Compressive Strength and Tensile Strength

Figure 18:
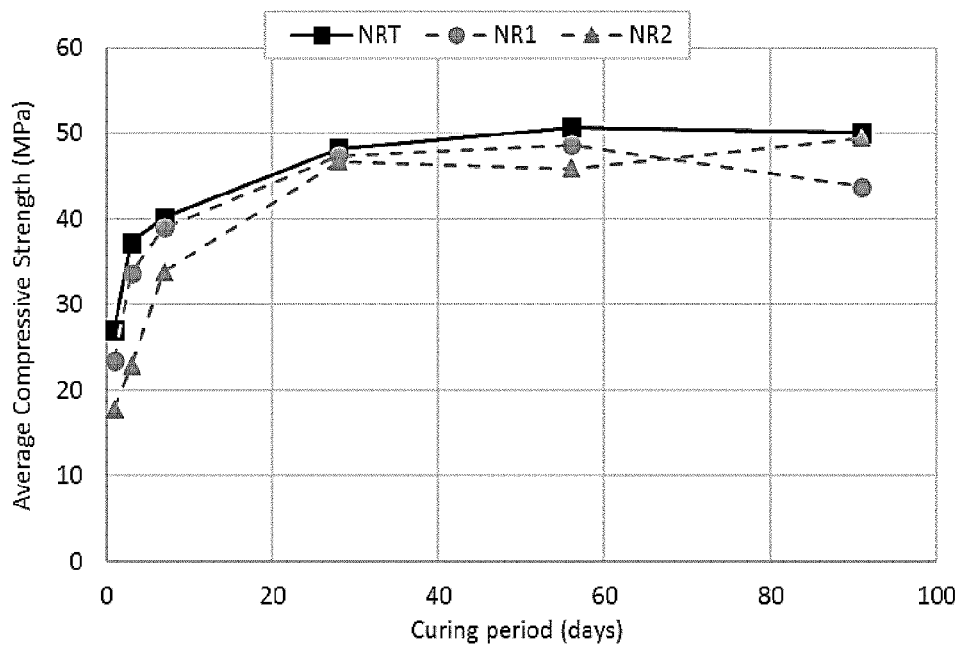
FIG. 18 is a graph showing average compressive strength (MPa) of tested concretes NRT, NR1 and NR2 as a function of curing period (days).

Physical properties of concrete mixtures NRT, NR1 and NR2 (described in Table 20 above) were evaluated. Referring to FIG. 18, the compressive strength measured with CSA A23.2-9C of the NR2 mixture (having 25% Al—Si in replacement of Portland cement) was lower after one day (27.0 MPa (NRT) vs. 17.8 MPa (NR2)) however became similar 28 days post-curing (48.3 MPa (NRT) vs. 46.7 MPa (NR2)). Tensile strength after 28 days of curing measured with CSA A23.2-13C was also measured, as shown in Table 23 below and was found to be similar among concrete mixtures NRT, NR1 and NR2.

TABLE 23

Tensile strength

| | Tensile strength after 28 days (MPa) | | |
|---|---|---|---|
| Specimen | NRT | NR1 | NR2 |
| 1 | 3.6 | 3.3 | 3.3 |
| 2 | 3.7 | 3.5 | 3.7 |
| 3 | 3.8 | 2.8 | 3.1 |
| Average | 3.7 | 3.2 | 3.4 |

Drying Shrinkage

Figure 19:
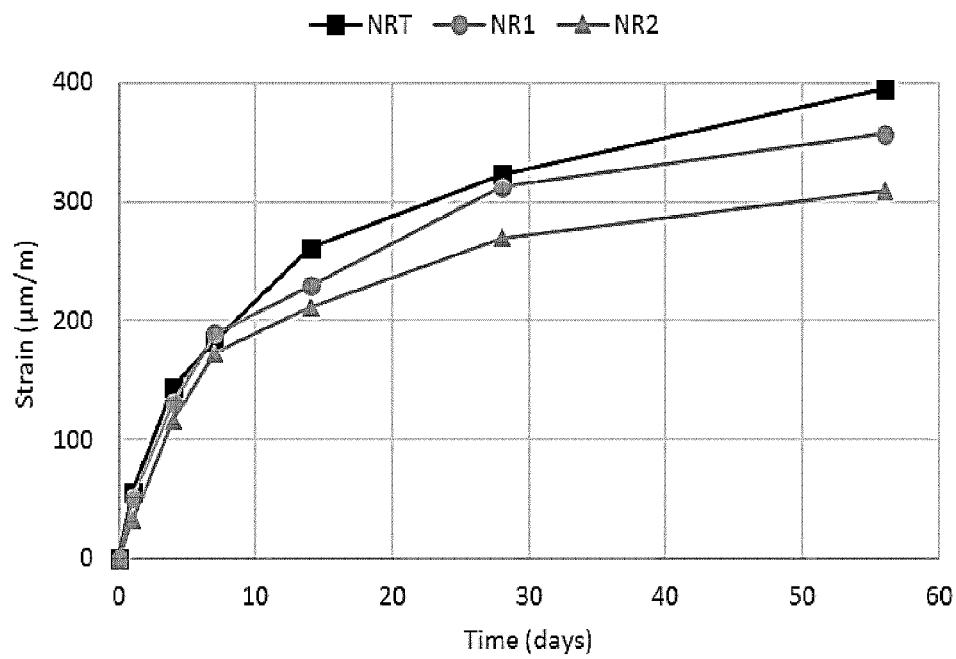
FIG. 19 is a graph showing strain (μm/m) of tested concretes NRT, NR1 and NR2 as a function of time (days).

Drying shrinkage, which is the contracting of a hardened concrete mixture due to loss of water, was measured in accordance with CSA A23.2-21C, as shown in Table 24 below and in FIG. 19. Less drying shrinkage was detected in mixtures containing aluminum silicate and the decrease was shrinkage was even more notable in the NR2 mixture containing 25% of aluminum silicate in place of Portland cement. At 56 days post-curing, the difference in shrinkage is significant between NRT (no aluminum silicate) and NR2 (25% aluminum silicate)—a reduction of about 20% shrinkage.

TABLE 24

Drying shrinkage

| | Drying shrinkage (µM/M) | | |
|---|---|---|---|
| Time (days) | NRT | NR1 | NR2 |
| 1 | 56 | 51 | 32 |
| 4 | 144 | 131 | 116 |
| 7 | 183 | 189 | 173 |
| 14 | 261 | 229 | 211 |
| 28 | 323 | 312 | 269 |
| 56 | 395 | 357 | 309 |

Air-Void System

Parameters of the air-void system of hardened concrete mixtures NRT, NR1 and NR2 were tested in accordance with ASTM C457 and are detailed in Table 25. As can be seen, the different mixtures exhibit similar air-void characteristics.

TABLE 25

Air-void system

| Average results | NRT | NR1 | NR2 |
|---|---|---|---|
| Air content (%) | 5.8 | 5.7 | 5.6 |
| Paste content (%) | 26.9 | 29.2 | 24.5 |
| Specific surface (mm$^{-1}$) | 18.1 | 19.9 | 16.7 |
| Spacing factor (µm) | 248 | 235 | 261 |

Resistance to Rapid Freezing and Thawing

In addition, mixtures NRT, NR1 and NR2 were tested for their relative dynamic modulus of elasticity in accordance with ASTM 0666-A. As shown in Table 26 below, all mixtures displayed similar relative dynamic modulus of elasticity, which is indicative that all three mixtures are similarly resistant to deterioration from rapid freezing and thawing. This is also indicative that use of aluminum silicate herein disclosed in place of Portland cement does not affect resistance to rapid freezing and thawing.

TABLE 26

Dynamic modulus of elasticity

| Average results | NRT | NR1 | NR2 |
|---|---|---|---|
| Relative dynamic modulus of elasticity (%) | 98.7 | 94.0 | 95.0 |

Rapid Chloride Permeability Test (RCPT)

Figure 20:
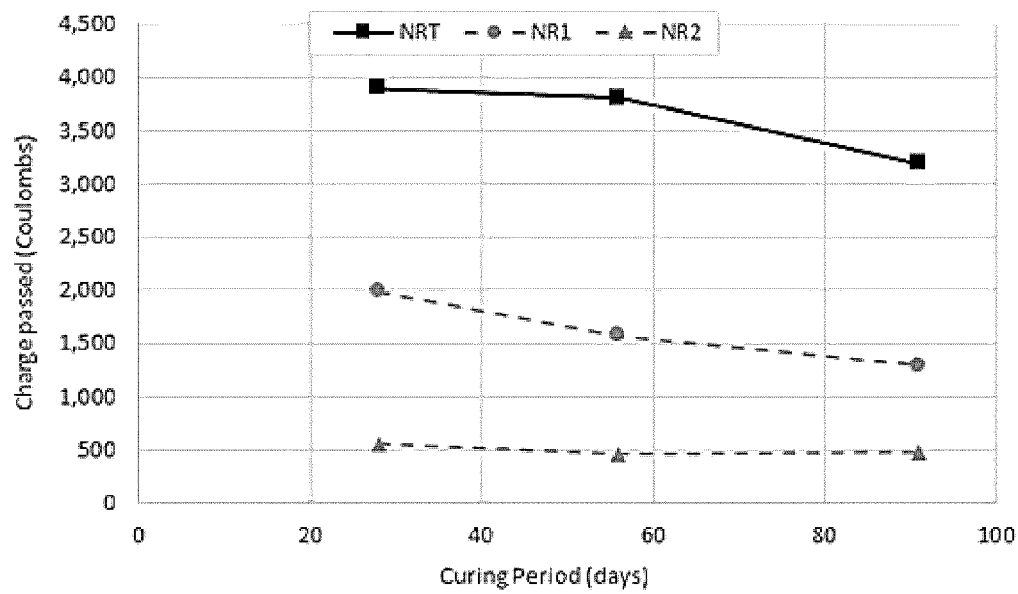
FIG. 20 is a graph showing Total charge (Coulombs) of tested concretes NRT, NR1 and NR2 as a function of curing period (days).

RCPT was conducted in accordance with ASTM C1202 to assess the durability of concrete, specifically its resistivity to chloride ion penetrability. As shown in Table 27 below as well as in FIG. 20, the presence of aluminum silicate in concrete mixture has a beneficial effect on concrete resistance to chloride ion penetrability, and the effect is even more pronounced in the NR2 mixtures comprising 25% aluminum silicate in replacement of Portland cement. As shown in Table 27, the chloride ion penetrability at 91 days is moderate for the reference concrete NRT, low for NR1 and very low for NR2. The results also show that resistivity tends to be more stable over curing time.

TABLE 27

Rapid chloride permeability test (RCPT)
Total charge (coulombs)

| Curing period (days) | NRT | NR1 | NR2 |
|---|---|---|---|
| 28 | 3893 | 1988 | 553 |
| 56 | 3808 | 1571 | 457 |
| 91 | 3193 | 1294 | 473 |
| Penetrability at 91 days* | Moderate | Low | Very low |

Figure 21:
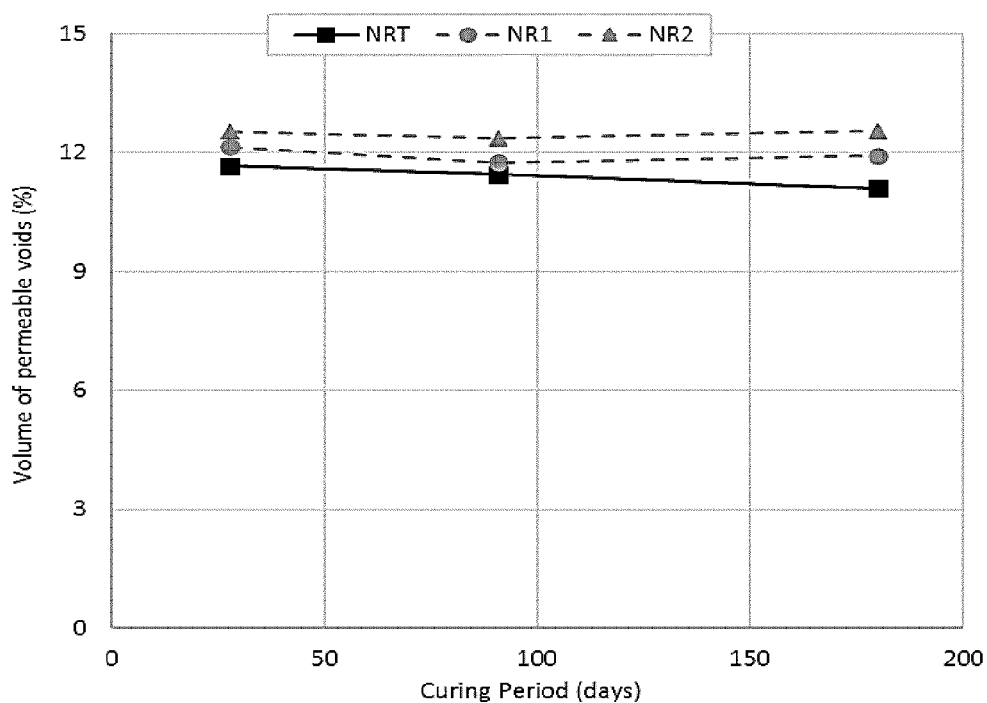
FIG. 21 is a graph showing the volume of permeable voids (%) of tested concretes NRT, NR1 and NR2 as a function of curing period (days).

*High: >4000 coulombs; moderate: 2000-4000 coulombs; low: 1000-2000 coulombs; very low: 100-1000 coulombs; negligible: <100 coulombs Volume of Permeable Voids The volume of permeable voids in mixtures NRT, NR1 and NR2 was measured according to the ASTM C642 standard. Results, shown in FIG. 21, indicate that there is no variation in volume of permeable voids over curing time for tested mixtures. In addition, a higher volume of permeable voids is observed with increasing aluminum silicate content.

Current and Ionic Diffusion Coefficient Measurement

Figure 22:
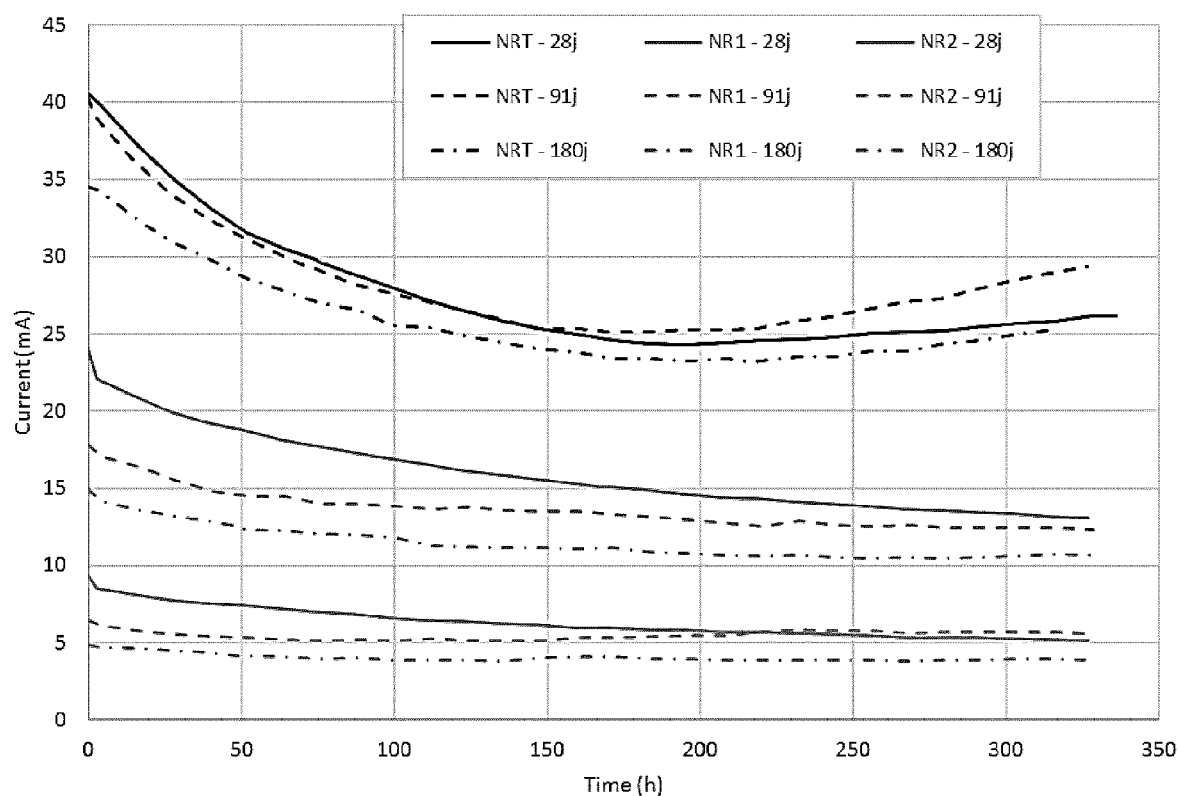
FIG. 22 is a graph showing the current (mA) of tested concretes NRT, NR1 and NR2 as a function of time (h).
Figure 23:
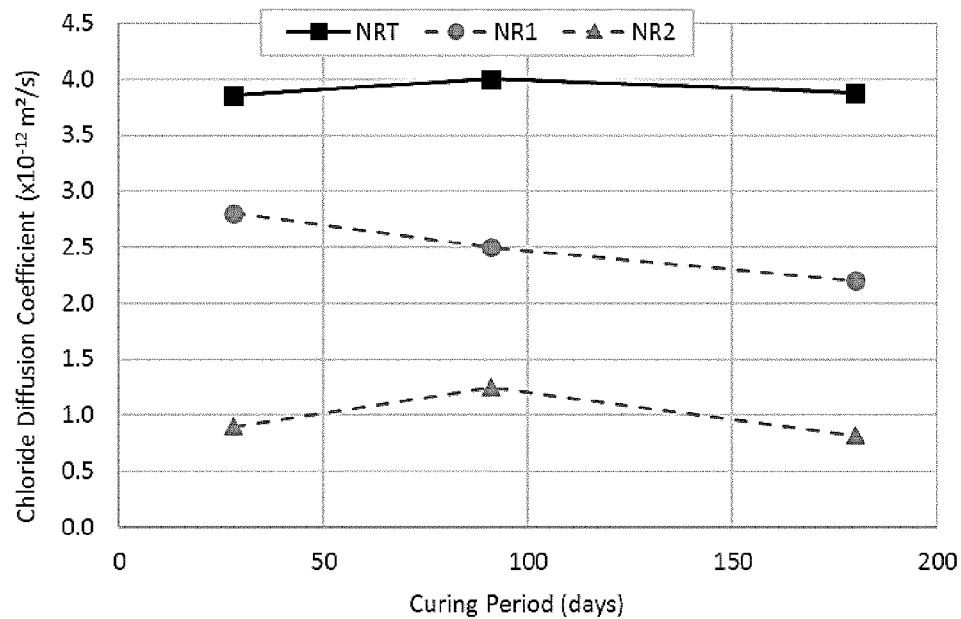
FIG. 23 is a graph showing chloride diffusion coefficient ($\times 10^{-12}$ m$^2$/s) as a function of curing period (days).

Current curves (see FIG. 22) and ionic diffusion coefficient (see FIG. 23 and Table 28) of mixtures NRT, NR1 and NR2 were measured in accordance with a modified ASTM C1202 procedure. The test consists in accelerating ions under an external potential and measuring the electrical current passing through the test specimen over a 14-day period. After testing, the measured currents were analyzed with the STADIUM®-IDC laboratory module developed by SIMCO Technologies Inc. to obtain the diffusion coefficients of the samples. As can be seen, increasing amounts of aluminum silicate in concrete mixtures is linked to decrease in both current and ionic diffusion coefficient, which is indicative of increased durability and resistance to ion penetration.

TABLE 28

Ionic diffusion coefficient

| Curing Period | Chloride Diffusion Coefficient ($\times 10^{-12}$ m$^2$/s) | | | Hydroxide Diffusion Coefficient ($\times 10^{-11}$ m$^2$/s) | | |
|---|---|---|---|---|---|---|
| (days) | NRT | NR1 | NR2 | NRT | NR1 | NR2 |
| 28 | 3.7 | 2.8 | 0.9 | 8.2 | 6.0 | 2.0 |
| 91 | 3.9 | 2.5 | 1.3 | 8.8 | 5.5 | 2.6 |
| 180 | 3.8 | 2.4 | 0.9 | 8.9 | 5.1 | 1.9 |

Concrete Resistivity

Figure 24:
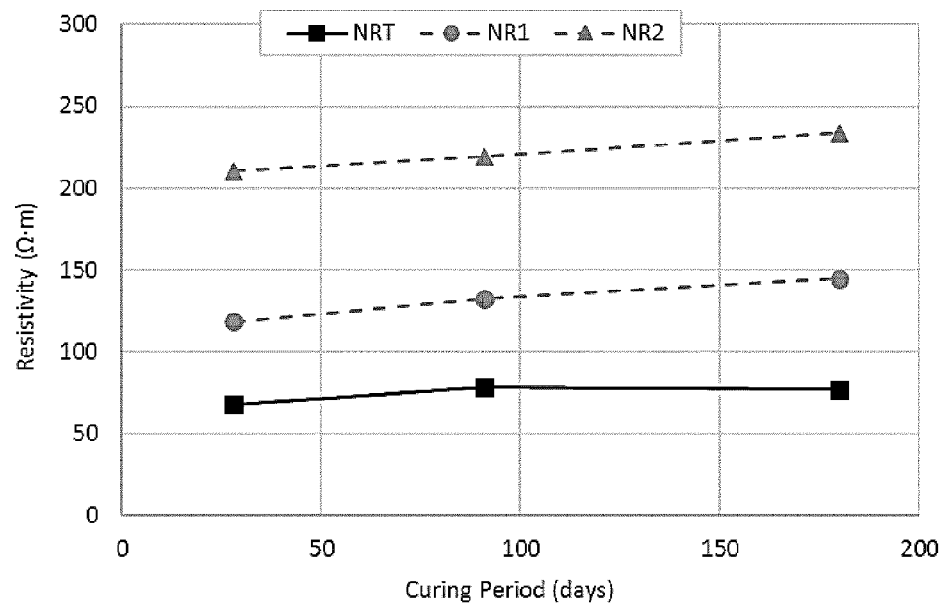
FIG. 24 is a graph showing resistivity (Ω·m) of tested concretes NRT, NR1 and NR2 as a function of curing period (days).

Average resistivity of concrete mixtures NRT, NR1 and NR2, after various curing periods, was measured. Results are shown in Table 29 and FIG. 24. As can be seen, resistivity is significant increased with replacement of Portland cement by aluminum silicate, and this increase is even more pronounced in the NR2 mixture containing 25% aluminum silicate. The rate of evolution of concrete resistivity as a function of curing period appears to be similar for all tested mixtures.

TABLE 29

Average resistivity

| Curing Period | Average Resistivity ($\Omega \cdot$ m) | | |
|---|---|---|---|
| (days) | NRT | NR1 | NR2 |
| 28 | 67.9 | 118.5 | 210.2 |
| 91 | 78.5 | 132.4 | 219.3 |
| 180 | 76.8 | 144.8 | 233.7 |

Moisture Transport and Water Loss Properties

Figure 25:
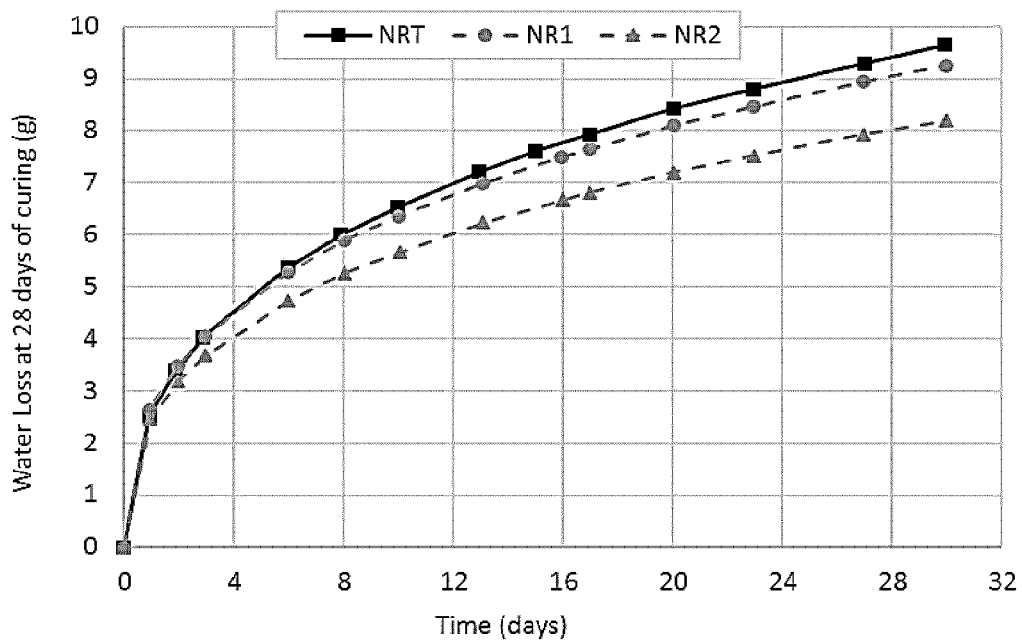
FIG. 25 is a graph showing water loss at 28 days of curing (g) as a function of time (days).
Figure 26:
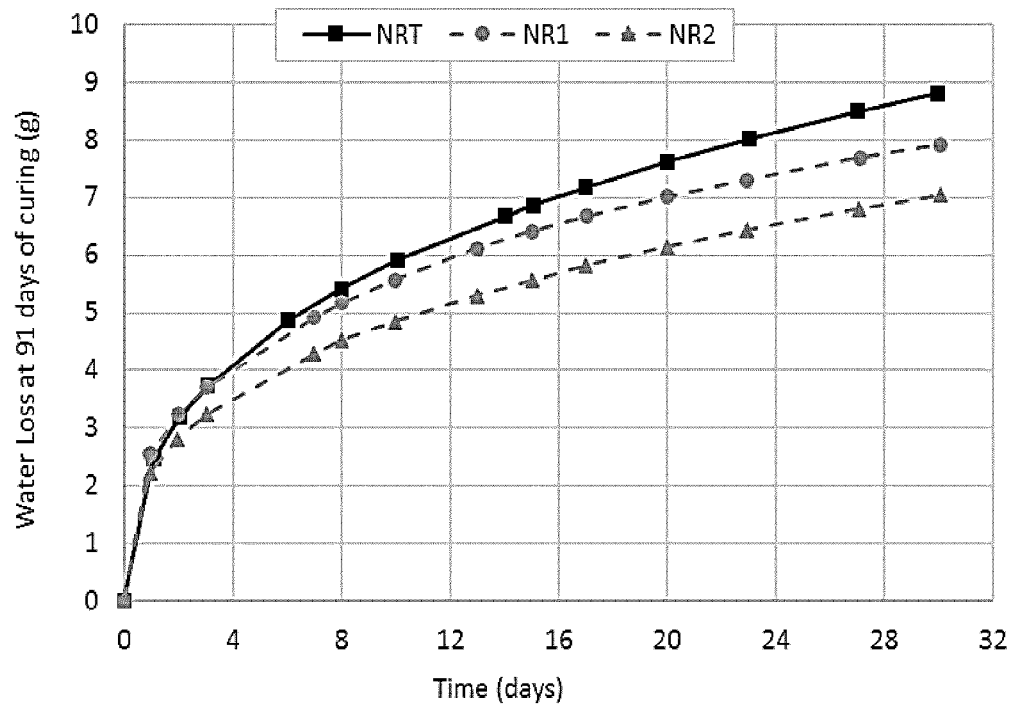
FIG. 26 is a graph showing water loss at 91 days of curing (g) as a function of time (days).
Figure 27:
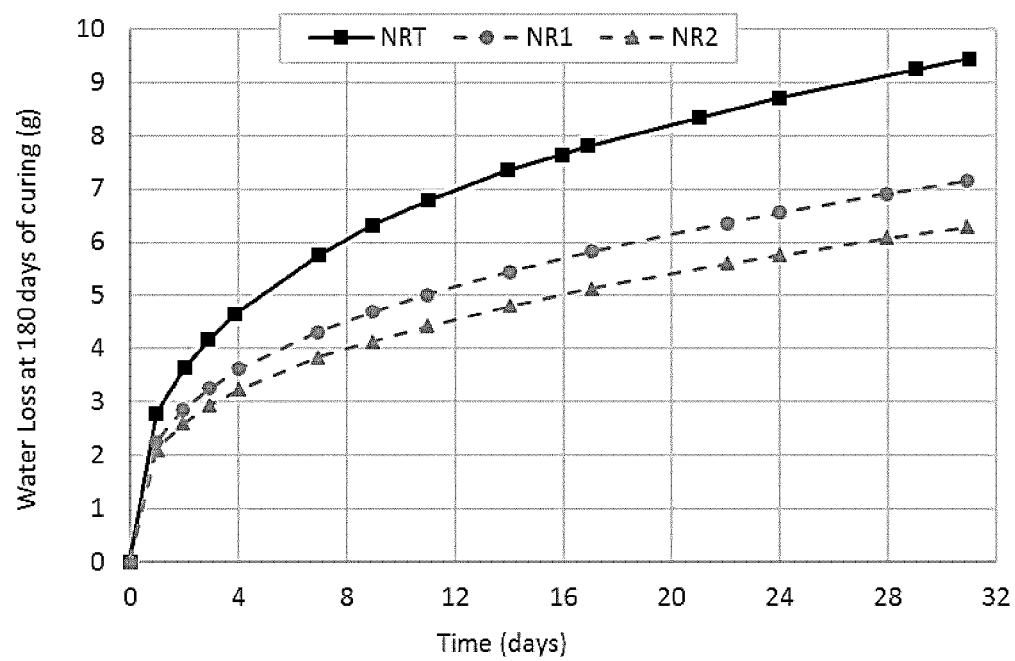
FIG. 27 is a graph showing water loss at 180 days of curing (g) as a function of time (days).

Testing was conducted in NRT, NR1 and NR2 concrete mixtures to assess moisture transport properties. As shown in Table 30 below, the permeability of aluminum silicate containing mixtures NR1 and NR2 was inferior to the reference mixture NRT not containing aluminum silicate, after 28, 91 and 180 days of curing. Water loss properties was also assessed at 28, 91 and 180 days, with results shown in FIGS. 25, 26 and 27, respectively. For all three curing periods, the increasing amount of aluminum silicate was associated with decrease in water loss. These results show that the presence of aluminum silicate in concrete is indicative of better quality concrete in terms of transport properties and durability.

TABLE 30

Moisture Transport Properties

| Curing Period | Saturation Degree at 50% relative humidity | | | Permeability ($\times 10^{-22}$ m$^2$) | | |
|---|---|---|---|---|---|---|
| (days) | NRT | NR1 | NR2 | NRT | NR1 | NR2 |
| 28 | 0.47 | 0.46 | 0.48 | 8.5 | 7.3 | 5.3 |
| 91 | 0.49 | 0.48 | 0.53 | 6.0 | 5.3 | 3.2 |
| 180 | 0.48 | 0.53 | 0.53 | 7.9 | 3.5 | 2.5 |

Pore Solution Extraction

Finally, pore solution extraction testing was conducted in NRT, NR1 and NR2 concrete mixtures. Briefly, the mixtures were crushed and pressed to extract a pore solution and mineral content of the pore solution was assessed. Results, shown in Table 31, indicate that aluminum silicate containing mixtures NR1 and NR2 contain less chloride ions and thus reduce the risk of causing chloride-induced corrosion of steel.

TABLE 31

Pore Solution Extraction

| | Concentration in solution - corrected (mmol/L) | | |
|---|---|---|---|
| Species | NRT | NR1 | NR2 |
| Cl$^-$ | 18.3 | 14.1 | 11.2 |
| OH$^-$ | 396.3 | 246.4 | 151.3 |
| Na$^+$ | 147.0 | 93.5 | 55.9 |
| K$^+$ | 266.6 | 163.4 | 103.4 |
| Ca$^{2+}$ | 0.5 | 1.8 | 1.6 |

The invention claimed is:

1. Aluminosilicate having a Blaine fineness of about 500 m$^2$/kg to about 3000 m$^2$/kg, said aluminosilicate having a silica content of about 66% to about 90% by weight and said aluminosilicate having an alumina content of about 10% to 45% by weight.

2. The aluminosilicate according to claim 1, said aluminosilicate having the Blaine fineness of about 750 m$^2$/kg to about 2500 m$^2$/kg.

3. The aluminosilicate according to claim 1, said aluminosilicate having the Blaine fineness of about 1500 m$^2$/kg to about 2000 m$^2$/kg.

4. The aluminosilicate according to claim 1, said aluminosilicate having a density of about 2 g/cm$^2$ to about 3 g/cm$^2$.

5. The aluminosilicate according to claim 1, said aluminosilicate having a density of about 2.5 g/cm$^2$ to about 3 g/cm$^2$.

6. The aluminosilicate according to claim 1, said aluminosilicate having a passing rate at 45 μm of about 40% to 90%.

7. The aluminosilicate according to claim 1, said aluminosilicate having a passing rate at 45 μm of about 45% to 55%.

8. The aluminosilicate according to claim 1, said aluminosilicate having a silica content of about 66% to about 85% by weight.

9. The aluminosilicate according to claim 1, said aluminosilicate having a silica content of about 66% to about 75% by weight.

10. The aluminosilicate according to claim 1, said aluminosilicate having an alumina content of about 15% to 40% by weight.

11. The aluminosilicate according to claim 1, said aluminosilicate having an alumina content of about 20% to 30% by weight.

12. The aluminosilicate according to claim 1, said aluminosilicate having an alumina content of about 23% to 27% by weight.

13. The aluminosilicate according to claim 1, said aluminosilicate comprising less than 2% by weight alkali metal or alkaline earth metal content.

14. The aluminosilicate according to claim 13, said alkali metals being chosen from Li, Na and K.

15. The aluminosilicate according to claim 13, said alkaline earth metals being chosen from Mg and Ca.

16. The aluminosilicate according to claim 1, said aluminosilicate comprising less than 2% by weight calcium content.

17. The aluminosilicate according to claim 1, said aluminosilicate comprising about 0.1% to about 3% by weight calcium content.

18. The aluminosilicate according to claim 1, said aluminosilicate comprising about 0.1% to about 1% by weight calcium content.

19. The aluminosilicate according to claim 15, said calcium being in the form of gypsum.

20. The aluminosilicate according to claim 1, said aluminosilicate comprising a moisture content of less than 2% by weight.

\* \* \* \* \*